US005579438A

United States Patent [19]

Kaneko et al.

[11] Patent Number: 5,579,438

[45] Date of Patent: Nov. 26, 1996

[54] FUZZY INFERENCE IMAGE FORMING APPARATUS

[75] Inventors: Satoshi Kaneko; Tokuharu Kaneko; Hiroaki Tsuchiya; Nobuo Nakazawa; Hisashi Fukushima; Yasushi Miura; Nobuhiko Takekoshi, all of Tokyo, Japan

[73] Assignee: Canon Kabushiki Kaisha, Tokyo, Japan

[21] Appl. No.: 527,103

[22] Filed: Sep. 12, 1995

Related U.S. Application Data

[63] Continuation of Ser. No. 370,454, Jan. 9, 1995, abandoned, which is a continuation of Ser. No. 125,145, Sep. 23, 1993, abandoned, which is a continuation of Ser. No. 536,330, Jun. 7, 1990, abandoned.

[30] Foreign Application Priority Data

| | | | |
|---|---|---|---|
| Jun. 7, 1989 | [JP] | Japan | 1-146444 |
| Jun. 7, 1989 | [JP] | Japan | 1-146451 |
| Jun. 7, 1989 | [JP] | Japan | 1-146452 |
| May 23, 1990 | [JP] | Japan | 2-131395 |

[51] Int. Cl.[6] ....... G06F 9/44

[52] U.S. Cl. ....... 395/3; 395/61; 395/900; 355/204; 355/206; 355/208

[58] Field of Search ....... 395/3, 61, 900; 355/204, 206, 208

[56] References Cited

U.S. PATENT DOCUMENTS

| | | | |
|---|---|---|---|
| 3,912,390 | 10/1975 | Van Herten | 355/14 |
| 4,183,658 | 1/1980 | Winthaegen | 355/3 |
| 4,252,432 | 2/1981 | Ophey | 355/14 |
| 4,310,237 | 1/1982 | Gengelbach | 355/14 |
| 4,348,102 | 9/1987 | Sessink | 355/14 SH |
| 4,420,247 | 12/1983 | Suzuki et al. | 355/208 |
| 4,521,099 | 6/1985 | Katayama et al. | 355/234 |
| 4,617,661 | 10/1986 | Futaki et al. | 355/208 |
| 4,669,862 | 6/1987 | Yagasaki et al. | 355/206 |
| 4,692,777 | 9/1987 | Hasumi | 346/140 |
| 4,777,585 | 10/1988 | Kokawa et al. | 395/61 |
| 4,797,707 | 1/1989 | Iwahashi et al. | 355/208 |
| 4,814,834 | 3/1989 | Endo et al. | 355/208 |
| 4,857,960 | 8/1989 | Hosaka et al. | 355/208 |
| 4,943,834 | 7/1990 | Maeda et al. | 355/204 |
| 4,972,229 | 11/1990 | Shibazaki et al. | 355/204 |
| 5,012,430 | 4/1991 | Sakurai | 364/131 |
| 5,027,305 | 6/1991 | Tanaka et al. | 395/61 |
| 5,029,314 | 7/1991 | Katsumi et al. | 395/900 |
| 5,066,978 | 11/1991 | Watarai et al. | 355/206 |
| 5,142,332 | 8/1992 | Osawa et al. | 355/208 |

FOREIGN PATENT DOCUMENTS

| | | |
|---|---|---|
| 0042630 | 12/1981 | European Pat. Off. . |
| 0268182 | 5/1988 | European Pat. Off. . |
| 3232505 | 3/1983 | Germany . |
| 56-25754 | 3/1981 | Japan . |
| 56-85770 | 7/1981 | Japan . |
| 56-154757 | 11/1981 | Japan . |
| 63-116265 | 5/1988 | Japan . |
| 2108730 | 5/1983 | United Kingdom . |

OTHER PUBLICATIONS

"An Introductory Survey Of Fuzzy Control", Michio Sugeno, Information Sciences: An International Journal, vol. 36, 1985.

"Application Of Fuzzy Control For Servo Systems", Y. F. Li Proceedings of The IEEE International Conference On Robotics And Automation, 1988.

"A Control Engineering Review Of Fuzzy Systems", R. M. Tong, Automatica, vol. 13, pp. 559–569, 1977.

*Primary Examiner*—George B. Davis
*Attorney, Agent, or Firm*—Fitzpatrick, Cella, Harper & Scinto

[57] ABSTRACT

An image forming apparatus for forming an image on a recording material comprising: a plurality of processing devices for forming the image; a detector for detecting at least a quantity of state relating to a control of the processing devices; a fuzzy inference computer for inferring, in accordance with the quantity of state, a quantity of control for use to control the processing devices.

21 Claims, 46 Drawing Sheets

MEMBERSHIP FUNCTION

RULE 1 (E is PB and DE is ZO and SP is ME)→H is PB
RULE 2 (E is PS and DE is ZO and SP is ME)→H is PS
RULE 3 (E is ZO and DE is ZO and SP is ME)→H is ZO
RULE 4 (E is ZO and DE is PB and SP is ME)→H is NB
RULE 5 (E is ZO and DE is PS and SP is ME)→H is NS
RULE 6 (E is Zo and DE is ZO and SP is ME)→H is ZO
RULE 7 (E is ZO and DE is NS and SP is ME)→H is PS
RULE 8 (E is ZO and DE is NB and SP is ME)→H is PB
RULE 9 (E is ZO and DE is ZO and SP is ME)→H is ZO
RULE 10 (E is ZO and DE is ZO and SP is LA)→H is PS
RULE 11 (E is ZO and DE is ZO and SP is SM)→H is NS

FIG. 6

| GRADIENT \ DEVIATION | NB | NS | ZO | P |
|---|---|---|---|---|
| NB | L | M | S | ZO |
| NS | L | M | S | ZO |
| ZO | L | S | ZO | ZO |
| P | M | S | ZO | ZO |

FIG. 21

| ROOM TEMPERATURE | TL | TM | TH |
|---|---|---|---|
| S | HIGH | MEDIUM | MEDIUM |
| M | MEDIUM | MEDIUM | MEDIUM |
| L | MEDIUM | MEDIUM | LOW |
FIG. 25
FIG. 26(a)
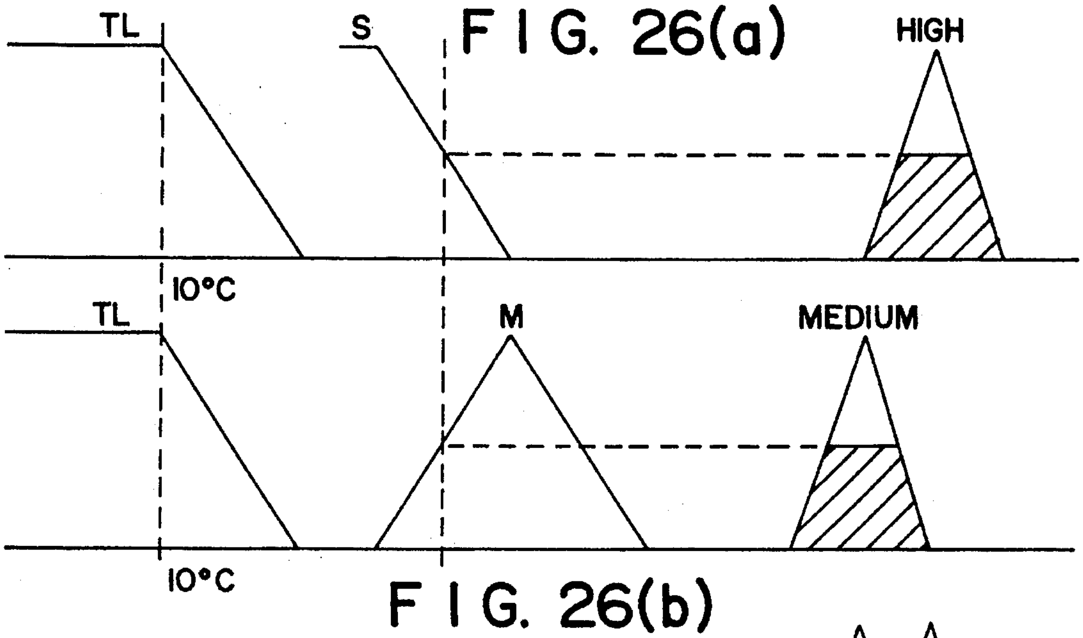
FIG. 26(b)
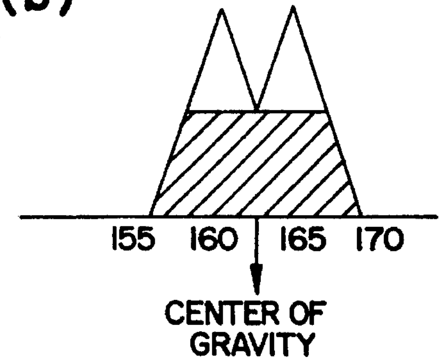
FIG. 26(c)

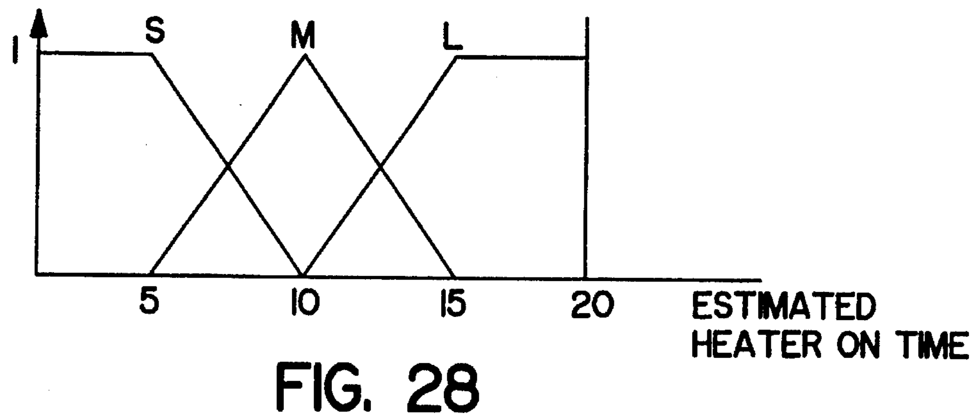
FIG. 28
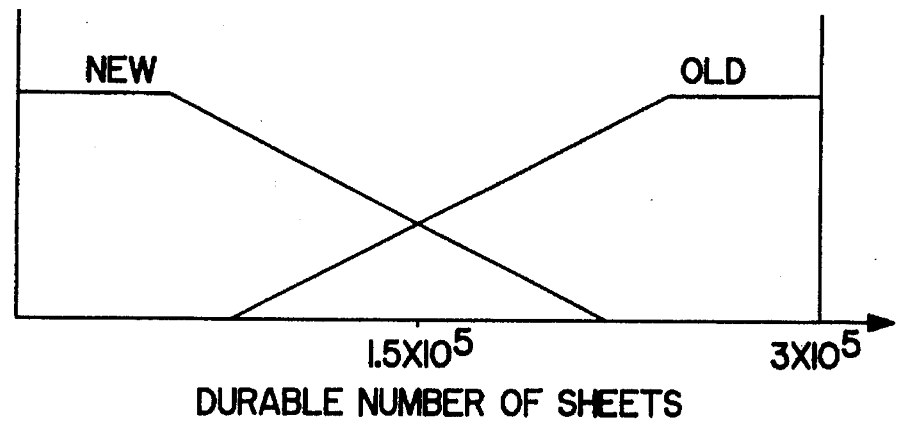
FIG. 29
| ROOM TEMPERATURE | NEW | | | OLD | | |
|---|---|---|---|---|---|---|
| | TL | TM | TH | TL | TM | TH |
| S | HIGH | MEDIUM | MEDIUM | HIGH | HIGH | MEDIUM |
| M | MEDIUM | MEDIUM | MEDIUM | HIGH | MEDIUM | MEDIUM |
| L | MEDIUM | MEDIUM | LOW | MEDIUM | MEDIUM | MEDIUM |
FIG. 30

HUMIDITY (QUANTITY OF STATE)

QUANTITY OF SUSPENDED DUST (QUANTITY OF STATE)

INTERVAL (QUANTITY OF CONTROL)

(RULE 1)
FIG. 36(a)
(QUANTITY OF SUSPENDED DUST = DH and HUMIDITY = HM) → INTERVAL = TH
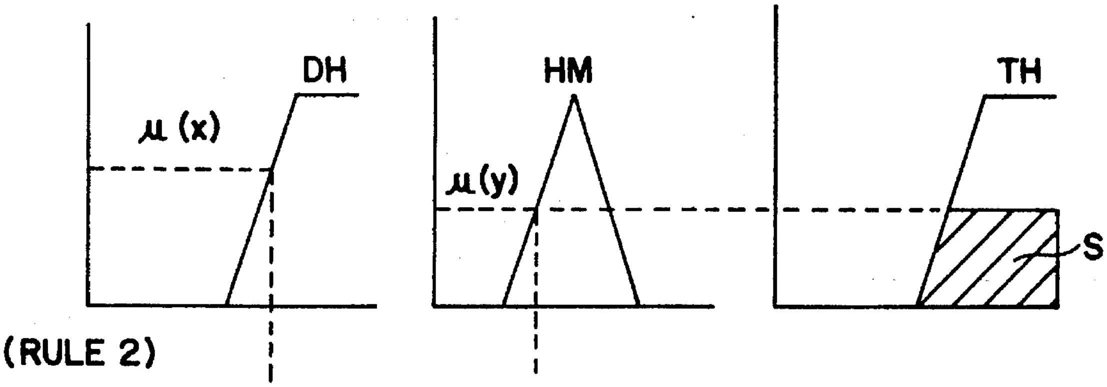
(RULE 2)
(QUANTITY OF SUSPENDED DUST = DM and HUMIDITY = HM) → INTERVAL = TM
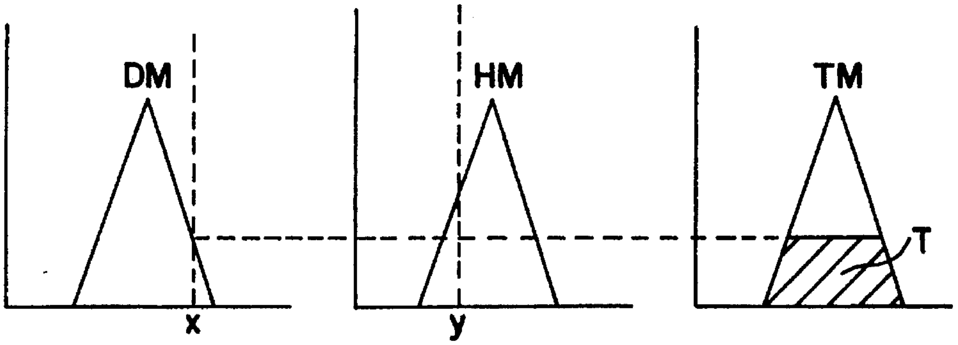
FIG. 36(b)
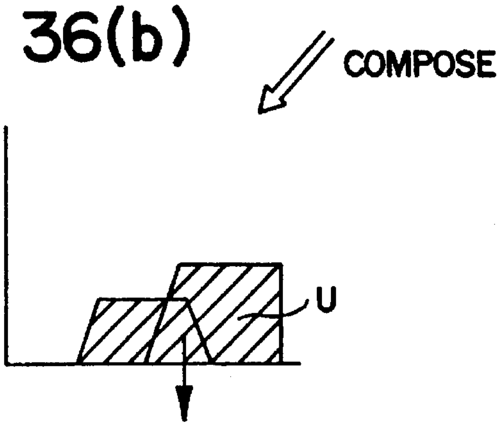
FIG. 36(c)

| HUMIDITY | | QUANTITY OF SUSPENDED DUST | | |
|---|---|---|---|---|
| | | DH | DM | DL |
| | HL | TH | TH | TM |
| | HM | TH | TM | TL |
| | HH | TH | TL | TL |

A

FIG. 37

FUZZY INFERENCE IMAGE FORMING APPARATUS

This application is a continuation of application Ser. No. 08/370,454 filed Jan. 9, 1995, now abandoned, which was a continuation of application Ser. No. 08/125,145 filed Sep. 23, 1993, now abandoned, which was a continuation of application Ser. No. 07/536,330 filed Jun. 7, 1990, now abandoned.

BACKGROUND OF THE INVENTION

1. Field of the Invention

The present invention relates to an image forming apparatus comprising control means employing a fuzzy inference.

2. Description of the Related Art

Hitherto, in a control device of an image forming apparatus of the type described above, a control is performed in accordance with a rule on a definite judgement made in accordance with the quantity of state.

For example, a fixing device is usually arranged in such a manner that the temperature of the fixing device is detected by a temperature sensing device such as a thermistor and a heat source such as a heater is controlled with reference to a predetermined temperature level. For example, if the detected temperature is lower than 180° C., the heater is turned on, while the heater is turned off if the detected temperature is higher than 180° C.

In order to reduce the undesirable change with respect to a desired temperature, a variety of means have been proposed, for example, the time interval or duration in which the heater is turned on is controlled to be changed in accordance with the present temperature.

However, an image forming apparatus such as a copying machine suffers from an excessive change due to the environmental conditions and the relationship between the quantity of state of which and the control quantity of which is mainly controlled by a fuzzy relationship. Therefore, if the number of the quantities of states increases, it is very difficult to control in accordance with a predetermined rule.

For example, in a temperature control of a fixing device, it has been experientially known that the performance of fixing toner transferred to transfer paper is complexly changed if the quantity of state, such as room temperature, the number of sheets to be copied, the density of the original, the type of paper, and the temperature of the fixing device, has been changed. However, it has been very difficult to make a rule about the relationship between the quantity of state of the type described above and the control quantity. Specifically, the degree of heat radiation becomes different depending upon the circumferential conditions and the state whether or not the paper is being conveyed. Therefore, the conventional control, which is arranged in such a manner that the heat control device thereof is turned on when the temperature has exceeded a predetermined temperature level and the same is turned off when the temperature has been lowered below the above-described level, causes undesirable change due to the temperature (to be called "temperature ripple" hereinafter) to be generated. It is necessary for the minimum value of the above-described temperature ripple to be a temperature level at which toner can be satisfactorily fixed on to the transfer paper. Therefore, the temperature set for the heat control device must be higher, by a considerably degree, than the ideal state. Therefore, problems arise in that exceeding power is necessary and the materials for forming the fixing device must have satisfactory heat resistance.

A fixing device for a copying machine or a laser beam printer, and, in particular, a fixing device, which comprises a pair of rotary bodies having a fixing roller and a pressure application roller are rotated during the warming up operation of the device, are usually arranged in such a manner that the temperature of the fixing roller is detected by a temperature sensing device such as a thermistor and a heat source such as a heater is controlled with reference to a predetermined temperature level.

A problem arises in that the fixing performance deteriorates since the pressure application roller has not be sufficiently heated immediately after the temperature of the fixing roller has reached the set temperature at which the warming up operation is ended after the power supply.

Therefore, the pressure application roller is heated by rotating the pair of the rollers during the warming up multiple operations (to be called "multiple previous rotations" hereinafter).

The multiple previous rotations have been usually conducted in accordance with the surface temperature of the fixing roller.

However, since the fixing performance depends upon the temperature of the recording paper passing through the fixing device and the water content of the same, a stable fixing characteristics cannot be obtained by the above-described method.

Furthermore, a problem arises in that the copy restarting time after a jam has been eliminated becomes delayed if the multiple previous rotations are uniformly conducted although the pressure application roller has been sufficiently heated up in a case where the operation of the copying machine is stopped due to the jam.

A fact has been experientially known that the fixing performance becomes different depending upon the temperature of the pressure applying roller and that of transfer paper although the temperature of the fixing roller has reached the predetermined level. However the relationship between the quantity of state and the control quantity cannot be regulated.

Hitherto, in order to prevent the deterioration in the fixing performance, a multiplicity of structures have been proposed, for example, in Japanese Patent Laid-Open No. 56-25754 in which the fixing roller is rotated at low speed when the temperature of the fixing roller is lower than a predetermined level while the same is rotated at high speed when the temperature of it is higher than the predetermined level. Another structure has been disclosed in Japanese Patent Laid-Open No. 56-85770 in which the copying interval is changed in accordance with the type of the subject whether the subject to be copied is a line image or an area image. Furthermore, a structure has been disclosed in Japanese Patent Laid-Open No. 56-154757 in which the number of sheets to be copied per unit time period is changed by the thermal capacity. In addition, another structure has been proposed in which the number of sheets to be copied per unit time period is changed depending upon the ambient temperature.

However, according to each of the above-described conventional structures, the copying speed or the paper feeding interval has been determined by an excessive switching between low temperature and high temperature or in accordance with the insufficient number of the quantities of states. However, since the fixing performance is actually influenced by a multiplicity of factors, it is necessary to properly determine the desired fixing temperature and the copying interval on the basis of a multiplicity of quantities of states as an alternative to a sole quantity of state such as the ambient temperature. However, it has been very difficult to properly control the multiplicity of the quantities of states.

Another type image forming apparatus, that is, an ink jet recording apparatus has been known in which ink is discharged toward recording paper so as to form dots on the recording paper, whereby characters and/or images can be formed by the dots. The recording head employed in the above-described ink jet recording apparatus is able to perform a high quality image recording since the discharge port thereof can be structured precisely. Some of the above-described ink jet recording apparatus employ an ink discharge method arranged in such a manner that ink is discharged by the effect of pressure. The above-described pressure discharge method is exemplified by a method in which ink is supplied with pressure by an electromechanical conversion device such as the piezo electric device and a method in which bubbles are generated in the ink by heat generated by the electrothermal conversion device and the bubbles are enlarged to create pressure in the ink.

FIG. 10 illustrates a recording head which employs an electrothermal conversion device of the type described above as the pressure application means.

FIG. 10 is a perspective view which schematically illustrates the structure of an ink jet recording head of the type described above. Referring to the drawing, an electrothermal conversion member 103, an electrode 104, a liquid passage wall 105 are formed on a substrate 102 made of Si or the like by an etching, an evaporation and a spattering processes which are similar to those for manufacturing a semiconductor device. Then, a top board 106 is fastened to the above-described elements so that a recording head 101 is constituted. Ink 112 is supplied to a common liquid chamber 108 of the recording head 101 from a liquid reservoir (omitted from illustration), for example, an ink tank via a supply pipe 107. Referring to the drawing, reference numeral 109 represents a connector for the ink supply pipe 107. The ink 112 supplied to the common liquid chamber 108 is, due to capillary force or a pressure change taken place when ink is discharged, supplied to a liquid passage 110. The ink 112 can be stably held by forming a meniscus at the opening of the front portion of the liquid passage 110, that is in the vicinity of a discharge port. When an extremely short electric pulse is applied to the electrothermal conversion member 103, the ink 112 on the electrothermal conversion member 103 is heated, causing a film boiling. As a result of this film boiling, bubbles are enlarged and ink 112 is thereby discharged.

The thus structured recording head can be arranged in such a manner that, in particular, the discharge ports are precisely provided at high density. Therefore, it is able to perform an excellent recording exhibiting a high resolution. Therefore, it has attracted attention recently.

However, the ink jet recording apparatus arises a variety of problems due to its arrangement in which ink is used as the recording agent. For example, a problem arises in that dew condensation takes place at the discharge port of the recording head due to the difference between the temperature of ink and the ambient temperature. Another problem arises in that ink droplet, generated from ink mist formed at the time of discharging ink, adheres to the discharge port. That is, water droplet adhered to the discharge port influences the ink discharge, causing the discharge direction to be deviated, and what is even worse, ink cannot be discharged. Furthermore, dust such as paper dust separated from recording paper and floating in the atmosphere can be adhered to the discharge port which has been wetted by the water droplets. As a result, the ink discharge cannot be smoothly conducted, and what is worse ink cannot be discharged. The water droplets or dust critically influences the recording head of the type in which the discharge ports are precisely provided with high density.

In order to overcome the above-described problem arisen in that the ink cannot be smoothly discharged or ink cannot be discharged, a variety of structures for stabilizing the discharge by removing water droplets and dust have been disclosed. For example, a structure has been disclosed in which the discharge port is wiped by a flexible blade made of plastic or rubber so as to remove dust or the like. Another structure has been disclosed in which a removal member comprising an ink absorbing material such as a porous member is brought into contact with the discharge port so as to remove water droplets or dust by absorbing them. Some of the above-described structures employ a structure in which ink is leaked by a pressure application means through the discharge port so as to absorb water droplets and dust so that the dust and/or water droplets can be satisfactorily absorbed by the removal member.

However, the discharge stabilizing operation for removing dust or the like must be conducted at a predetermined interval during the recording operation performed by the ink jet recording apparatus or conducted if it is desired. In this case, the time taken to complete the above-described operation lowers the recording speed of the recording apparatus.

Therefore, a variety of attempts have been made so as to prevent the deterioration in the recording speed by elongating the interval of the removal operations by controlling the timing of this operation in accordance with the continuous recording time period counted by, for example, a timer, the ambient temperature or humidity detected by a sensor and the discharge duty at the discharge port, that is, the recording pixel density or the like.

However, in the above-described control of the timing of performing the removal operation, it is very difficult to obtain a quantitative relationship between the quantity (to be called "the quantity of state" hereinafter) which becomes an action factor for causing the water droplets or dust to be adhered such as the continuous recording time period, the ambient temperature and humidity and discharge duty and the interval (time) (to be called "the control quantity" hereinafter) which is the factor to be controlled. In the case where a plurality of the quantity of states are related to one another, another problem arises in that the relationship between these quantities of states and the control quantity cannot be easily obtained. Even if the relationship can be obtained, the necessary calculations become too complicated.

Hitherto, in the control of the interval of the discharge stabilizing operation, the control quantity with respect to the quantities of states, that is, the interval cannot be determined in the most suitable manner. Therefore, unnecessary long time takes place in the conventional apparatus for the purpose of removing water droplets and/or dust. Therefore, the recording speed of the apparatus is lowered unsatisfactorily.

SUMMARY OF THE INVENTION

Accordingly, an object of the present invention is to provide a control device of an image forming apparatus such as a copying machine, a laser printer, an ink jet printer or the like in which the relationship between the quantity of state of which and the control quantity is controlled by a fuzzy relationship, the control device being capable of deducing the control quantity by a fuzzy inference.

In order to achieve the above-described object, according to one aspect of the present invention, there is provided an image forming apparatus for forming an image on a recording material and including a plurality of processing means for forming the image; the image forming apparatus comprising: detection means for detecting at least a quantity of state relating to a control of the processing means; and means for inferring, in accordance with the quantity of state, a quantity of control for use to control the processing means.

The inference means infers a quantity of control for use to control the processing means in accordance with at least one quantity of state relating to the process and detected by the detection means.

According to another aspect of the present invention, there is provided an image forming apparatus having a plurality of processing means for performing the process for forming visible image on a recording material, the image forming apparatus comprising: a detector for detecting at least a quantity of state relating to the process; means for generating a control quantity for controlling at least one of the image forming processes; means for storing a rule for qualitatively relating the quantity of state with a control quantity; means for storing a function expressing the quantity of state and the control quantity with a fuzzy set; and inference means for deducing the degree belonging to the set of the control quantity from the degree belonging to the set of the quantity of state in accordance with the rule and inferring the control quantity in accordance with the deduced degree.

The above-described inference means deduces the degree belonging to the set of the control quantity from the degree belonging to the set of the quantity of state in accordance with the rule stored in the rule storing means for qualititatively relating the relationship between the quantity of state with the control quantity and by using the fuzzy set expressing the state of quantity and the control quantity, and the inference means infers the control quantity in accordance with the deduced degree.

According to another aspect of the present invention, there is provided an image forming apparatus having a process in which a visual image formed on transfer paper is fixed by heat, the image forming apparatus comprising: means for detecting a predetermined quantity of state relating to the fixing process; and means for inferring the control quantity for controlling the fixing process in accordance with the quantity of state.

The above-described inference means infers the control quantity for controlling the fixing process in accordance with the quantity of state detected by the means for detecting the predetermined quantity of state relating to the process in which a visible image formed on transfer paper is fixed by heat.

According to another aspect of the present invention, there is provided a fixing device for fixing a toner image by holding and conveying a supporting member for supporting the toner image by a pair of rotational bodies at least either of which is heated by a heat source, the pair of rotational bodies being rotated during warming up, the fixing device comprising: control means for controlling the rotation of the pair of the rotational bodies during the warming up. According to the present invention, there is provided another fixing device for fixing a toner image by holding and conveying a supporting member for supporting the toner image by a pair of rotational bodies at least either of which is heated by a heat source, the pair of rotational bodies being rotated during warming up, the fixing device comprising: control means for controlling the rotation of the pair of rotational bodies during the warming up in accordance with an inference value obtained by using a fuzzy set.

According to another aspect of the present invention, there is provided a recording apparatus in which the recording speed can be changed or the recording operation can be stopped in accordance with the state of use and in which a reference value for the change or the stop can be changed, the recording apparatus being characterized in that the reference value is determined by an inference made by using a fuzzy set.

Another object of the present invention is to provide an ink jet recording apparatus and a control method therefor capable of most suitably control the interval or the like for the purpose of stabilizing the recording by regulating a fuzzy set defined by the degree at which the quantity of sate or the control quantity belongs and by determining the control quantity corresponding to each of quantity of states in accordance with a plurality of rules between the quantity of state and the control quantity expressed by the fuzzy set.

In order to achieve the above-described objects, according to the present invention, there is provided an ink jet recording apparatus for performing a recording by discharging ink to a recording medium, the ink jet recording apparatus comprising: a recording head having a discharge port through which ink is discharged; removal means for removing adhered material to the discharge port of the recording head; quantity of state detection means for detecting the quantity of state relating to the state of adhesion of the adhered material to the discharge port; membership function storage means for storing a membership function for regulating the fuzzy set related to the quantity of state and the control quantity for the removal operation; rule storage means for storing a rule relating to the fuzzy set relating to the quantity of state regulated by the membership function stored by the membership function storage means and the fuzzy set relating to the control quantity in accordance with a predetermined inference rule; inference means for obtaining the degree at which the quantity of state detected by the quantity of state detection means belongs to the fuzzy set in accordance with the membership function conforming to the rule stored by the rule storage means calculating the fuzzy set which is the result of the inference of the rule from the obtained degree and the membership function regulating the fuzzy set relating to the control quantity, and obtaining the representative value of the calculated fuzzy set as the control quantity of the removal operation performed by the removal means; and control means for controlling the removal operation performed by the removal means in accordance with the obtained control quantity by the inference means.

According to another aspect of the present invention, there is provided a control method in an ink jet recording apparatus for performing a recording by discharging ink to a recording medium, and having a recording head having a discharge port through which ink is discharged, removal means for removing adhered material to the discharge port of the recording head, quantity of state detection means for detecting the quantity of state relating the state of adhesion of the adhered material to the discharge port, the control method being characterized by: obtaining the degree at which the quantity of sate detected by the quantity of state detection means belong to the fuzzy set in accordance with the membership function and conforming to the rule relating the fuzzy set relating to the quantity of state regulated by the membership function and the fuzzy set relating the control quantity relating to the removal operation in accordance with a predetermined inference rule, calculating the fuzzy set which is the result of the inference of the rule from the obtained degree and the membership function which regulates the fuzzy set relating to the control quantity, obtaining the representative value of the calculated fuzzy set as the control quantity of the removal operation performed the removal means and controlling the removal operation performed by the removal means in accordance with the obtained control quantity.

According to another aspect of the present invention, the degree at which the quantity of state, for example, the ambient humidity of the recording head and the quantity of dust floating in the atmosphere belongs to the fuzzy set is obtained. Then, the most suitable interval can be obtained from the thus obtained degree and the fuzzy set relating to the interval of the control quantity, for example, the adhered material removal operation.

According to another aspect of the present invention, there is provided an image forming apparatus capable of stably forming an image by measuring the quantity of state relating to the image forming and making an inference in accordance with the output representing the result of the measurement.

Other and further objects, features and advantages of the invention will be appear more fully from the following description, and drawings.

BRIEF DESCRIPTION OF THE DRAWINGS

FIG. 6 illustrates a fuzzy rule;

FIG. 21 illustrates a fuzzy rule for controlling the paper feeding interval;

FIG. 25 is a table for illustrating the fuzzy rule;

FIGS. 26(*a*), 26(*b*) and 26(*c*) illustrate the membership function;

FIG. 28 illustrates the membership function in which the estimated time is used as a variable;

FIG. 29 illustrates the membership function of the number of sheets;

FIG. 30 illustrates the fuzzy rule;

FIGS. 36(*a*), 36(*b*) and 36(*c*) are diagrams which illustrate the fuzzy inference in which the fuzzy sets shown in FIG. 35 are used;

FIG. 37 is a schematic view which illustrates a table of a rule for use in the fuzzy inference;

FIG. 39 is a schematic view which illustrates another example of the operation for removing water droplets or the like;

DESCRIPTION OF THE PREFERRED EMBODIMENTS

Preferred embodiments of the present invention will now be described with reference to the drawings.

[First Embodiment]

Figure 1:
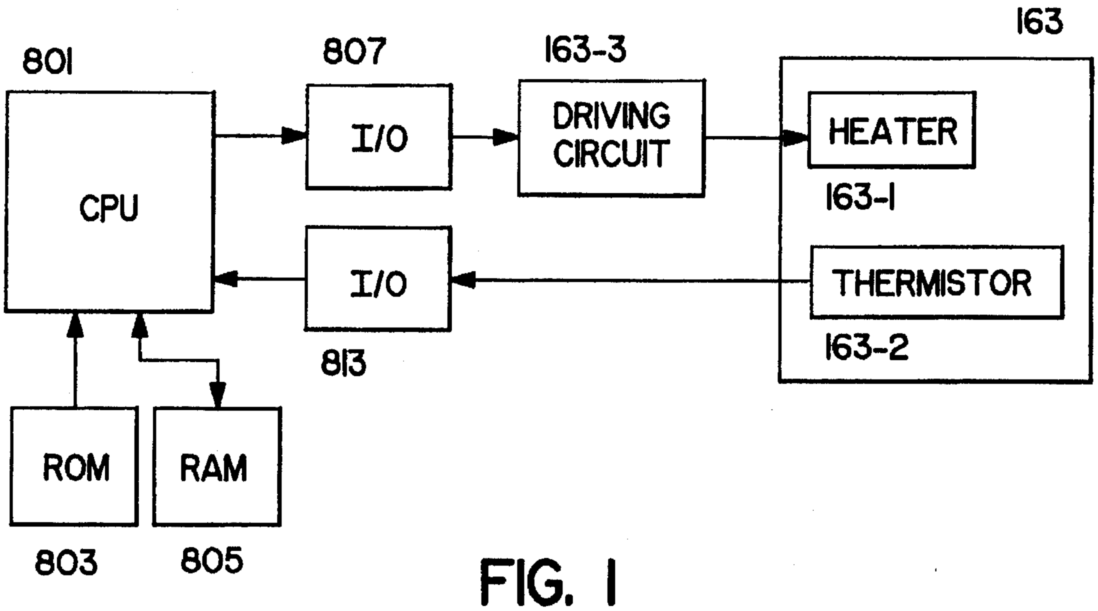
FIG. 1 is a basic block diagram which illustrates a first embodiment of the present invention.

FIG. 1 is a basic block diagram which illustrates an embodiment in which the present invention is applied to a fixing device of an image forming apparatus. Reference numeral 801 represents a CPU to be described later, the CPU 801 actually performing a fuzzy inference. Reference numeral 803 represents a ROM for storing fuzzy rules and membership functions and 804 represents a RAM to be described later, the RAM 804 being used as a working region in which the fuzzy inference is performed. Reference numeral 807 represents an I/O to be described later and 813 represents an A/D converter for converting an analog signal into a digital signal. Reference numeral 163 represents a fixing device for fixing conveyed recording paper by thermal fixing, 163-1 represents a heater for applying the fixing roller, 163-2 represents a thermistor for detecting the temperature of the fixing heater 163-1. Reference numeral 163-3 represents a control circuit for driving the fixing heater 163-1 in response to a command issued from the CPU 801.

Figure 2:
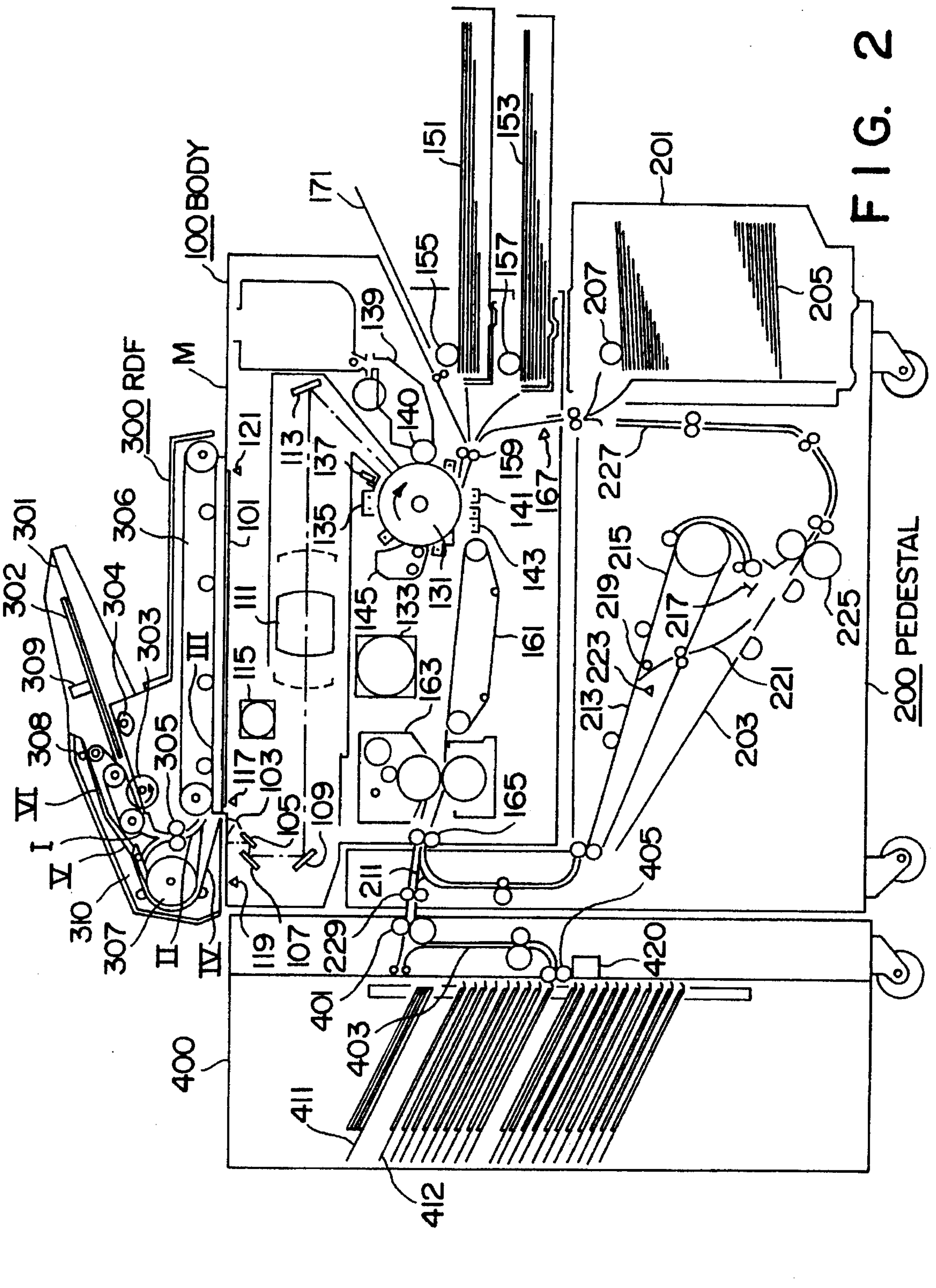
FIG. 2 is an overall structural view which illustrates a copying machine according to the first embodiment.

FIG. 2 illustrates the internal structure of an embodiment of the image forming apparatus according to the present invention. Referring to FIG. 2, reference numeral 100 represents a body having an image-reading function and an image recording function and 200 represents a pedestal having both a function of turning over the recording medium (recording paper) at the time of a two-side recording mode and a multi-recording function capable of recording data a plurality of times on a recording medium. Reference numeral 300 represents a recycling type original feeder (to be called "an RDF" hereinafter) for automatically feeding an original. Reference numerals 400 represents a staple equipped sorter (to be called "a staple sorter" hereinafter). The above-described elements 200 to 400 can be optionally combined with the body 100.

A. Body 100

Referring to the structure of the body 100, reference numeral 101 represents an original retaining glass on which an original is placed, 103 represents an illuminating lamp (an exposing lamp) for illuminating the original and 105, 107 and 109 represent scanning reflecting mirrors (scanning mirrors) for changing the optical path of light reflected by the original. Reference numeral 111 represents a lens having both a focusing function and a power varying function and 113 represents a fourth reflecting mirror (a scanning mirror). Reference numeral 115 represents an optical motor for driving the optical system and 117, 119 and 121 represent sensors for detecting the position of the optical system.

Reference numeral 131 represents a photosensitive drum, 133 represents a main motor for driving the photosensitive drum 131. Reference numeral 135 represents a high-tension unit, 137 represents a blank exposing unit, 139 represents a developer and 140 represents a developing roller. Reference numeral 141 represents a transferring charger, 143 represents a separating charger and 145 represents a cleaning device.

Reference numeral 151 represents an upper cassette, 153 represents a lower cassette, 171 represents a manual paper feeding port. Reference numerals 155 and 157 represent paper feeding rollers and 159 represents a resist roller. Reference numeral 161 represents a conveying belt for conveying recording paper on which an image has been recorded to the fixing side. Reference numeral 163 represents a fixing device for thermally fixing the recording paper which has been conveyed and 167 represents a recording-paper sensor for use at the time of the two-side recording mode.

The surface layer of the photosensitive drum 131 is constituted by a photoconductive material and a seamless photosensitive material made of an electric conductor. The rotation of the photosensitive drum 131, which is so supported as to be capable of rotating, is started by the main motor 133 which is arranged to be operated in response to the depressing of the copy start key to be described later, the rotation being arranged to be in a direction designated by an arrow shown in FIG. 2. After a control process in which the drum 131 is rotated by a predetermined number of revolutions and a process in which the potential of the same have been then completed, the original placed on the original retaining glass 101 is applied with light by the illuminating lamp 103 integrally formed with the first scanning mirror 105. As a result, light reflected by the original is imaged on the drum 131 via the first scanning mirror 105, the second scanning mirror 107, the third scanning mirror 109, the lens 111 and the fourth scanning mirror 113.

The drum 131 is corna-charged by the high-tension unit 135. Then, an image (the image of the original), which has been applied with light from the illuminating lamp 103, is exposed to slit light. As a result, a static latent image is formed on the drum 131 by a known Carson Process.

Then, the static latent image on the photosensitive drum 131 is developed by the developing roller 140 of the developing device 139 so that the static latent image is visualized as a toner image, the formed toner image being then transferred to transfer paper by a transferring charger 141 as described later.

That is, the transfer paper set in the upper cassette 151, the lower cassette 153 or the manual feeding port 171 is fed by the feeding roller 155 or 157 into the apparatus body 100 in which the front portion of the latent image and the front portion of the transfer paper are aligned with each other. Then, the transfer paper is passed between the transferring charger 141 and the drum 131. Then, the toner image formed on the transfer paper is fixed by the fixing device 163 before discharged outside the body 100.

The drum 131 continues its rotation even after it has performed the transferring operation so that its surface is cleaned up by the cleaning device 145 comprising a cleaning roller and an elastic blade.

B. Pedestal 200

The pedestal 200 is arranged detachable from the body 100 and comprising a deck 201 capable of accommodating 2000 sheets and an intermediate tray 203 for the double-side copying operation. A lifter 205 of the deck 201 capable of accommodating 2000 sheets is arranged to be lifted in accordance with the quantity of the transfer paper so that the transfer paper is always brought into contact with a feeding roller 207.

Reference numeral 211 represents a paper discharge flapper for switching a passage for the double-side recording or the multi-recording operation and the passage for the discharge operation. Reference numerals 213 and 215 represent conveyance passage through which the transfer paper is passed by the conveying belt 161. Reference numeral 217 represents an intermediate tray weight for holding the transferring paper. The transfer paper which has passed through the discharge flapper 211 and the conveyance passages 213 and 215 is turned out so as to be accommodated in the intermediate tray 203 for the double-side copying operation. Reference numeral 219 represents a multi-flapper for switching the passage for the double-side recording operation and the multi-recording operation, the multi-flapper 219 being disposed between the conveyance passages 213 and 215. When the multi-flapper 219 is upwards rotated, the transfer paper is introduced into a conveyance passage 215. Reference numeral 223 represents a multi-recording paper discharge sensor for detecting the tail portion of the transfer paper passing through the multi-flapper 219. Reference numeral 225 represents a paper feeding roller for feeding the transfer paper through the passage 227 toward the drum 131. Reference numeral 229 represents a discharge roller for discharging the transfer paper outside the apparatus.

When the double-side recording (double-side copying) or the multi-recording (multi-copying) operation is performed, the discharge flapper 211 of the body 100 is first raised so as to store the transfer paper, to which an image has been copied, in the intermediate tray 203 via the conveyance passages 213 and 215. At this time, the multi-flapper 219 is moved downwards at the time of the double-side recording operation, while the same is raised at the time of the multi-recording operation. The above-described intermediate tray 203 is capable of, for example, 99 transfer paper sheets. The transfer paper which has been stored in the intermediate tray 203 is held by the intermediate tray weight 217.

When the reverse side is recorded or multi-recording is performed, the transfer paper sheets stored in the intermediate tray 203 are one by one introduced into the resist roller 159 of the body 100 via the passage 227 by the actions performed by the paper feeding roller 225 and the weight 217, the above-described introduction of the transfer paper sheets being started from the lowest sheet.

C. RDF (Recycle type Document Feeder) 300

In the RDF 300, reference numeral 301 represents an accumulating tray on which a sheaf 302 of original sheets is placed. When one side of each of the document sheets is copied, the originals are successively separated from the original sheaf 302 by a semicircular roller 304 and a separation roller 303, the above-described separation being started from the lowermost sheet. The thus separated originals are successively conveyed to and stopped at an exposure position on a platen glass 101 through passages I and II by a conveying roller 305 and a full-face belt 306. Then, a copying operation is started. After the copying operation has been completed, the original positioned on the platen glass 101 is sent to a passage V via passages III and IV by a large conveying roller 307. Then, the original is returned to the uppermost position of the original sheaf 302.

Reference numeral 309 represents a recycle lever for detecting one cycle of the original in such a manner that the recycle lever 309 is placed on the original sheaf 302 at the time of the start of the feeding of the original and it falls by its dead weight on to the accumulating tray 301 when the end portion of the final original sheet passes through the recycle lever 309.

When the both sides of each of the original sheets are copied, the original is, as described above, temporarily introduced from the passage I and II to the passage III. After the copying operation has been completed, the front portion of the original is introduced into the passage by switching a switching flapper 310 arranged to be turned. Then, the original is conveyed to and stopped at the position on the platen glass 101 by the full-face belt 306 via the passage II. That is, the original is turned out by the rotation of the large conveying roller 307 through a route from the passage III to II via the passage IV.

Furthermore, the number of the original sheets can be counted by successively conveying the original sheaf 302 through the passage I, II, III, IV, V and IV until one recycle is detected by the recycle lever 309.

D. Staple Sorter (Stapler equipped Sorter) 400

The staple sorter 400 includes a fixed non-sort tray 411 having 20 bins and performing the sorting operation.

In a sort mode, the sheets each to which an image has been copied are successively discharged from the discharge roller 229 so as to be introduced into a conveying roller 401 of the sorter 400. Whenever the sheets are discharged into each of the bins of the tray 412 from the discharge roller 405 after they have passed through the conveying passage 403, each of the bins are vertically moved by a bin shift motor (omitted from illustration) so that the sheets are sorted. When a staple mode has been selected and a staple signal is thereby supplied from the body 100, a staple device 420 staples the sheets in each of the bins with successively moving the bins.

Figure 3A:
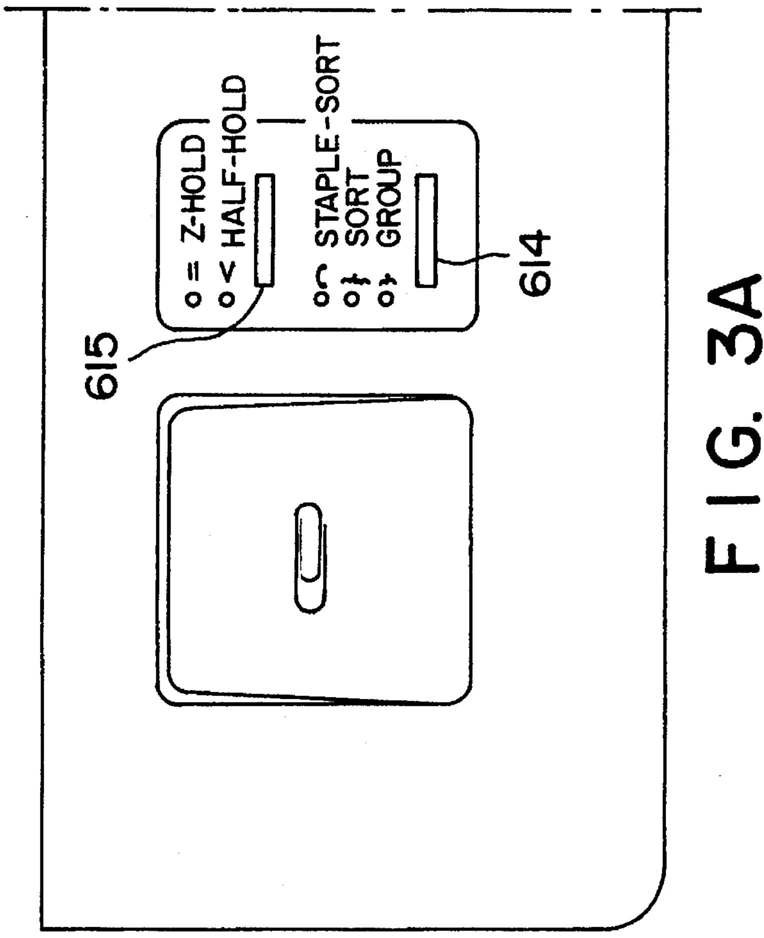
FIGS. 3A, 3B and 3C illustrate the appearance of the control panel of the copying machine according to the first embodiment of the present invention.
Figure 3:
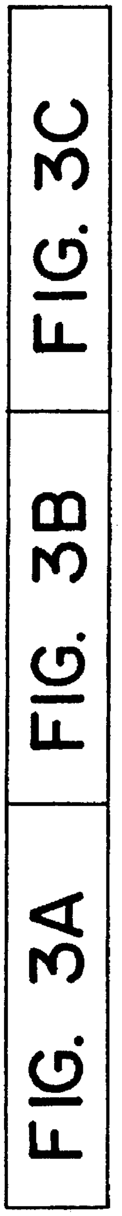
Figure 3B:
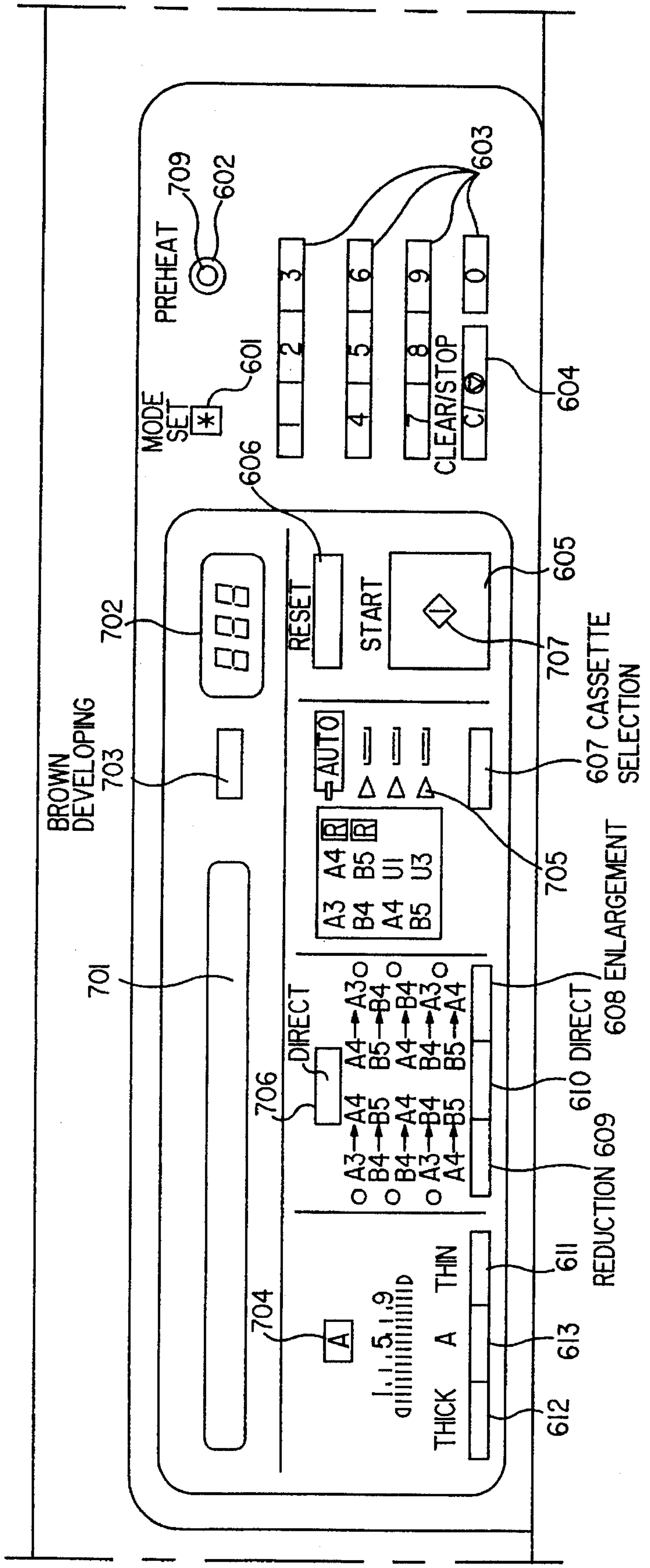
Figure 3C:
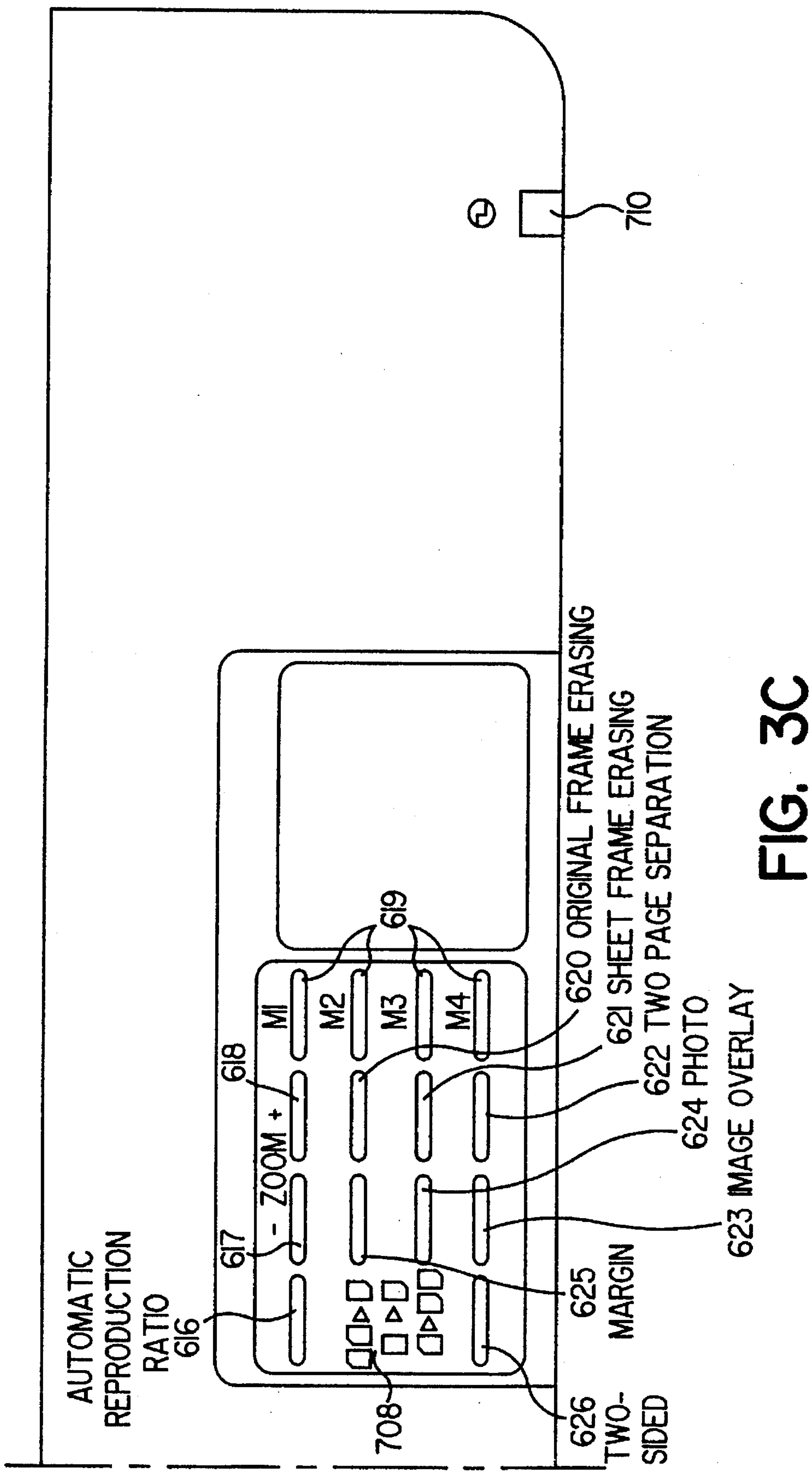

FIG. 3 illustrates an example of the structure of the control panel provided for the body 100. The control panel comprises the following key group 600 and a display group 700:

E. Key Group 600

Referring to FIG. 3, reference numeral 601 represents an asterisk (*) key which is used in a setting mode in which an operator (a user) sets a binding margin or the eliminating size of the frame of the content. Reference numeral 606 represents an all reset key which is pressed when operation is returned to a standard mode. Reference numeral 602 represents a preheating key with which the apparatus can be brought into a preheated state, the key 602 being also pressed when an auto-shutoff state is cancelled and the operation is returned to the standard mode.

Reference numeral 605 represents a copy start key which is pressed when the copying operation is started.

Reference numeral 604 represents a clear/stop key serving as a clear key at the time of standby, while it serves as a stop key during the copying/recording operation. The clear key used when the number of copies which has been set previously is cancelled. The stop key is used when a successive copying operation which has been set previously is cancelled, the copying operation being stopped after the copying of the sheet, at the moment when the stop key is pressed, has been completed.

Reference numeral 603 represents a ten key which is pressed when the number of copies is set, the ten key 603 being also used when the asterisk * mode is set. Reference numeral 619 represents a memory key with which modes which are frequently used by the user can be registered, where it is arranged that four modes M1 to M4 can be registered according to this embodiment.

Reference numerals 611 and 612 represent copying density keys with which the copying density can be adjusted manually. Reference numeral 613 represents an AE key which is used when the copying mode is desired to be automatically adjusted or the AE (automatic density adjustment) is cancelled and the density adjusting mode is switched to a manual mode. Reference numeral 607 represents a cassette selection key which is used any of the upper cassette 151, the intermediate cassette 153 or the lower paper deck 201. Furthermore, the key 607 enables an APS (Automatic Paper cassette Selection) can be selected when the original is positioned on the RDF 300. When the APS has been selected, the cassette of the same size as that of the original can be automatically selected.

Reference numeral 610 represents an equal magnification key which is pressed when the same magnification (full scale) copying is desired to be performed. Reference numeral 616 represents an automatic magnification varying key with which the image on the original can be automatically contracted or enlarged in accordance with the size of the specified transfer paper.

Reference numeral 626 represents a double-side key which is pressed when double side copy is desired to be obtained from a one-side original, double-side copy is desired to be obtained from a double-side original or one-side copy is desired to be obtained from a double-side original. Reference numeral 625 represents a binding margin key with which a binding margin of a specified length can be formed on the left side of the transfer paper. Reference numeral 624 represents a photograph key which is used when a photograph original is copied. Reference numeral 623 represents a multi-printing key which is pressed when images on respective two originals are formed (synthesized) on one side of the transfer paper.

Reference numeral 620 represents a document frame eliminating key which is pressed when the frame of a regular size original is eliminated by the user. At this time, the size of the original is set by pressing the asterisk key 601. Reference numeral 621 represents a sheet frame eliminating key which is pressed when the frame of the original is eliminated in accordance with the size of the cassette.

Reference numeral 614 represents a paper discharge method selection key for selecting the paper discharge method from the staple, sort and group discharge. Thus, either the staple mode or a sort mode can be selected or cancelled and with which either the sort mode and a group mode can be selected or the selected sort mode or the group mode can be cancelled in the case where a sorter has been connected to the apparatus.

Reference numeral 615 represents a sheet holding mode selection key with which a z-holding mode in which an A3 or B4 size recording paper sheet on which an image has been recorded can be held z-shaped or a halving mode in which the same can be held half can be selected or cancelled.

F. Display Group 700

Referring to FIG. 3, reference numeral 701 represents a message display of an LCD (Liquid Crystal Display) type for displaying information concerning the subject copying operation. For example, a message formed by 40 characters, each of which is constituted by 5×7 dots, can be displayed or the copy magnification set by regular magnification varying keys 608, 609, the equal magnification key 610 and zoom keys 617 and 618 can be displayed. The display 701 is a semipermeable type liquid crystal display comprising a bicolor backlight arranged in such a manner that a green backlight is turned on and an orange backlight is turned on in an abnormal state or when the copying operation cannot be performed.

Reference numeral 706 represents an equal-magnification model display which is turned on when the equal-magnification mode is selected. Reference numeral 703 represents a color developing device display which displays the number of the copies or the self-diagnosis code. Reference numeral 705 represents a cassette display which displays the cassette selected among the upper cassette 151, the intermediate cassette 153 and the lower cassette 201.

Reference numeral 704 represents an AE display which is turned on when the AE (automatic density adjustment) is selected by the AE key. Reference numeral 709 represents a pre-heating mode display which is turned on when a double-side copy is desired to be obtained from a double-side original or a double-side copy is desired to be obtained from a double-side original.

When the RDF 300 is used in the standard mode, the following setting is automatically made: one sheet copying, the AE copying density mode, the automatic paper selection, the equal magnification and the one side coping from a one-side original. On the other hand, when the RDF 300 is not used in the standard mode, the following setting is automatically made: one sheet copying, the manual density setting mode, the equal magnification mode and one side copying from a one-side original. The fact whether or not the RDF 300 is used can be determined whether or not an original is set in the RDF 300.

Reference numeral 710 represents a power lamp which is turned on when a power supply switch (omitted from illustration) is switched on.

G. Control Device 800

Figure 4:
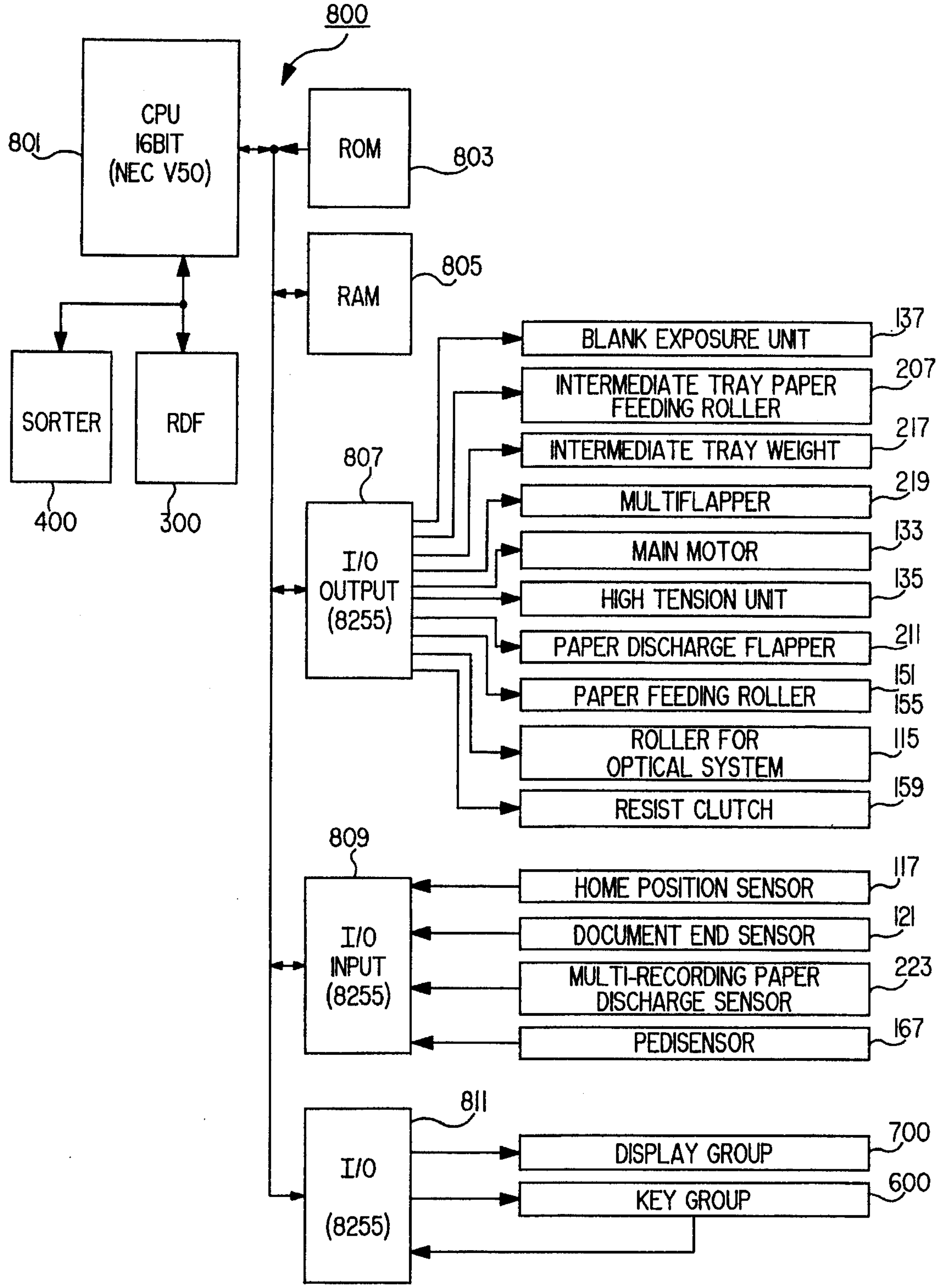
FIG. 4 is a circuit diagram of a control device according to the first embodiment of the present invention.
Figure 5A:
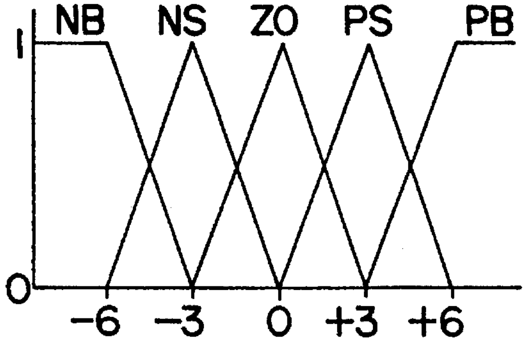
FIGS. 5(*a*), 5(*b*), 5(*c*) and 5(*d*) illustrate membership functions.
Figure 5B:
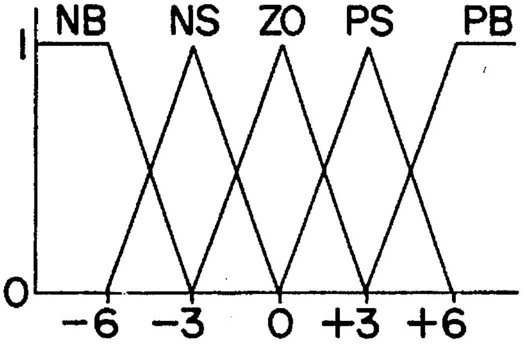
Figure 5C:
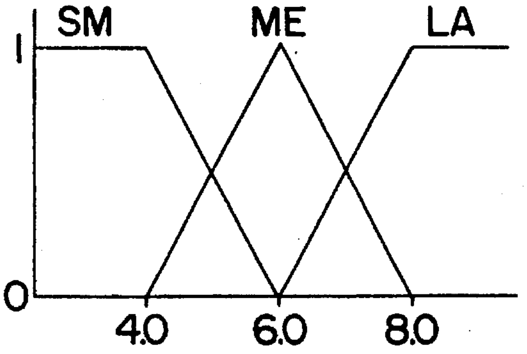
Figure 5D:
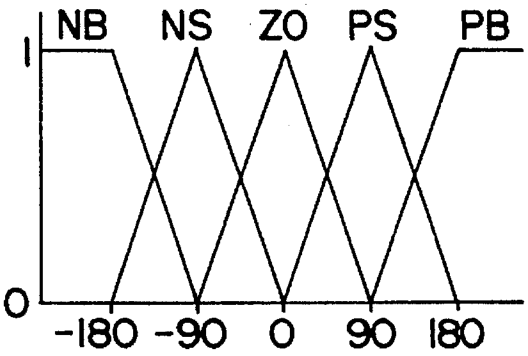

FIG. 4 illustrates the structure of a control device 800 according to the embodiment shown in FIG. 2. Referring to FIG. 4, reference numeral 801 represents a CPU (a Central Processing Unit) for performing calculations and controls for the purpose of executing the present invention, the CPU 801 comprising, for example, a 16-bit microcomputer. Reference numeral 803 represents a ROM (Read Only Memory) in which a control program according to the present invention has been previously stored. The CPU 801 controls each of the component devices stored in the ROM 803. Reference numeral 805 represents a RAM (Random Access Memory) serving as a main memory in which supplied data is stored or which serves as a storage for the operation.

Reference numeral 807 represents an interface (I/O) for transmitting an output control signal from the CPU 801 to loads such as a main motor 133. Reference numeral 809 represents an interface for transmitting an input signal for receiving a signal supplied from the document end sensor 121 or the like and transmitting it to the CPU 801. Reference numeral 811 represents an interface for controlling the input and the output to and from the key group 600 and the display group 700. For example, I/O circuit ports μPD 8255 manufactured by NEC are employed as the above-described interfaces 807, 809 and 811.

The display group 700 comprises the displays shown in FIG. 3 and is arranged to comprise, for example, LEDs (Light Emitting Diodes) or LCDs (Liquid Crystal Displays). The key group 600 comprises the keys shown in FIG. 3 and is arranged in such a manner that the key which is pressed can be detected by the CPU 801 in accordance with a know key matrix.

H. Operation Example

Then, the temperature control operation in the case where the present invention is applied to the fixing device of the image forming apparatus will now be described.

As for the quantity of state for the temperature control, the following three quantities of control are used:

(1) the deviation between the desired temperature and the present temperature;

(2) the gradient of temperature which is the degree of a change in temperature per unit time; and (3) the area of paper.

Furthermore, room temperature, the number of paper sheets which has been set, the density of a copy, the size of paper and/or the period for allowing to stand may be employed.

On the other hand, as for the quantity of control at the time of performing the temperature control, the following quantity of control is employed:

(4) The time in which a heater 163-1 is turned on.

However, the desired temperature to which the fixing device is brought, the copying interval and/or the speed of a fan for discharging heat due to the fixing operation may be controlled.

FIG. 5 illustrates fuzzy sets called the membership functions of the above-described quantities of states and the quantity of control (1) to (4). The temperature deviation, the temperature gradient, the area of the paper and the time in which the heater is turned on are divided into a certain number of large sets. For example, the temperature deviation is classified into the following degrees:

(1) NB (Negative Big) negative value having large absolute value (2) NS (Negative Small) negative value having small absolute value (3) ZO (Zero) in the vicinity of zero (4) PS (Positive Small) Positive value having small absolute value (5) PB (Positive Big) Positive value having large absolute value The present invention is not limited to the above-described method of classification. For example, it may be classified into 7 degrees. According to this embodiment, the degree of each of the sets is expressed by the values from 0 to 1. Referring to FIG. 5, (a) represents the membership function of the temperature deviation, (b) represents the membership function of the temperature gradient, (c) represents the membership function of the area of the sheets which pass through the fixing device per unit time, and (d) represents the membership function of the time in which the heater is turned on.

In the case where (a) ZO, the degree of belonging to the set ZO is 1.0 when the temperature deviation is 0° C. The degree of belonging to the set ZO is 0.5 when the temperature deviation is 1.5° C. or −1.5° C. The other cases are similarly arranged to the description made above.

Then, the method of obtaining the time in which the heater is turned on from the quantity of state of the temperature deviation, the temperature gradient and the area of paper will now be described.

The time in which the heater is turned on is determined by using, for example, the following fuzzy rules. In order to simplify the description, the following two rules are employed:

(Rule 1)

IF temperature deviation=PB and temperature gradient=ZO and paper area=ME then heater ON time=PB (Rule 2)

IF temperature deviation=PS and temperature gradient=ZO and paper area=ME then heater ON time=PS As described above, the fuzzy rules are determined at need. The rules can be properly set from the experienced and experiments. They may be set at random or in accordance with a proper algorithm.

The portion on and after the term "If" is the conditional portion, while the portion on and after the term "then" is the conclusion portion.

Eleven fuzzy rules including the above-described two rules according to this embodiment are shown in FIG. 6.

Figures 7A, 7B, 7C:
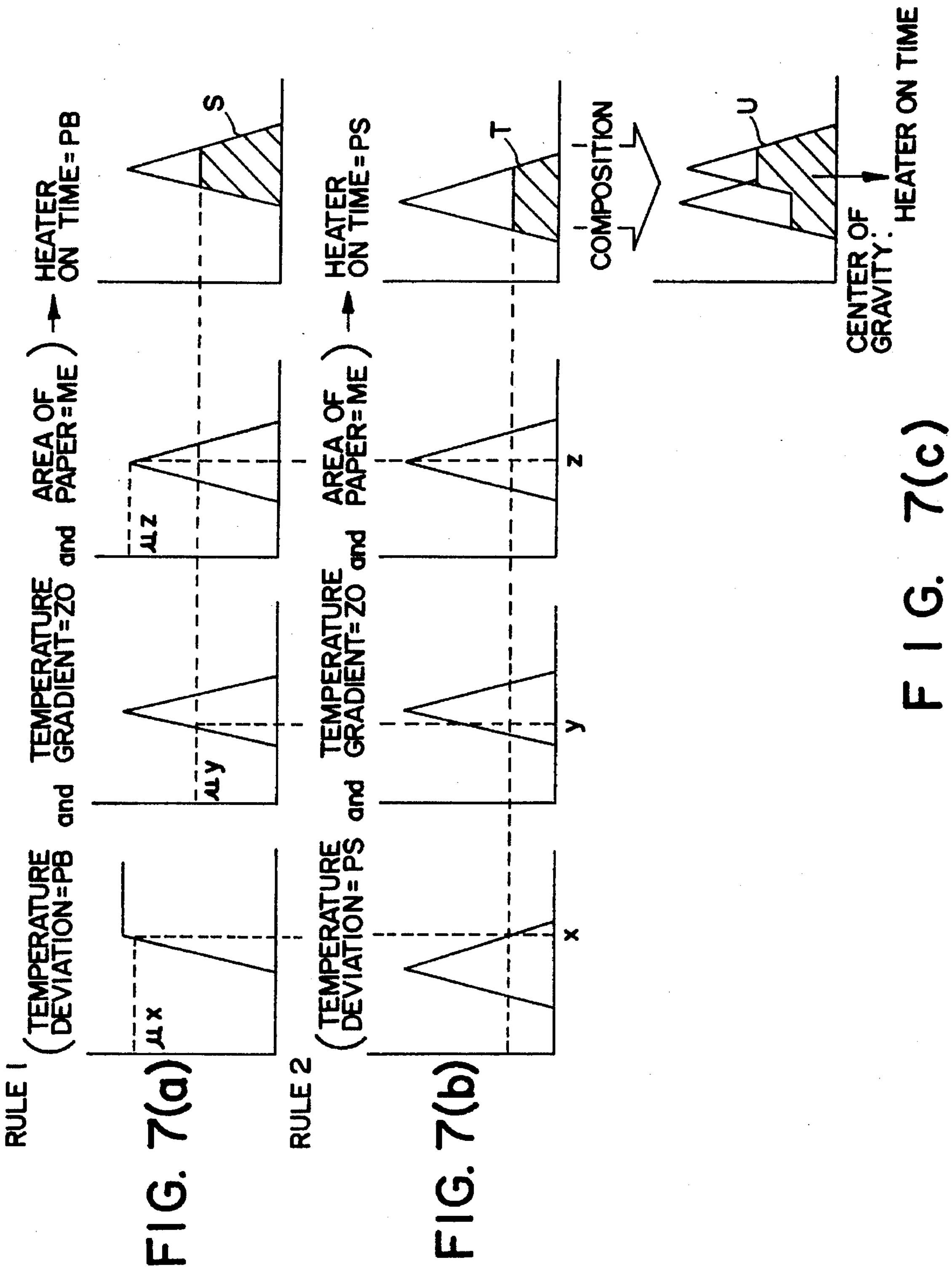
FIGS. 7(*a*), 7(*b*) and 7(*c*) illustrate the method of making a fuzzy inference.

FIG. 7 illustrates an example of a method of calculating the time in which the heater is turned on in accordance with the fuzzy inference using the above-described rule 1 and rule 2.

It is assumed that the temperature deviation=x and the temperature gradient=y.

In the rule 1, input x is included in the set PB by degree μx in accordance with the membership function of the temperature deviation. Input y is included in the set ZO by degree μy in accordance with the membership function of the temperature gradient. Input z is included in the set ME by degree μz in accordance with the membership function of the area of paper. Then, the minimum value of each of μx, μy and μz is calculated and the thus obtained values are the degrees that the conditional portion of the rule 1 is satisfied. The results of the MIN (minimum value) operation of the above-described values and the membership function of the time in which the heater is turned on becomes as illustrated by a trapezoid designated by hatch S. Also in the rule 2, similar operations are performed so that a trapezoid designated by hatch T. It can be considered that the areas of the trapezoids shows the probability of the quantity of control to be deduced by the rule.

Then, the maximum value of each of the set S and set T is obtained so as to form a novel set designated by hatch U. The value obtained by calculating the center of gravity of the thus formed set is determined to be the time in which the heater is on and which is obtained by the fuzzy inference. That is, the intersection of the perpendicular passing through the center of gravity and the axis of abscissa is the quantity of control to be obtained. All of the fuzzy rules shown in FIG. 6 are subjected to the above-described operation.

As an alternative to the center of gravity, the averages of the quantity of control obtained from the corresponding rules may simply be obtained. Furthermore, the position which bisects the area of the synthesized figure U may be obtained.

Figure 8:
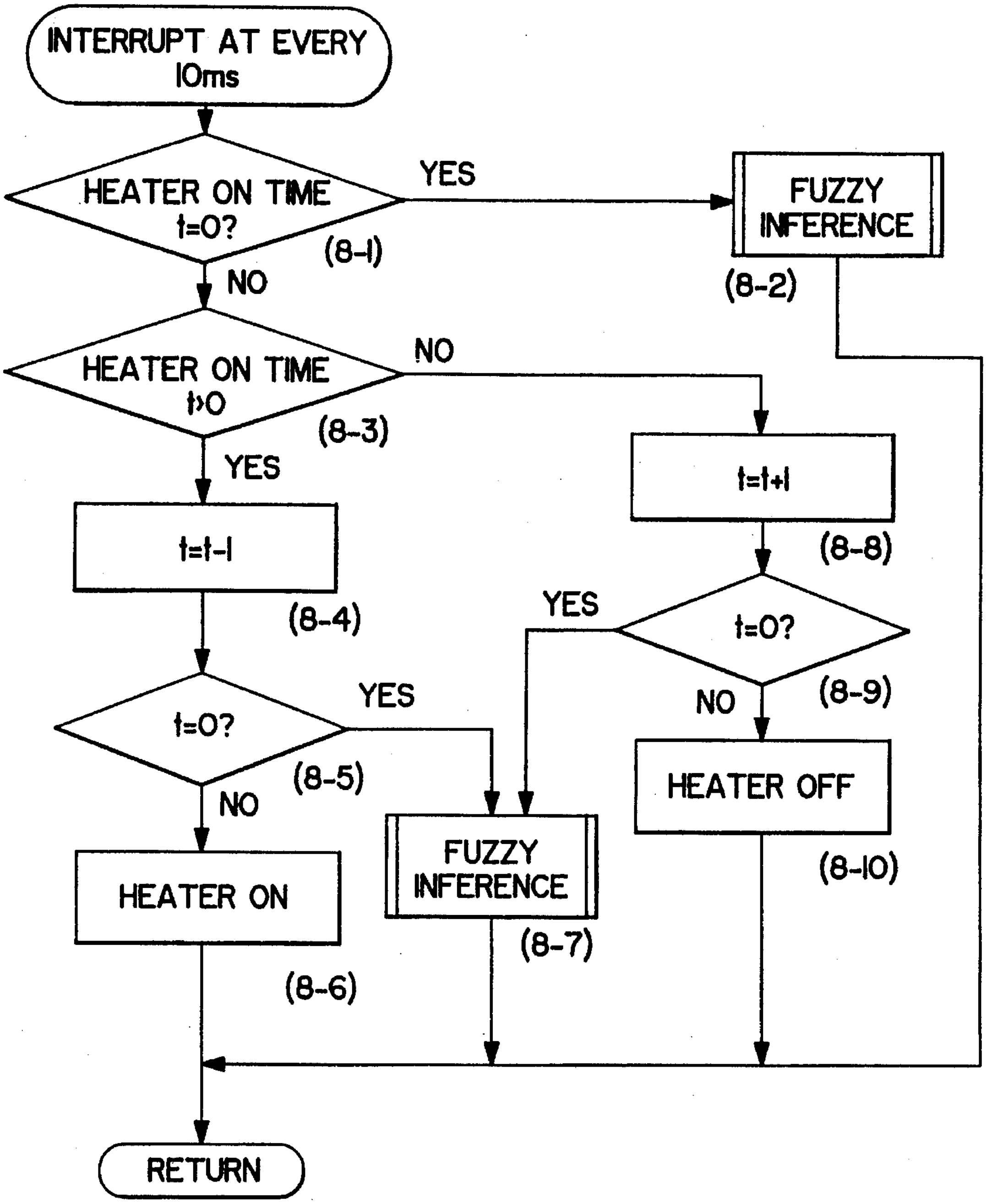
FIG. 8 is a flow chart for an interruption operation.

Then, the flow of the operation according to the present invention will now be described with reference to FIG. 8, where a flow chart of an interruption processing by pulses generated at every 10 ms.

Figure 9:
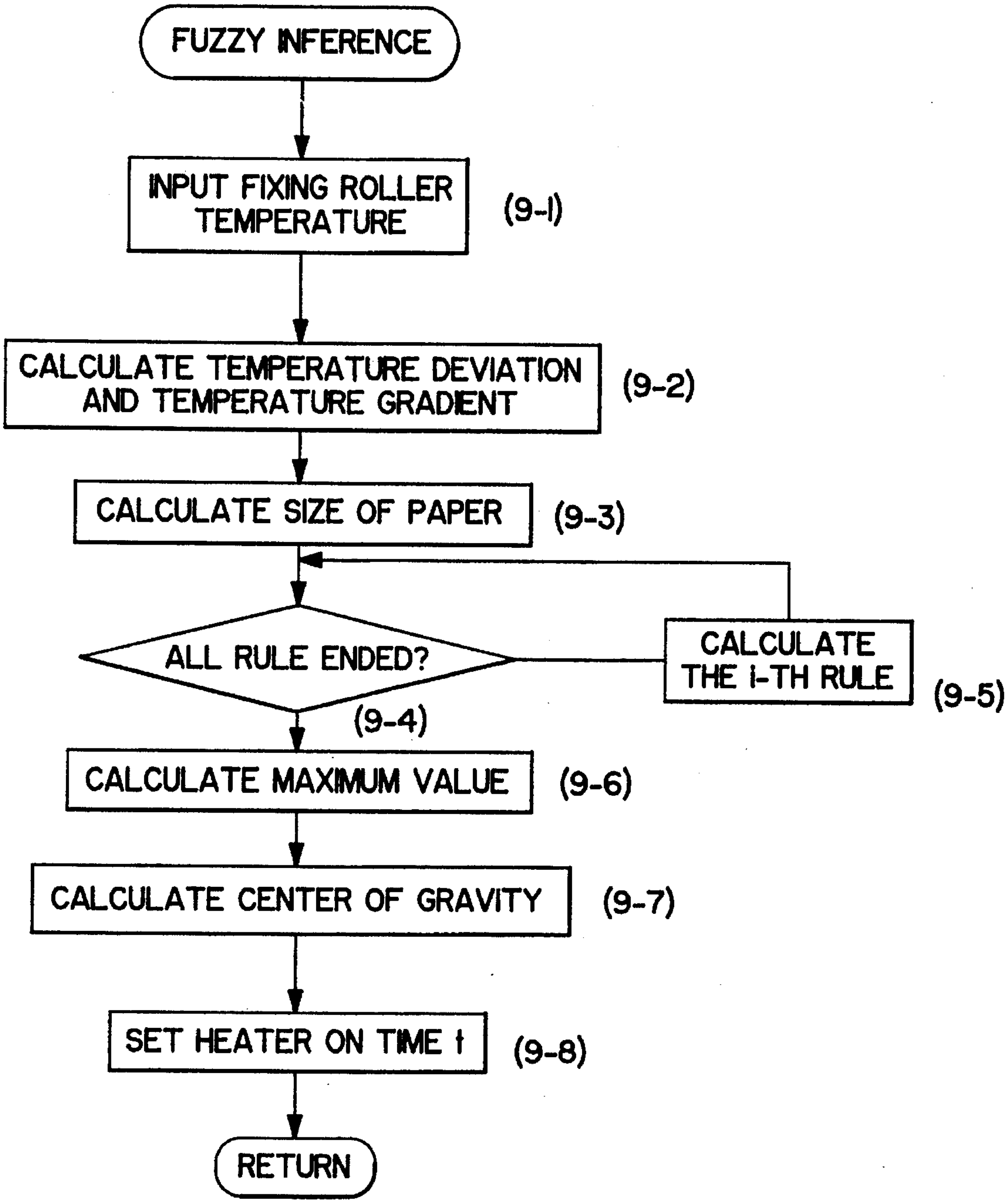
FIG. 9 is a flow chart for use in a case where the present invention is applied to a fixing device.
Figure 10:
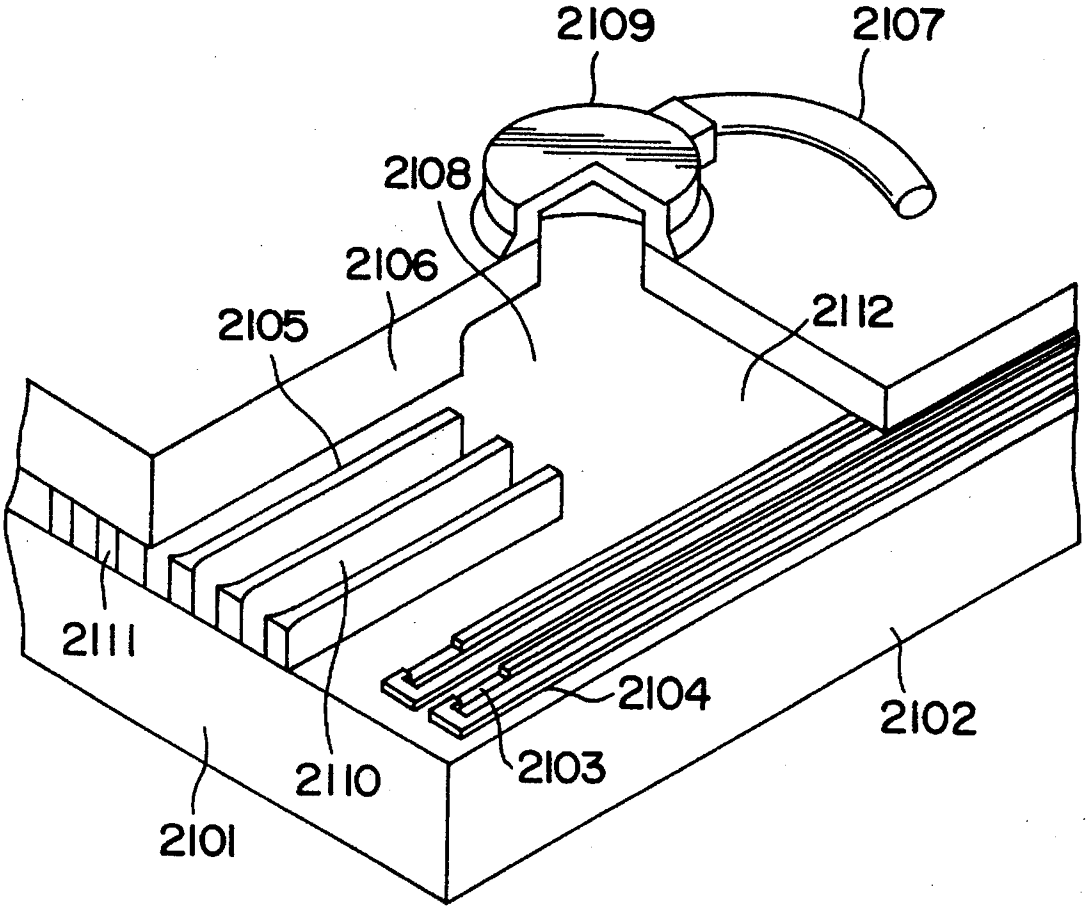
FIG. 10 is a perspective view which illustrates a recording head of an ink jet recording apparatus to which the present invention can be applied.

First, in (8-1), it is determined whether or not time t in which the heater is turned on and which is set in FIG. 9 is zero. If it is determined that t is zero, a fuzzy inference sub-routine for setting the time t in which the heater is turned on is called in accordance with the fuzzy inference before the flow returns.

If it is determined that t is not zero in (8-1), it is then determined that the time t in which the heater is turned on is positive or negative (8-3). If it is determined that t is positive, the value of t is subtracted by one (8-4). Then, it is determined whether or not the time t in which the heater is turned on is zero (8-5). If it is determined that t is zero, the fuzzy inference sub-routine is called before the flow returns. If it is determined in (8-5) that t is not zero, the heater is turned on before the flow returns.

If it is determined, in (8-3), that the time t in which the heater is turned on is negative, the value of t is added by one (8-8). Then, it is determined whether or not the time t in which the heater is turned on is zero (8-9). If it is determined that t is zero, the fuzzy inference sub-routine (8-7) is called before the flow returns. If it is determined in (8-9) that t is not zero, the heater is turned off (8-10) before the flow returns.

Then, the flow of the fuzzy inference sub-routine operation will be described with reference to a flow chart shown in FIG. 9.

First, the temperature of the fixing roller is measured by the thermistor 163-2 (9-1), the deviation of the present temperature from desired temperature and the temperature gradient which is the temperature change in unit time are calculated (8-2).

Furthermore, the area of paper instructed by a user or with the RDF 300 is calculated (8-3).

Then, in (8-4) and (8-5), the degree of the quantity control belonging to the fuzzy set is calculated in accordance with the degree of the quantity of state belonging to the fuzzy set by the above-described method and in accordance with each of all the fuzzy rules shown in FIG. 6. The maximum value of the set belonging to each of the rules is calculated (8-6), and the most probable quantity of control is calculated by obtaining the center of gravity (8-7). Then, the thus obtained center of gravity is set as the time t in which the heater is turned on (8-8).

The time t in which the heater is turned on is used when the time in which the heater is turned on is controlled with the interruptions every 10 ms, t being therefore set to be values in a unit of 10 ms.

As described above, according to this embodiment, time in which power is supplied to the heating means is lengthened if the temperature deviation is large, the temperature gradient is moderate and the area of paper is large. When all of the temperature deviation, the temperature gradient and the area of paper are intermediate levels respectively, the time in which power supplied to the same is arranged to be intermediate period. When, the temperature deviation is small, the temperature gradient is steep and the area of paper is small, the time in which power is supplied to the heating means is shortened.

As described above, according to this embodiment, the quantity of control of an image forming apparatus such as a copying machine, a laser printer, an ink jet printer or the like can be deduced from the quantity of states which complexly relates to one another, the above-described image forming apparatus being changed excessively due to the environmental change and the relationship between the quantity of state and the quantity of control of which is controlled by a fuzzy relationship. Therefore, an image can be formed in accordance with the environment. Therefore, the power consumption in the image forming apparatus can be reduced and paper feeding jam or paper damage or the like can be prevented. Furthermore, since the process control or the like can be conducted most properly, the quality of an image can be improved and the reliability in forming an image can be successively improved.

In particular, in the case where the present invention is applied to a fixing device, the electric power consumption of it can be reduced satisfactorily. Furthermore, the fixing device can be constituted by elements which has no heat resistant characteristics. Furthermore, the fixing facility can be improved although the environment varies considerably, causing the quality of the image to be improved. As a result, a satisfactory reliability can be obtained.

The present invention is not limited to the fuzzy rules and the membership functions according to this embodiment. Therefore, the type and the number of the rules and the functions may be varied in accordance with the process arranged to be performed in the image forming apparatus and an accuracy required to be realized in the apparatus. The fuzzy sets (the set of the membership functions) stored in the above-described function storing means at that time may be changed by, for example, an instruction through the operation panel shown in FIG. 3. The change of the fuzzy sets can be performed by, for example, storing the membership functions which can be adapted to each of the cases in an IC card serving as an external storage device and by causing data stored in the IC card to be read by the above-described function storage means. Furthermore, if a multiplicity of IC cards are manufactured in consideration of a variety of factors (fuzzy factors) such as temperature and humidity tendency depending upon the nations and the type of paper and toner which influence the quantity of control, they can be selected in accordance with the conditions such as the region or the season.

Furthermore, the above-described inference means may be arranged to calculate the most suitable quantity of control at the time of the actual control. Another structure may be employed in which the results which has been previously calculated in accordance with the quantity of state and the fuzzy sets are stored in the ROM table so as use is after retrieving them.

Although the description has been made about a process in which an image of an electronic photograph is formed according to the above-described embodiment, the image forming process according to the present invention is not limited to the above-described description. For example, the fuzzy inference may also be applied to a process, in which ink discharged on to a recording medium is dried, performed in an ink jet recording apparatus. That is, the fuzzy inference can be applied to a case where the time in which hot air is supplied is controlled.

Although the fixing process is described as an example of the process according to the above-described embodiment, the fuzzy inference according to the present invention can be applied to control a variety of factors such as the charge time in charging means, exposure time in exposing means, transferring speed of transferring means, paper supplying speed of paper supply means and conveying speed of conveying means.

The present invention can, of course, be applied not only to a monochrome image forming apparatus but also to a color image forming apparatus.

[Second Embodiment]

Figure 11:
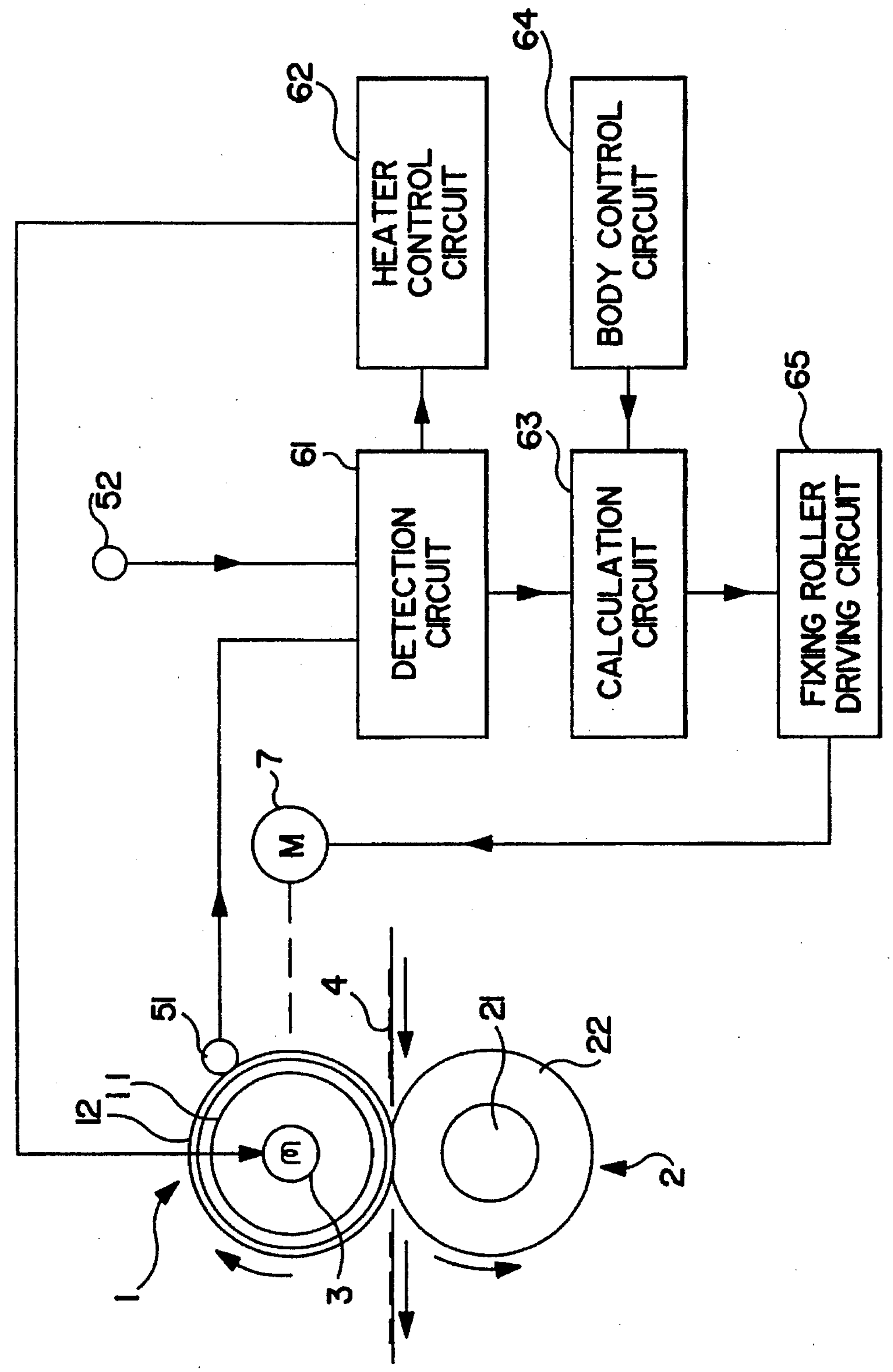
FIG. 11 is a cross sectional view which illustrates the fixing device according to a second embodiment of the present invention.

FIG. 11 illustrates a second embodiment of the fixing device according to the present invention. Reference numeral 1 represents a fixing roller which rotates in a direction designated by an arrow. The fixing roller 1 includes a separation layer 12 (which is in general made of silicone rubber, a fluoro-resin or the like) formed on a metal core 11 (which is in general made of a metal such as aluminum, stainless steel or the like). The fixing roller 1 includes a heater 3 so that the surface of the fixing roller 1 is heated up to a desired temperature.

A pressure applying roller 2 rotates in a direction designated by an arrow and comprises an elastic layer 22 (constituted by a silicon rubber layer, a fluoro-resin layer or the like) formed on a metal core (which is made of the above-described metal). A recording paper sheet 4 for supporting a toner image progresses in a direction designated by an arrow before it is heated and applied with pressure by the fixing roller 1 and the pressure applying roller 2 respectively so that it is fixed. The surface temperature (Tu) of the fixing roller 1 is detected by a temperature sensor 51 (which in general comprises a thermistor) and the thus detected result is supplied to a detection circuit 61. In accordance with the thus supplied value, a heater control circuit 62 controls the turning on/off of the heater 3. Also an output from a temperature sensor 52 for measuring the ambient temperature ($T_E$) is supplied to the detection circuit 61. Furthermore, values $T_F$ and $T_E$ are supplied to an calculating circuit 63.

On the other hand, the state of the apparatus, that is, estimated time (H) taken from the power supply to the apparatus and outputted in accordance with the result of the calculations supplied to the calculating circuit 63 is supplied to a fixing roller driving circuit 65. As a result, a fixing roller driving motor 7 is controlled.

The flow for controlling the previous rotation is arranged as described above. Although the copying operation is omitted from the illustration, the fixing roller driving circuit 65 controls the fixing roller driving motor 7 in response to a signal supplied from a control circuit 64.

Figure 12A:
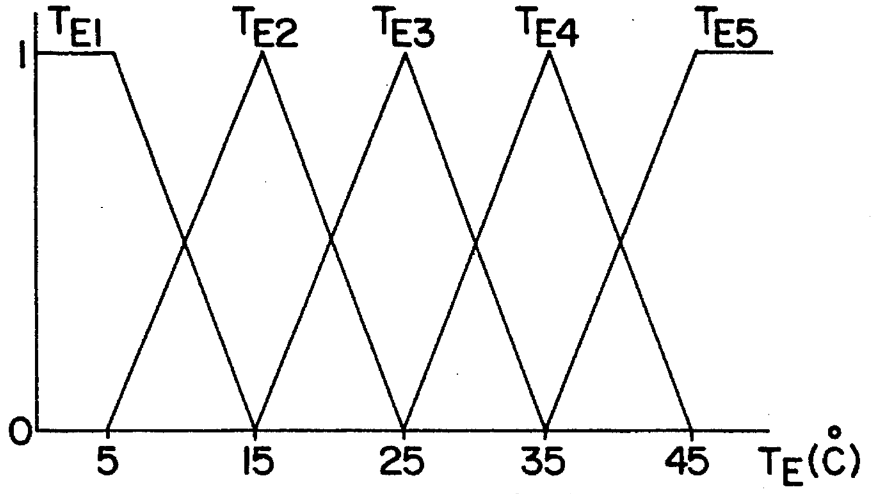
FIGS. 12(*a*), 12(*b*) and 12(*c*) illustrate membership functions according to the second embodiment of the present invention.
Figure 12B:
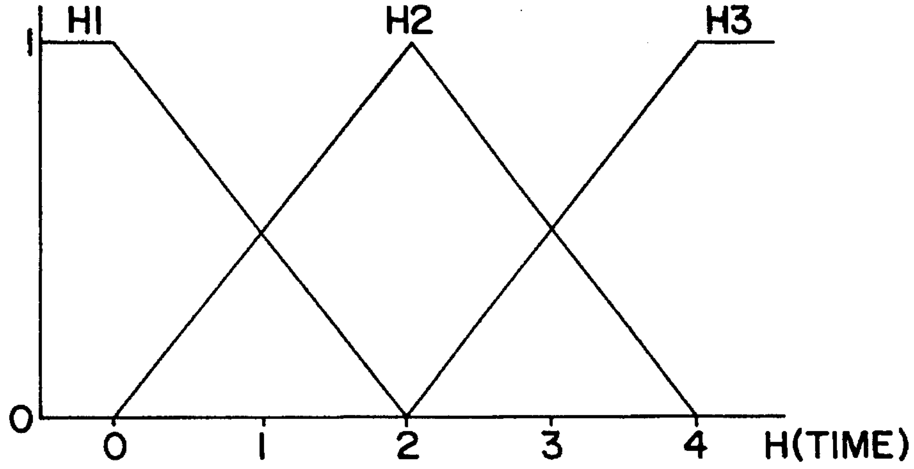
Figure 12C:
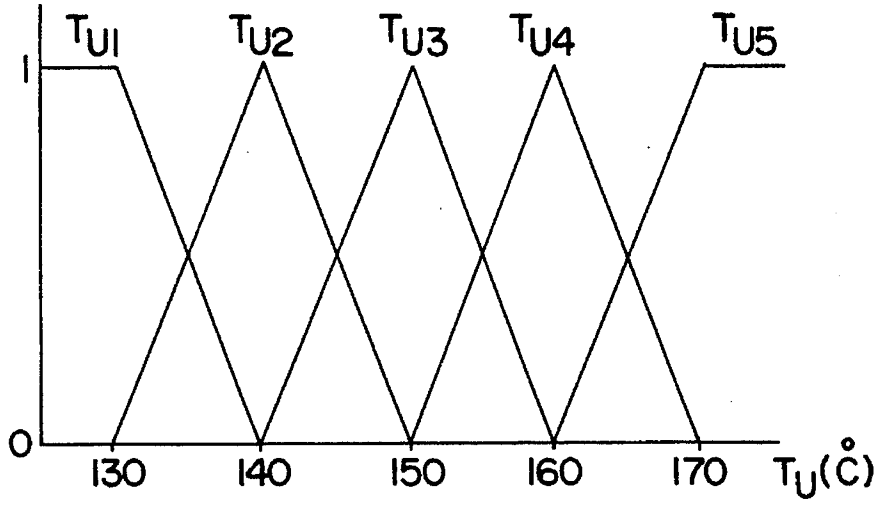
Figures 1, 13A:
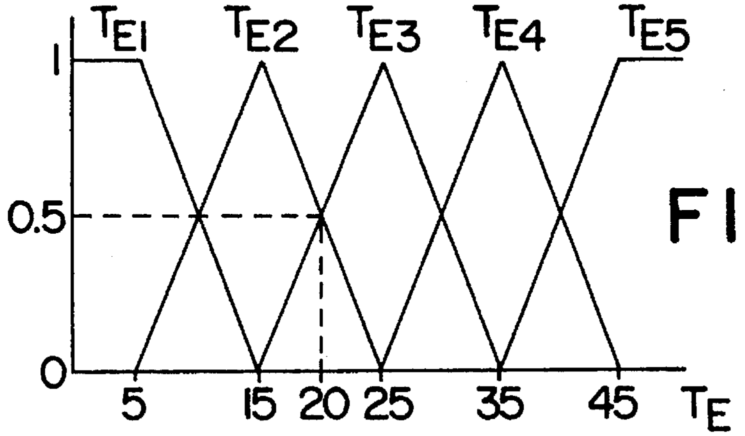
Figures 2, 13A:
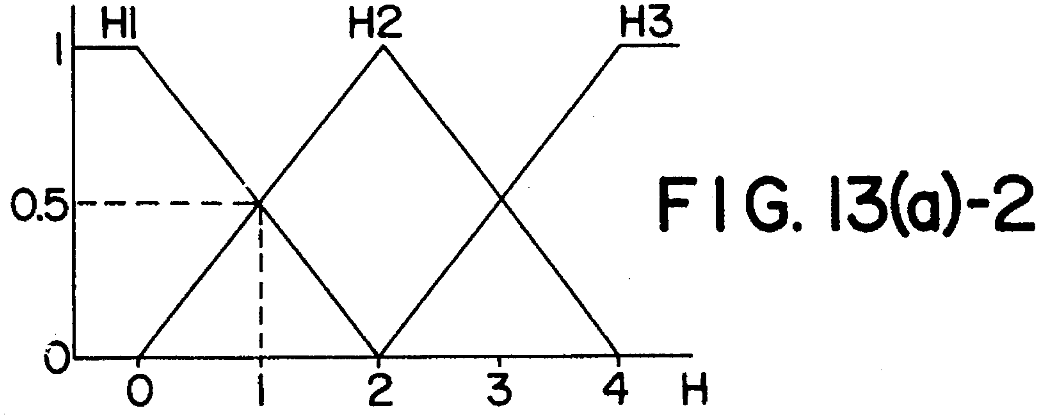
Figures 3, 13A:
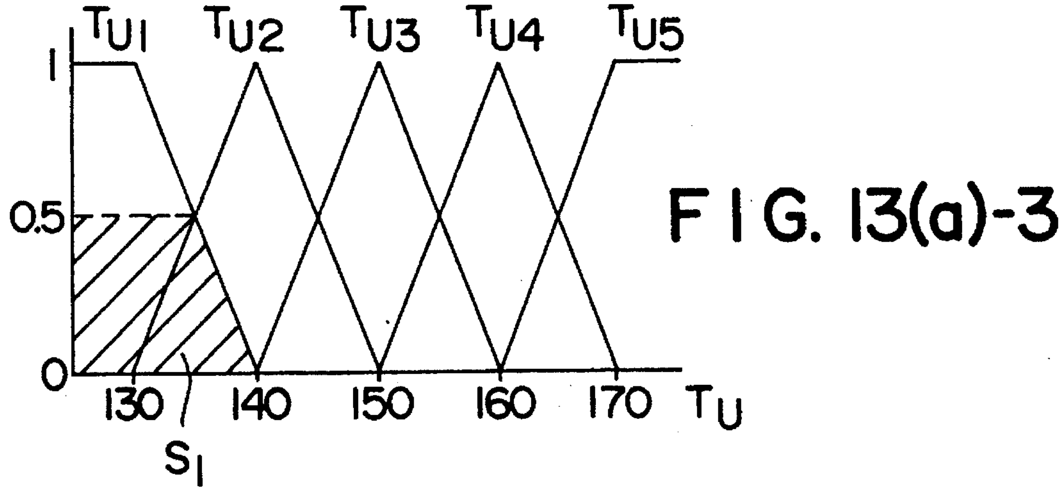
FIGS. 13(*a*)-1, 13(*a*)-2, 13(*a*)-3, 13(*b*)-1, 13(*b*)-2, 13(*b*)-3 and 14 illustrate the fuzzy operation.
Figures 1, 13B:
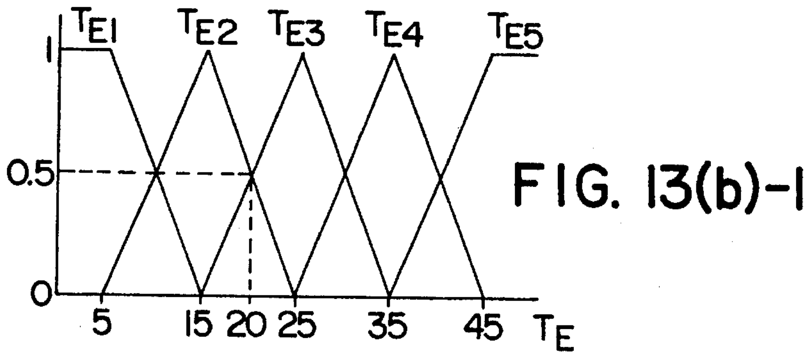
Figures 2, 13B:
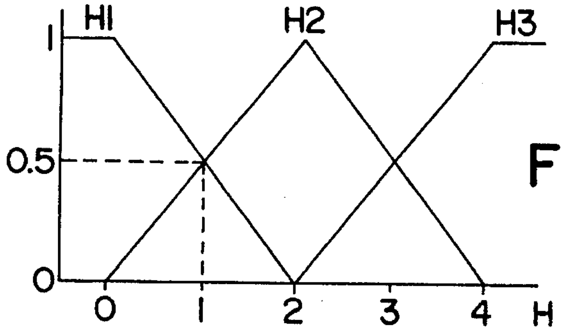
Figures 3, 13B:
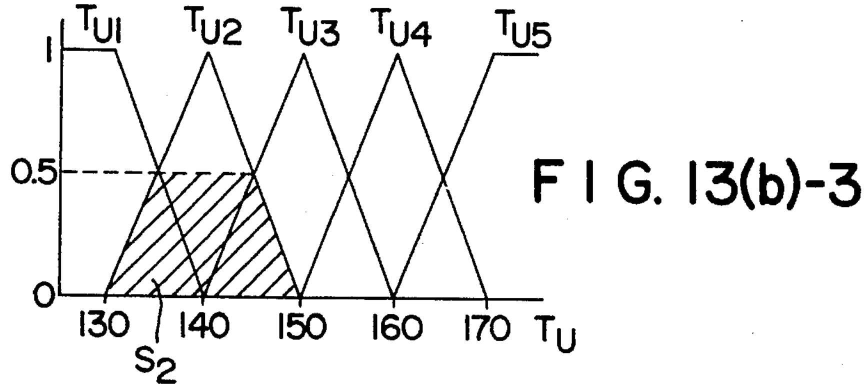

The contents of an operation performed by the calculating circuit 63 for controlling the previous rotation will be described, the operation being conducted on the basis of the fuzzy operation. According to this embodiment, the ambient temperature ($T_E$) and time (H) in which power is supplied to the apparatus are used as the quantities of state. As the quantity of control, the temperature ($T_U$) of the surface of the fixing roller is used, where symbol $T_U$ represents the temperature at which the previous rotation starts. FIG. 12 illustrates the fuzzy sets called membership functions of the quantity of state and the quantity of control, in which FIGS. 12A and 12B illustrate the quantity of state and FIG. 12C illustrates the quantity of control. Referring to the drawings, symbol $T_E$1 represents 15° C. or lower, $T_E$2 represents about 15°, $T_E$3 represents about 25° C., $T_E$4 represents about 35° C., $T_E$5 represents 35° C. or higher, H1 represents two hours or less, H2 represents about two hours, H3 represents 2 hours or longer, $T_U$1 represents 140° C. or lower, $T_U$2 represents about 140° C., $T_U$3 represents about 150° C., $T_U$4 represents about 160° C. and $T_U$5 represents 160° C. or higher.

When the ambient temperature is 25° C., the degree of belonging to the set $T_E$3 is 1.0, when the ambient temperature is 20° C., the degree of belonging to the set $T_E$3 is 0.5 and the degree of belonging to the set $T_E$2 is 0.5.

Then, the fuzzy rules are shown in Table 1.

TABLE 1

| Temperature at which multiple forward rotation starts ($T_U$) | | Power supply time (H) H1 | H2 | H3 |
|---|---|---|---|---|
| Ambient Temperature ($T_E$) | $T_E1$ | $T_U1$ | $T_U1$ | $T_U2$ |
| | $T_E2$ | $T_U1$ | $T_U2$ | $T_U3$ |
| | $T_E3$ | $T_U2$ | $T_U3$ | $T_U4$ |
| | $T_E4$ | $T_U3$ | $T_U4$ | $T_U5$ |
| | $T_E5$ | $T_U4$ | $T_U5$ | $T_U5$ |

An example of the method of calculating the temperature at which the previous rotation starts in accordance with the above-described rules will be described. Assuming that the ambient temperature $T_E$ is 20° C. and time H in which power is supplied is one hour, the sets included in $T_E$=20° C. are $T_E$2 and $T_E$3 in accordance with the above-described rule. The sets included in H=one hour are H1 and H2. Therefore, rule is composed by as follows:

(1) $T_E$=$T_E$2 and H=H1→$T_U$=$T_U$1

(2) $T_E$=$T_E$2 and H=H2→$T_U$=$T_U$2

(3) $T_E$=$T_E$3 and H=H1→$T_U$=$T_U$2

(4) $T_E$=$T_E$3 and H=H2→$T_U$=$T_U$3

The above-described relationship are shown in FIG. 13.

FIG. 13 (*a*) corresponds to the rule (1).

The degree of belonging to the set $T_E$2 corresponding to 20° C. becomes 0.5, the degree of belonging to the set H1 corresponding to one hour is 0.5. Therefore, the minimum value of the above-described two degrees is 0.5. As a result, the portion corresponding to degree 0.5 in the set $T_U$1 becomes $S_1$. FIG. 13 (*b*) corresponds to the rule (2). Portion $S_2$ can be obtained in a portion corresponding to $T_U$2.

Figure 14:
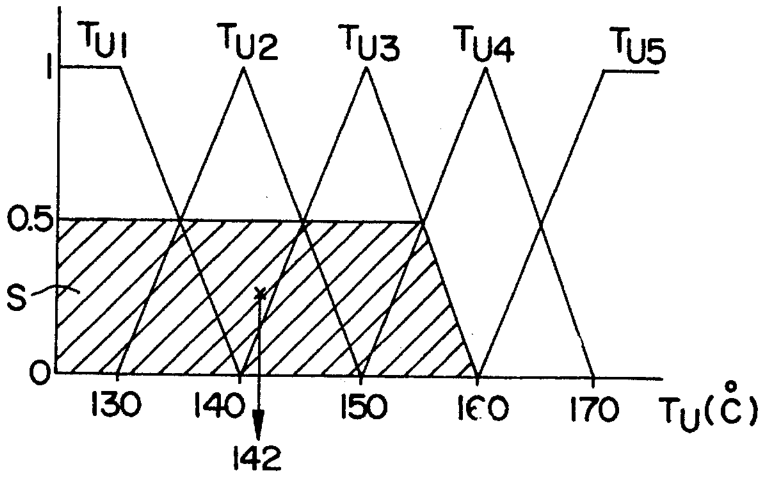

Although omitted from the illustration, portions $S_3$ and $S_4$ can be obtained by processing (3) and (4). The addition of the above-described portions become region S shown in FIG. 14. Referring to FIG. 14, the center of gravity of S becomes $T_U$=about 142° C.

Therefore, according to this embodiment, the operation is so conducted that the previous rotation is started when the temperature $T_U$ of the surface of the fixing roller becomes 142° C. In another case in which the ambient temperature $T_E$ is 30° C. and the time in which power is supplied to the apparatus is three hours, the temperature at which the previous rotation starts becomes $T_U$=158° C.

That is, the temperature at which the previous rotation starts is arranged to be in inverse proportion to the ambient temperature $T_E$ and the time H in which power is supplied to the apparatus, causing the quantity of heat transfer to the pressure applying roller to be enlarged for the purpose of stabilizing the fixing performance.

The ambient temperature is employed as the substitution characteristics of the temperature of the transfer paper. When the temperature of the transfer paper is low, the quantity of heat absorbed by the transfer paper becomes excessive. Therefore, in this case, a large quantity of heat must be reserved in the pressure application roller. If the power supply time is too short, the quantity of heat cannot be sufficiently conducted from the heater and the fixing roller to the fixing device. Therefore, the temperature of the overall body of the apparatus cannot be sufficiently raised. As a result, a certain quantity of heat must be reserved in the pressure applying roller since a quantity of heat is necessary to heat the apparatus in addition to the quantity of heat to heat the transfer paper although the temperature of the fixing roller has been raised to a predetermined level.

Then, a modification to this embodiment will be described.

Figure 15:
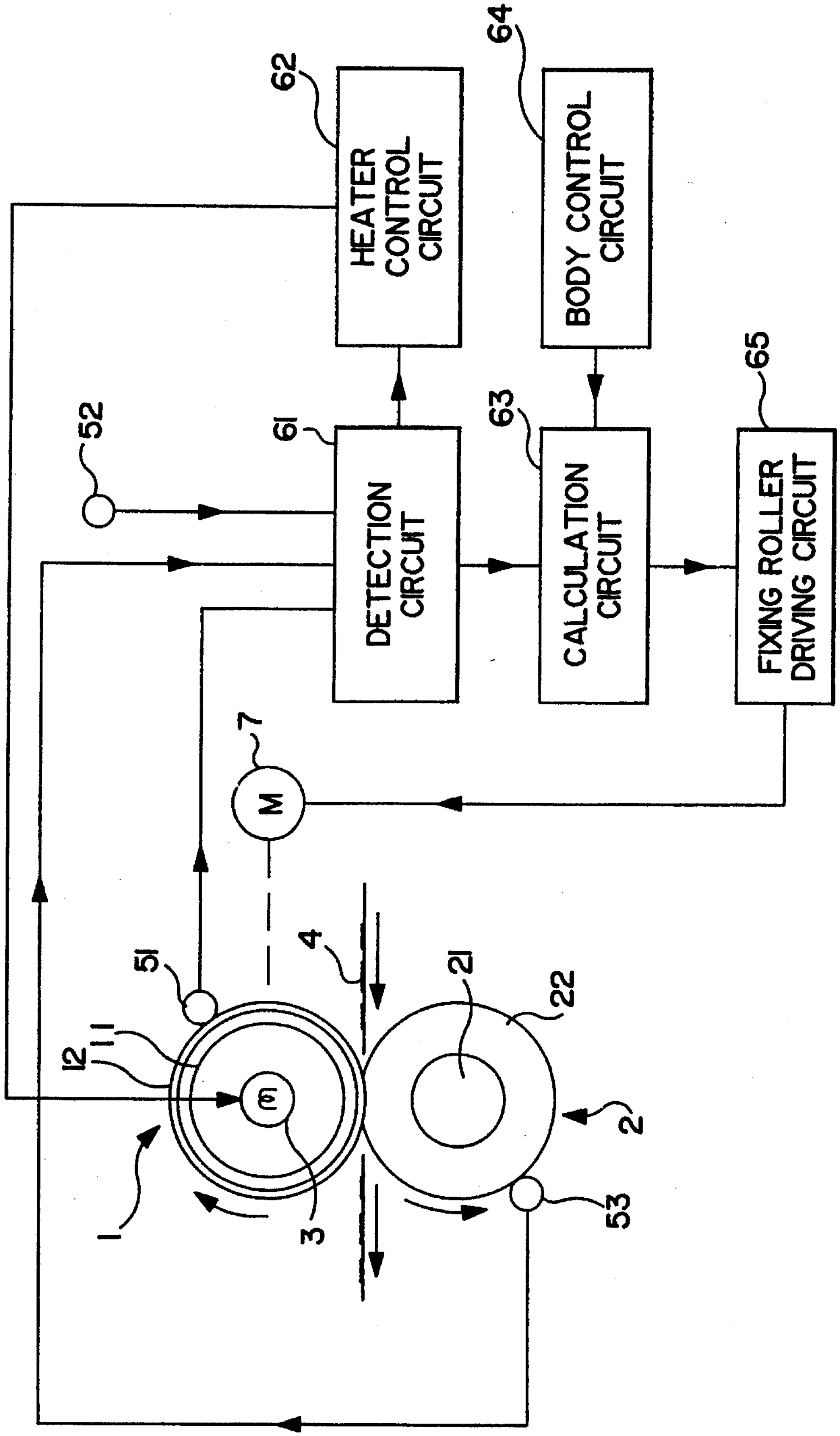
FIG. 15 is a cross sectional view which illustrates a modification of the fixing device according to the second embodiment of the present invention.
Figure 16A:
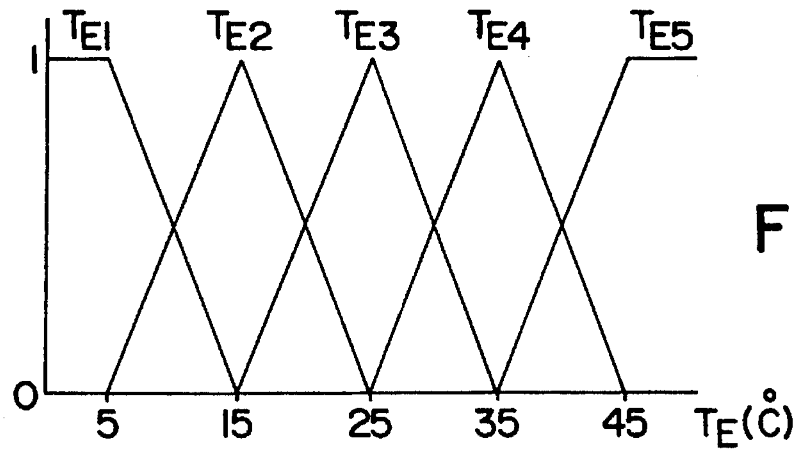
FIGS. 16(*a*), 16(*b*), and 16(*c*) illustrate the modification to the membership function according to the second embodiment of the present invention.
Figure 16B:
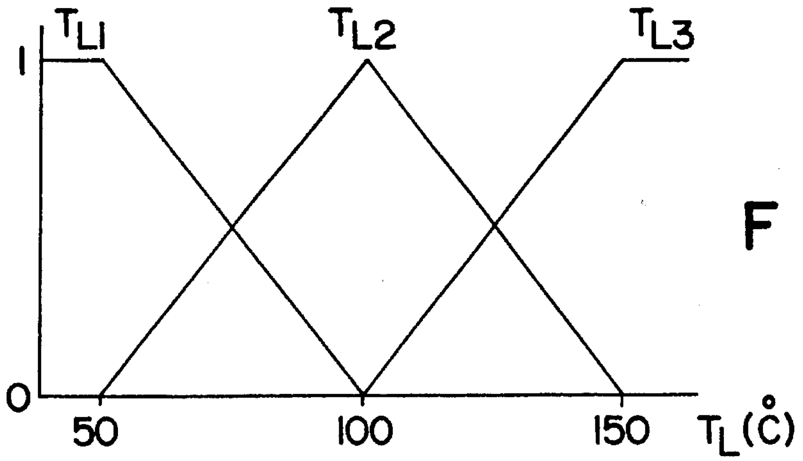
Figure 16C:
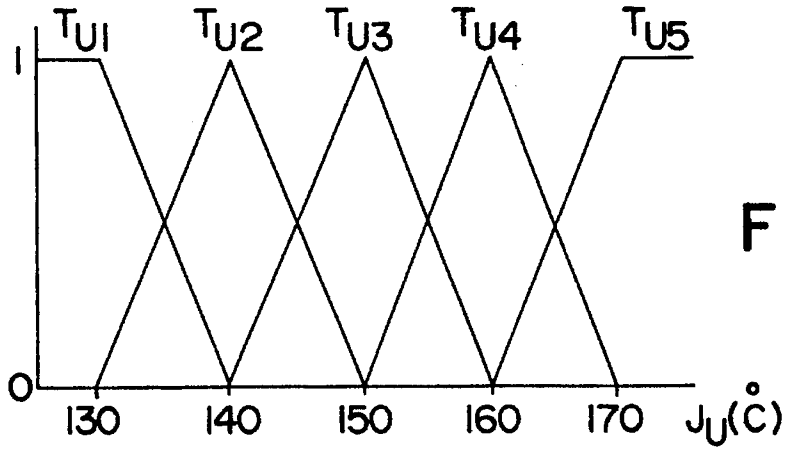

FIG. 15 illustrates a modification in which the previous rotation control is performed by the ambient temperature sensor 52 and a pressure applying roller surface temperature sensor 53. As the quantity of state, the ambient temperature ($T_E$) and the pressure applying roller surface temperature ($T_L$) are employed, while fixing roller surface temperature ($T_U$) is used as the quantity of control, that is, the previous rotation start temperature, the fuzzy sets thereof being shown in FIG. 16. FIGS. 16(*a*) and 16(*c*) show the fuzzy sets similarly to the above-described drawings, while $T_L$1 shows 100° C. or lower, $T_L$2 shows about 100° C. and $T_L$3 shows 100° C. or higher. The above-described factors are calculated in accordance with the fuzzy rule shown in Table 2.

TABLE 2

| Temperature at which multiple forward rotation starts ($T_U$) | | Temperature of pressure applying roller ($T_L$) $T_L1$ | $T_L2$ | $T_L3$ |
|---|---|---|---|---|
| Ambient Temperature ($T_E$) | $T_E1$ | $T_U1$ | $T_U2$ | $T_U3$ |
| | $T_E2$ | $T_U1$ | $T_U3$ | $T_U4$ |
| | $T_E3$ | $T_U1$ | $T_U3$ | $T_U5$ |
| | $T_E4$ | $T_U2$ | $T_U4$ | $T_U5$ |
| | $T_E5$ | $T_U3$ | $T_U4$ | $T_U5$ |

According to this embodiment, when the surface temperature ($T_L$) of the pressure applying roller is low, the temperature at which the previous rotation starts is arranged to be a low temperature for the temperature ($T_U$) of the fixing roller so that a sufficient quantity of heat is applied to the pressure applying roller.

Another modification to the present invention will be described.

Also according to this modification, the quantity of state according to the above-described second embodiment is employed.

Figure 17A:
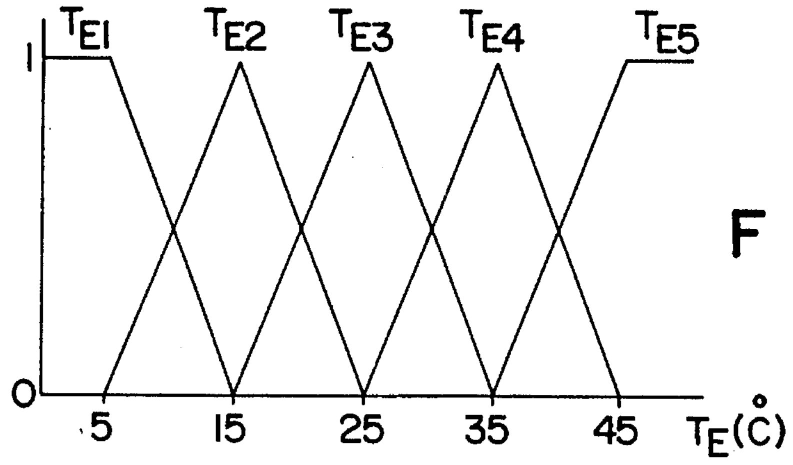
FIGS. 17(*a*), 17(*b*), and 17(*c*) illustrate a modification of the membership function according to the second embodiment of the present invention.
Figure 17B:
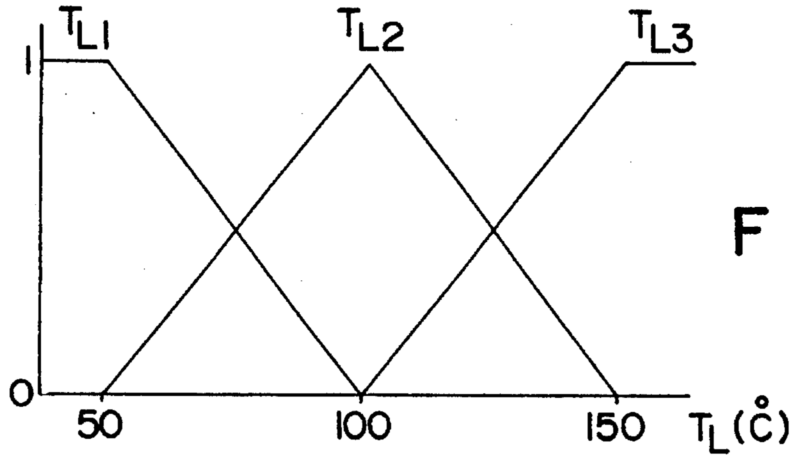
Figure 17C:
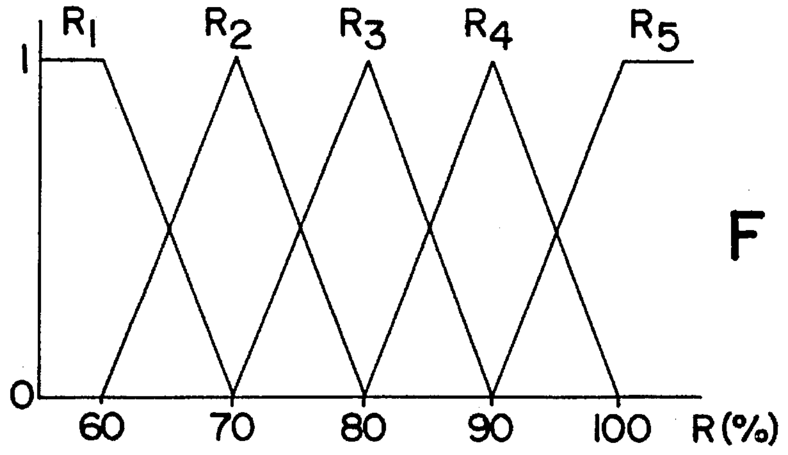

However, the rotational speed of the driving motor 7 for the fixing roller is controlled as the quantity of control. FIG. 17(*c*) illustrates the previous rotational sped is expressed by % provided that rotational speed of the fixing roller at the time of the copying operation is 100. Symbols R1 represents a membership function showing 70% or less, R2 represents that showing about 70%, R3 represents about 80%, R4 represents about 90% and R5 represents 90% or more. Table 3 shows the fuzzy rules according to this case.

TABLE 3

| Multiple forward rotational speed (R) | | Temperature of pressure applying roller ($T_L$) $T_L1$ | $T_L2$ | $T_L3$ |
|---|---|---|---|---|
| Ambient Temperature ($T_E$) | $T_E1$ | R1 | R2 | R3 |
| | $T_E2$ | R1 | R2 | R4 |
| | $T_E3$ | R2 | R3 | R4 |
| | $T_E4$ | R2 | R4 | R5 |
| | $T_E5$ | R3 | R4 | R5 |

The above-described control is conducted for the purpose of sufficiently raising the temperature of the pressure applying roller by reducing the rotational speed of the fixing roller at the time of the previous rotation when the temperature $T_L$ of the pressure applying roller is low.

As described above, in the stabilization of the fixing performance of the fixing device for a copying machine or the like the relationship of which, between its state of control of and its quantity of control, is controlled by a fuzzy relationship, the quantity of control can be calculated by performing the fuzzy inference. In particular, the breaking-in rotation of the fixing roller pair can be controlled prior to the start of the copying operation in accordance with the quantity of state of the apparatus by controlling, for example, the temperature at which the previous rotation starts or the previous rotational speed.

Although the above-described controls can be performed by combining complicated quantities of states, they can be easily subjected to the fuzzy operation by using the membership function of the fuzzy logic. Therefore, the necessity of performing a complicated labor to make a program can be estimated. Furthermore, an increase in the number of the memory devices or the like for making the program can be prevented. Therefore, the fuzzy state of the apparatus can be numerically controlled.

[Third Embodiment]

Figure 18:
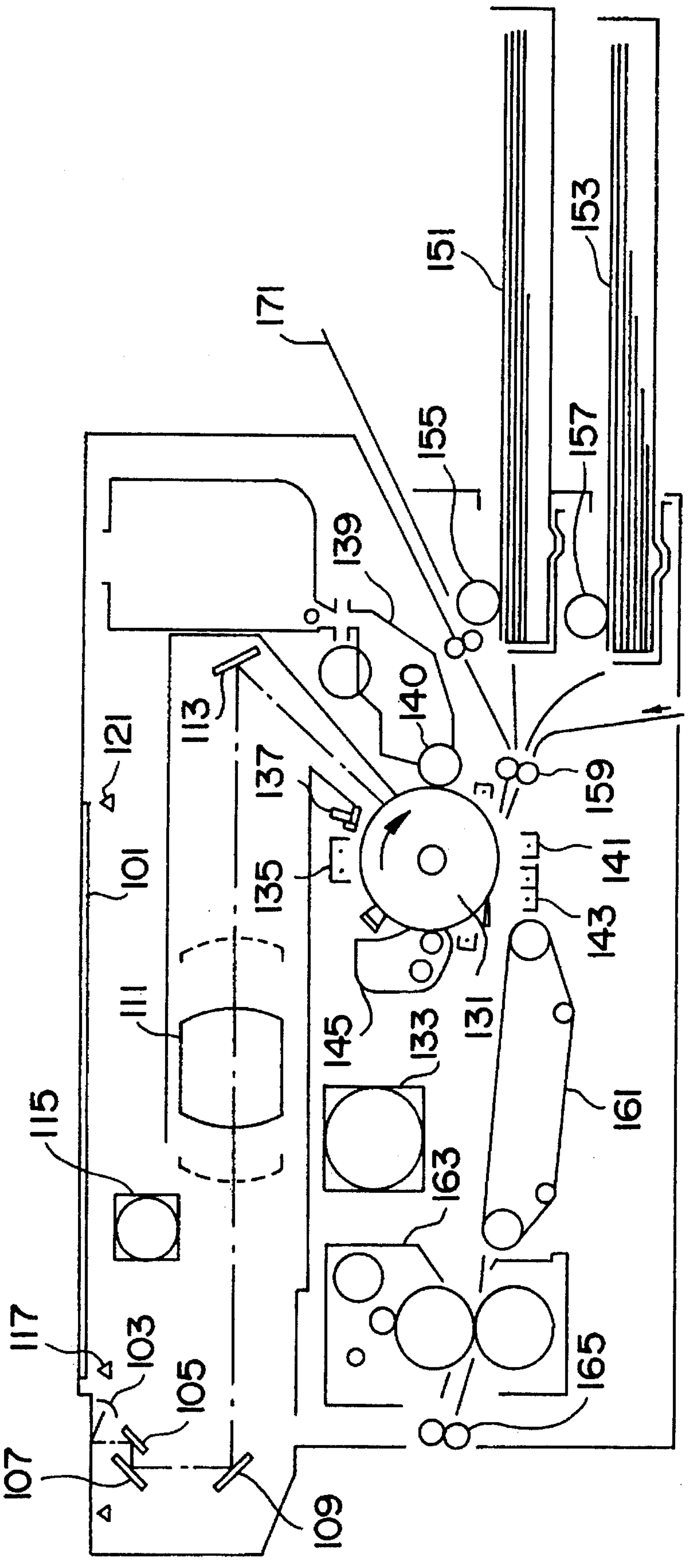
FIG. 18 is a cross sectional view which illustrates a third embodiment of the copying machine according to the present invention.

A third embodiment of the present invention will be described in detail with reference to the drawings. FIG. 18 is a schematic cross sectional view which illustrates the image forming apparatus according to the present invention. The elements of the body 100 of the copying machine which are the same as those according to the first embodiment of the present invention are given the same reference numerals. Reference numeral 101 represents an original retaining glass on which an original is placed, 103 represents an illuminating lamp (an exposing lamp) for illuminating the original and 105, 107 and 109 represent scanning reflecting mirrors (scanning mirrors) for changing the optical path of light reflected by the original. Reference numeral 111 represents a lens having both a focusing function and a power varying function and 113 represents a fourth reflecting mirror (a scanning mirror). Reference numeral 115 represents an optical motor for driving the optical system and 117, 119 and 121 represent sensors for detecting the position of the optical system.

Reference numeral 131 represents a photosensitive drum, 133 represents a main motor for driving the photosensitive drum 131. Reference numeral 135 represents a high-tension unit, 137 represents a blank exposing unit and 139 represents a developing device. Reference numeral 141 represents a transferring charger and 145 represents a cleaning device.

Reference numeral 151 represents an upper cassette, 153 represents a lower cassette, 171 represents a manual paper feeding port. Reference numerals 155 and 157 represent paper feeding rollers and 159 represents a resist roller. Reference numeral 161 represents a conveying belt for conveying recording paper on which an image has been recorded to the fixing side. Reference numeral 163 represents a fixing device for thermally fixing the recording paper which has been conveyed. The conveying belt 161 can be optionally stopped.

The surface layer of the photosensitive drum 131 is constituted by a photoconductive material and a seamless photosensitive material made of an electric conductor. The rotation of the photosensitive drum 131, which is so supported as to be capable of rotating, is started by the main motor 133 which is arranged to be operated in response to the depressing of the copy start key to be described later, the rotation being arranged to be in a direction designated by an arrow shown in FIG. 2. After a control process in which the drum 131 is rotated by a predetermined number of revolutions and a process in which the potential of the same (former process) have been then completed, the original placed on the original retaining glass 101 is applied with light by the illuminating lamp 103 integrally formed with the first scanning mirror 105. As a result, light reflected by the original is imaged on the drum 131 via the first scanning mirror 105, the second scanning mirror 107, the third scanning mirror 109, the lens 111 and the fourth scanning mirror 113.

The drum 131 is corna-charged by the high-tension unit 135. Then, an image (the image of the original), which has been applied with light from the illuminating lamp 103, is exposed to slit light. As a result, a static latent image is formed on the drum 131 by a known Carson Process.

Then, the static latent image on the photosensitive drum 131 is developed by the developing roller 140 of the developing device 139 so that the static latent image is visualized as a toner image, the formed toner image being then transferred to transfer paper by a transferring charger 141 as described later.

That is, the transfer paper set in the upper cassette 151, the lower cassette 153 or the manual feeding port 171 is fed by the feeding roller 155 or 157 into the apparatus body 100 in which the front portion of the latent image and the front portion of the transfer paper are aligned with each other. Then, the transfer paper is passed between the transferring charger 141 and the drum 13 so as to be discharged outside the body 100.

The drum 131 continues its rotation even after it has performed the transferring operation so that its surface is cleaned up by the cleaning device 145 comprising a cleaning roller and an elastic blade.

Figure 19:
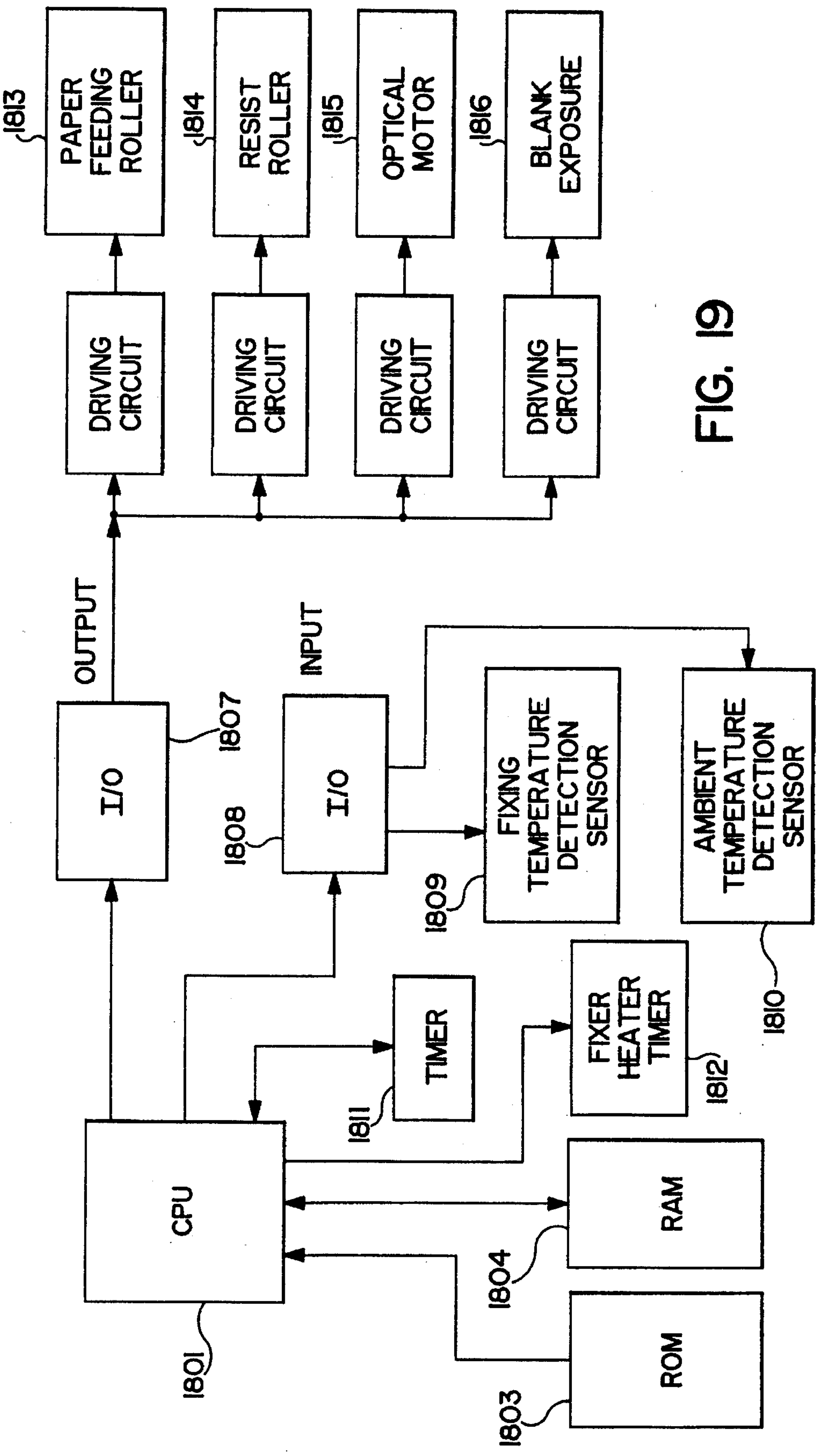
FIG. 19 is a block diagram which illustrates a control circuit according to the third embodiment of the present invention.

FIG. 19 is a block diagram of a control circuit which is an essential portion of the image forming apparatus according to this embodiment.

Reference numeral 1801 represents a CPU which performs the fuzzy inference and 1803 represents a ROM for storing the fuzzy rules and membership functions. Reference numeral 1804 represents a RAM to be used as a working region at the time of performing the fuzzy inference. Reference numerals 1807 and 1808 represent I/Os and 1809 represents a sensor for detecting the temperature of the fixing device. Reference numeral 1810 represents a sensor for detecting the ambient temperature (room temperature) and 1811 represents a timer for inputting the lapse of time from the time at which the main power source has been turned on to the CPU 1801. Reference numeral 1812 represents a timer which works only when the fixing heater works. Reference numerals 1813 to 1816 represent portions to be controlled after the fuzzy inference has been performed in response to the input signals from the sensors and timers 1809 to 1812, the portions 1813 to 1816 control the conveying intervals of the material to be fixed in accordance with the state of the use of the apparatus, the conveying interval being defined as the recording speed. In order to change the recording speed or stop the recording operation, the rotations of the paper feeding roller 1813, the resist roller 1814 and the optical motor 1815 and the exposing timing of the blank exposing lamp 1816 can be controlled.

The control is basically performed in such a manner that the paper conveying interval is enlarged when the temperature of the roller surface has been lowered than a certain reference temperature $T_R$ (for example 165° C.). When the temperature has been lowered by a considerably large degree, the paper conveying interval is further enlarged. The reference temperature is controlled by the ambient temperature or the lapse of time.

Figure 20A:
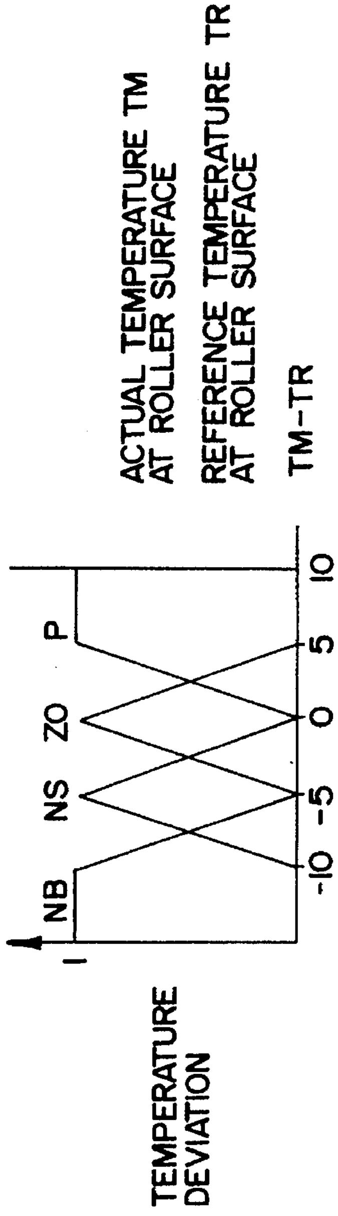
FIGS. 20(*a*), 20(*b*), and 20(*c*) illustrate the membership functions.
Figure 20B:
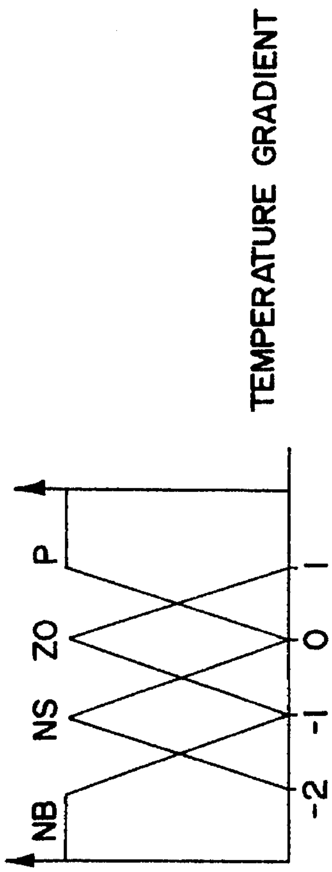
Figure 20C:
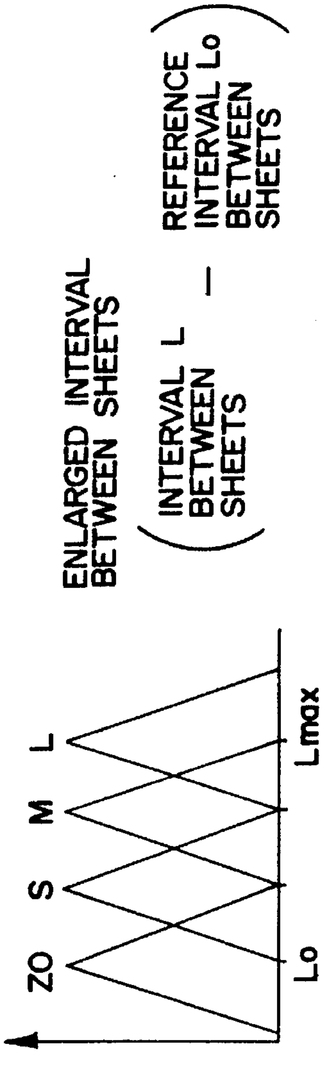
Figure 22A:
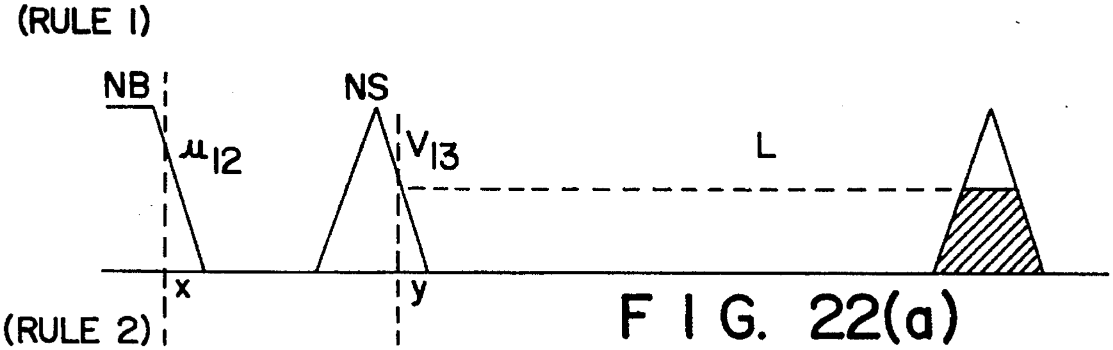
FIGS. 22(*a*), 22(*b*), 22(*c*), 22(*d*) and 22(*e*) illustrate the way to obtain the value of the center of gravity.
Figure 22B:
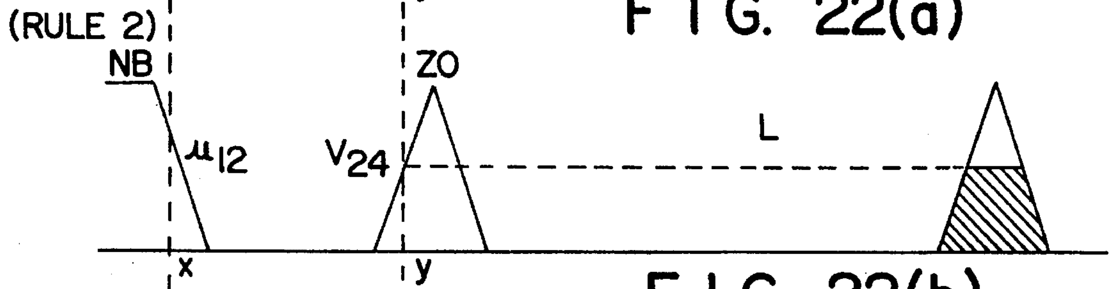
Figure 22C:
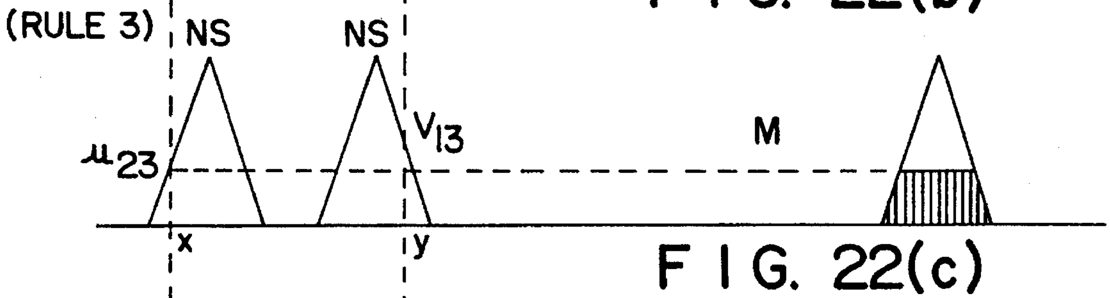
Figure 22D:
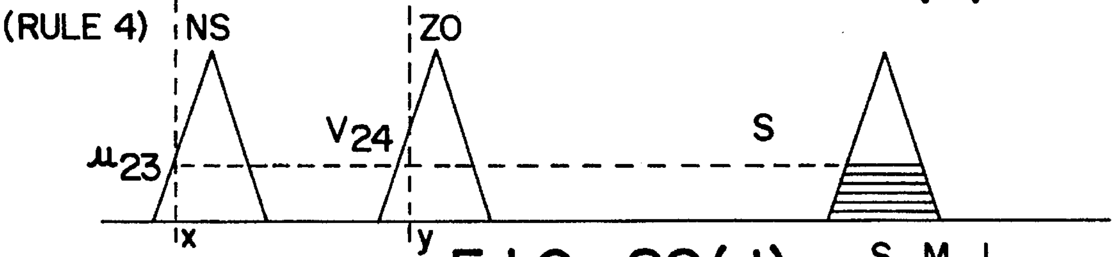
Figure 22E:
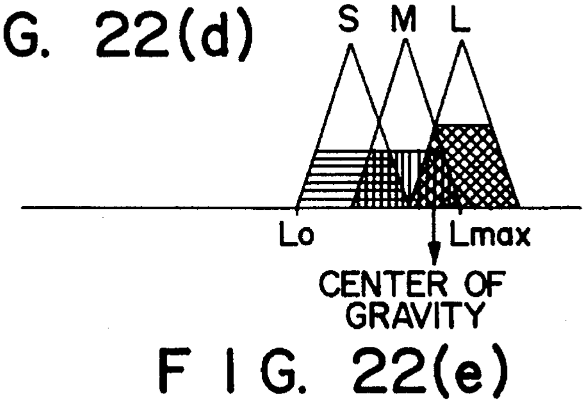

FIGS. 20(*a*), 20(*b*), and 20(*c*) show the membership functions, where FIG. 20(*a*) shows the membership function of the temperature deviation (the difference between the actual surface temperature $T_M$ of the fixing roller and the reference surface temperature $T_R$ of the roller). A set consisting of the following factors is expressed by a membership function:

(A) P is Positive (B) ZO is Zero (C) NS is Negative Small (D) NB is Negative Big FIG. 20(*b*) shows the membership function of the temperature gradient showing the temperature change of the fixing roller per unit time, while FIG. 20(*c*) shows the membership function showing the paper feeding interval in which a fuzzy set consisting of the following factors is shown:

(a) ZO is Zero (b) S is Short (c) M is Medium (d) L is Long

The paper feeding interval (to be abbreviated to "the paper interval") is controlled between the reference paper feeding quantity $L_O$ and $L_{max}$.

FIG. 21 illustrates the fuzzy rule for controlling the paper feeding interval. Then, the method of obtaining the degree of widening the paper conveying interval in accordance with the fuzzy rule will be described. FIG. 22 illustrates an example in which the center of gravity is obtained by setting the temperature gradient to be x and the temperature gradient to be y.

(Rule 1) If temperature deviation=NB and temperature gradient=NS then paper interval=L.

(Rule 2) If temperature deviation=NB and temperature gradient=NO then paper interval=L.

(Rule 3) If temperature deviation=NS and temperature gradient=NS then paper interval=M.

(Rule 4) If temperature deviation=NS and temperature gradient=NO then paper interval=S.

Then, the intersections of the temperature deviation x, the temperature gradient y and each of the membership functions are obtained. Setting the values of the thus obtained intersections=$\mu_{12}$, $\mu_{23}$, $\nu_{13}$ and $\nu_{24}$ so as to be subjected to the minimum-calculation in accordance with the corresponding rules. The figures obtained by cutting the membership functions for the paper feeding interval by the above-described minimum value are shown by the diagonal lines, lateral lines and longitudinal lines. The control is performed in such a manner that the center of gravity of the thus formed trapezoid is made the paper feeding interval.

The above-described control is performed by shifting the start timing of the optical motor 1815, the timing of the resist roller 1814, the paper feeding roller 1813 and the blank exposure 1816.

Figure 23:
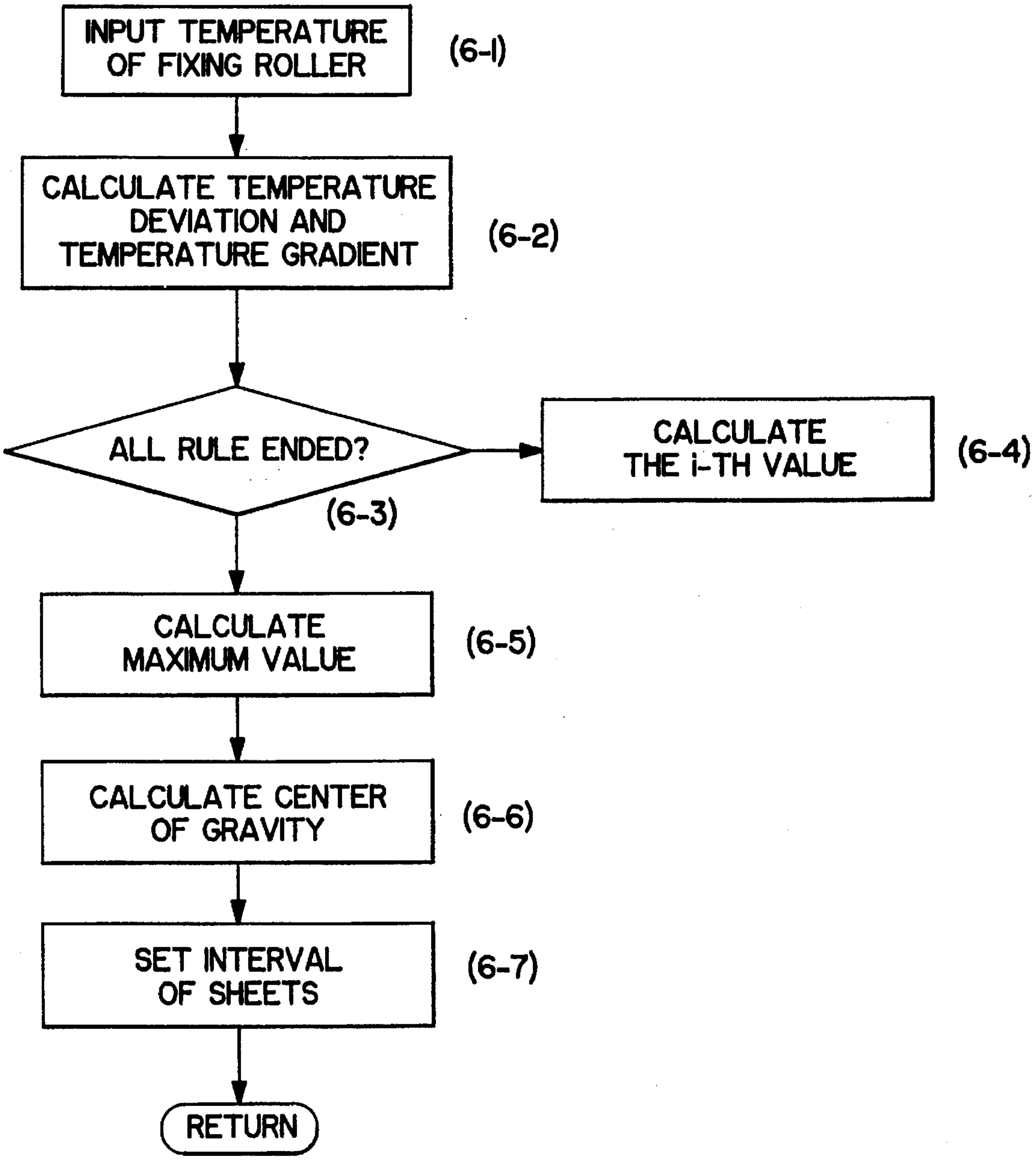
FIG. 23 is a flow chart for use in the fuzzy control.

FIG. 23 illustrates a flow chart for the above-described fuzzy control. First, the temperature of the fixing roller is detected by the detection sensor 1809 (6-1) and the deviation between the present temperature and the desired temperature and the temperature gradient which is the change of temperature per unit time are calculated (6-2).

Then, the degree at which the control quantity belongs to the fuzzy set is calculated (6-3) (6-4), and the maximum value of the set belonging to each of the rules is calculated (6-5). Then, the control quantity which is the most probable is calculated by obtaining the center of gravity (6-6), and the paper feeding interval is set (6-7) before the return.

[Modification 1]

Then, a method of controlling the reference surface temperature of the roller by using the ambient temperature and the time lapse from the time at which the main switch has been turned on as the quantities of state will be described. According to this modification, the paper feeding interval is finally changed by the above-described two quantities of state by changing the reference surface temperature of the roller.

Figure 24A:
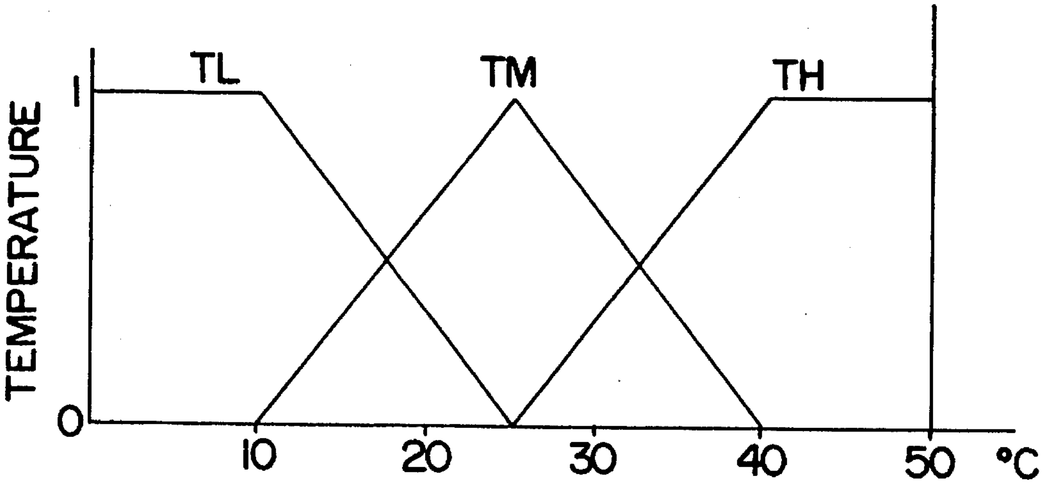
FIGS. 24(*a*), 24(*b*) and 24(*c*) illustrate the membership functions.
Figure 24B:
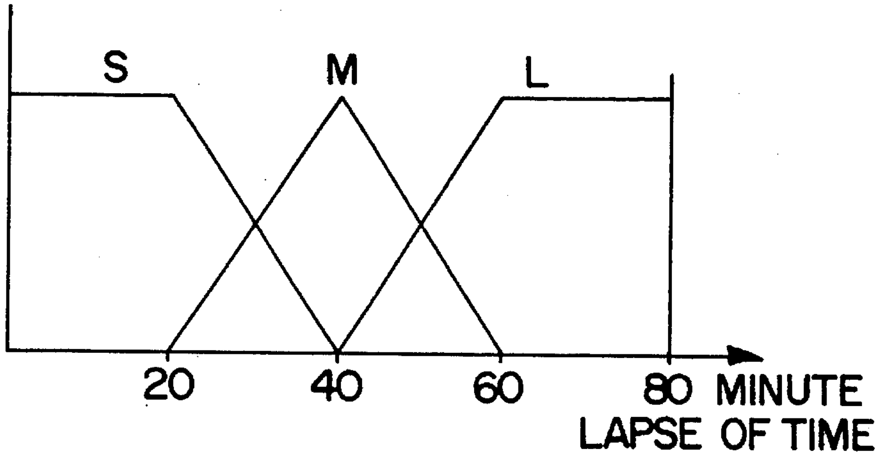
Figure 24C:
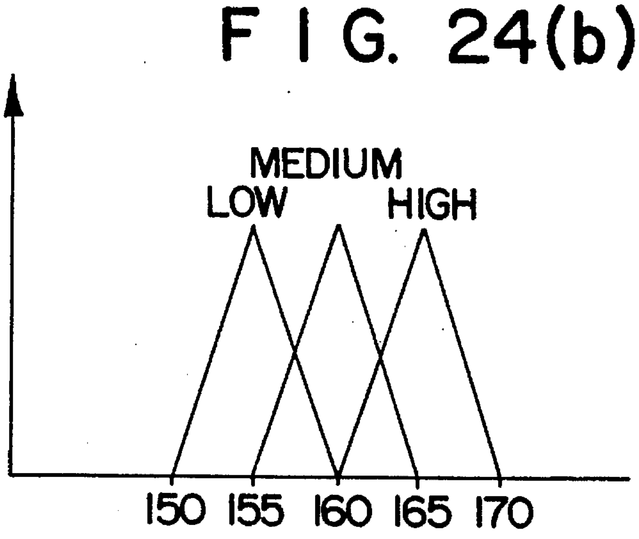

FIG. 24 illustrates the membership functions of the ambient temperature and the lapse of time, where (a) illustrates the membership function showing the ambient temperature, in which TL: Temperature Low TM: Temperature Medium TH: Temperature High (b) illustrates the membership function showing the time lapse from the time at which the main switch has been turned on, in which S: Short Lapse of Time M: Medium Lapse of Time L: Long Lapse of Time (c) illustrates the membership function showing the reference temperature $T_R$ of the roller. The reference temperature $T_R$ of the roller is, as a result, determined between $T_{Rmax}$=165° C. and $T_{Rmin}$=155° C.

If the lapse of time exceeds 80 minutes, no fuzzy inference is performed but the reference temperature of the roller is arranged to be determined to be $T_R$min =155° C. Similarly to this, the ambient temperature or the like is arranged to be numerically controlled without performing the fuzzy inference if a value out of a range which can be processed by the membership function has been supplied.

Then, a method of determining the reference surface temperature of the roller from the ambient temperature and the lapse of time in accordance with the fuzzy inference will be described. FIG. 25 illustrates the fuzzy rule in this case. Then, an example, in which the reference surface temperature of the roller in the case where the ambient temperature is 10° C. and the lapse of time is 30 minutes is determined in accordance with the fuzzy rule, will be described. In this case, the condition that the ambient temperature is 10° C. means the fact that it belongs to the fuzzy set TL: Low Temperature and that the numeral thereof is 1. Then, the condition that the lapse of time is 30 minutes means the fact that it belongs to the fuzzy set S: Short and the fuzzy set M: Medium by a degree 0.5. Therefore, both the (Rule 1) and the (Rule 2) becomes 0.5 as a result of the minimum calculation. When the top portion of the membership function of the reference temperature is cut by the thus obtained 0.5 and the center of gravity of the a trapezoid designated by diagonal lines, a numeral 162.5° C. can be obtained. On the basis of data for determining the reference temperature, the paper feeding interval can be determined in accordance with the roller temperature and the temperature gradient.

Figure 27:
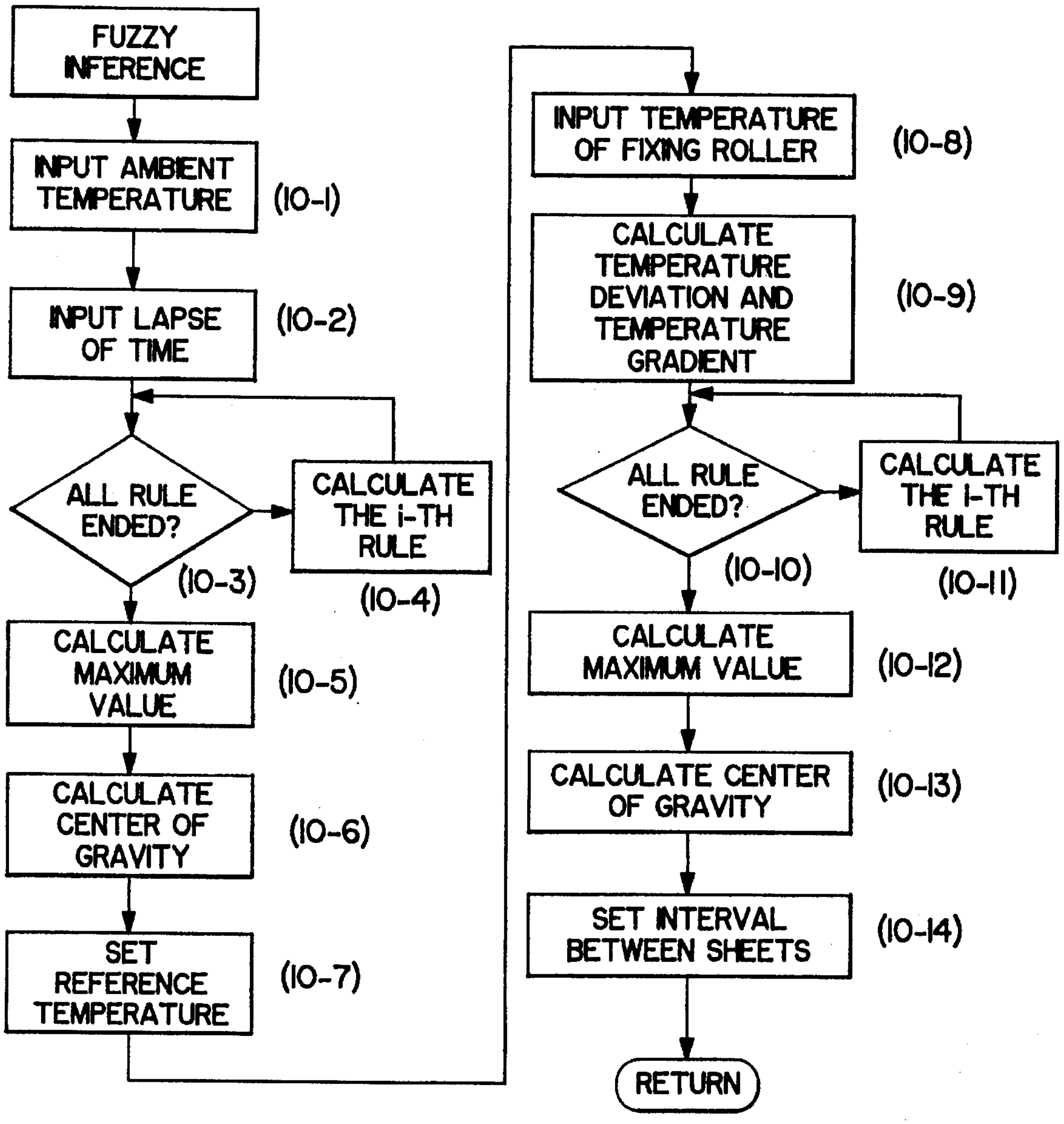
FIG. 27 is a flow chart which illustrates the fuzzy inference.

A flow chart in this case is shown in FIG. 27.

According to the flow chart, the ambient temperature and the lapse of time is supplied (10-1) (10-2) and a fuzzy inference is made in accordance with the thus supplied data (10-7) in which the reference temperature is determined. Then, the roller temperature is supplied (10-8), the temperature deviation is calculated from the reference temperature and the roller temperature (10-9), and the paper feeding interval is determined by performing the fuzzy inference (10-14).

[Modification 2]

According to the above-described embodiments, the control quantity such as the desired temperature, the reference temperature and the paper feeding interval is determined by the quantity of state such as the ambient temperature, the surface temperature of the roller, the temperature gradient and the lapse of time. However, other quantity of state such as the density of the original, the copy mode history and the estimated time in which the fixing heater is turned on can be employed. For example, the estimated time, in which the fixing heater is turned on, can be employed as an alternative to the above-described lapse of time. In this case, a factor is taken into consideration that better fixing characteristics can be obtained in the case where a multiplicity of copies are made for 10 minutes after the main switch has been switched on since the portion in the vicinity of the fixing device has been heated up to a degree higher than that in the case where no copy has been made. Basically, as shown in FIG. 28, the magnitude of the numeral of time becomes slightly smaller with the lapse of time according to the first modification made as the estimated value (the quantity of heat of the fixing device) of the time in which the heater is being turned on. Since the fuzzy rule is the same as that according to the above-described embodiment, the description for it is omitted here. Furthermore, since the process for obtaining the control quantity from the quantity of state can be made the same, the description for it is also omitted here.

[Modification 3]

Also the control can be performed in such a manner that information such as the total number of copied sheets by the fixing device is made as the copy history. That is, the fixing roller of the fixing device deteriorates in its separation performance and surface quality with the lapse of time. Furthermore, problems arises in that the hardness of the rubber of the pressure application roller is reduced and that the diameter of the roller contracts. Therefore, the fixing performance deteriorates and an offset phenomenon can easily arises.

In order to control the fixing performance of the fixing device, which has been brought into the above-described state, to maintain at a certain high level, it is necessary for realizing a high performance fixing device to control the paper feeding interval or the reference temperature by a control quantity which is different from that necessary for a new fixing device. According to this modification, the total number of copied sheets for the fixing device is employed additionally. FIG. 29 illustrates the membership function, where New shows a state in which a relatively small number of sheets have been copied, that is the apparatus is new, while Old shows a state in which a relatively large number of sheets have been copied, that is the apparatus is old. FIG. 30 illustrates the fuzzy rule in which the reference temperature is arranged to be relatively higher in the case of Old. That is, the paper feeding interval is made relatively large. Since a method of obtaining the reference temperature and the paper feeding interval in accordance with the fuzzy rule is the same as that according to the above-described embodiment, the description for it is omitted here.

As described above, in an image forming apparatus such as a copying machine and a laser beam printer the relationship between quantity of state of which and the control quantity of which is controlled by a fuzzy relationship, the control quantity can be obtained from a complicated quantities of states so that the image forming apparatus can be controlled. Therefore, the temperature and the paper feeding quantity in the image forming apparatus can be properly controlled so that the electric power consumption can be reduced, the fixing performance can be improved and the efficiency in forming an image can be improved.

[Fourth Embodiment]

A fourth embodiment of the present invention will be described with reference to the drawings.

Figure 31:
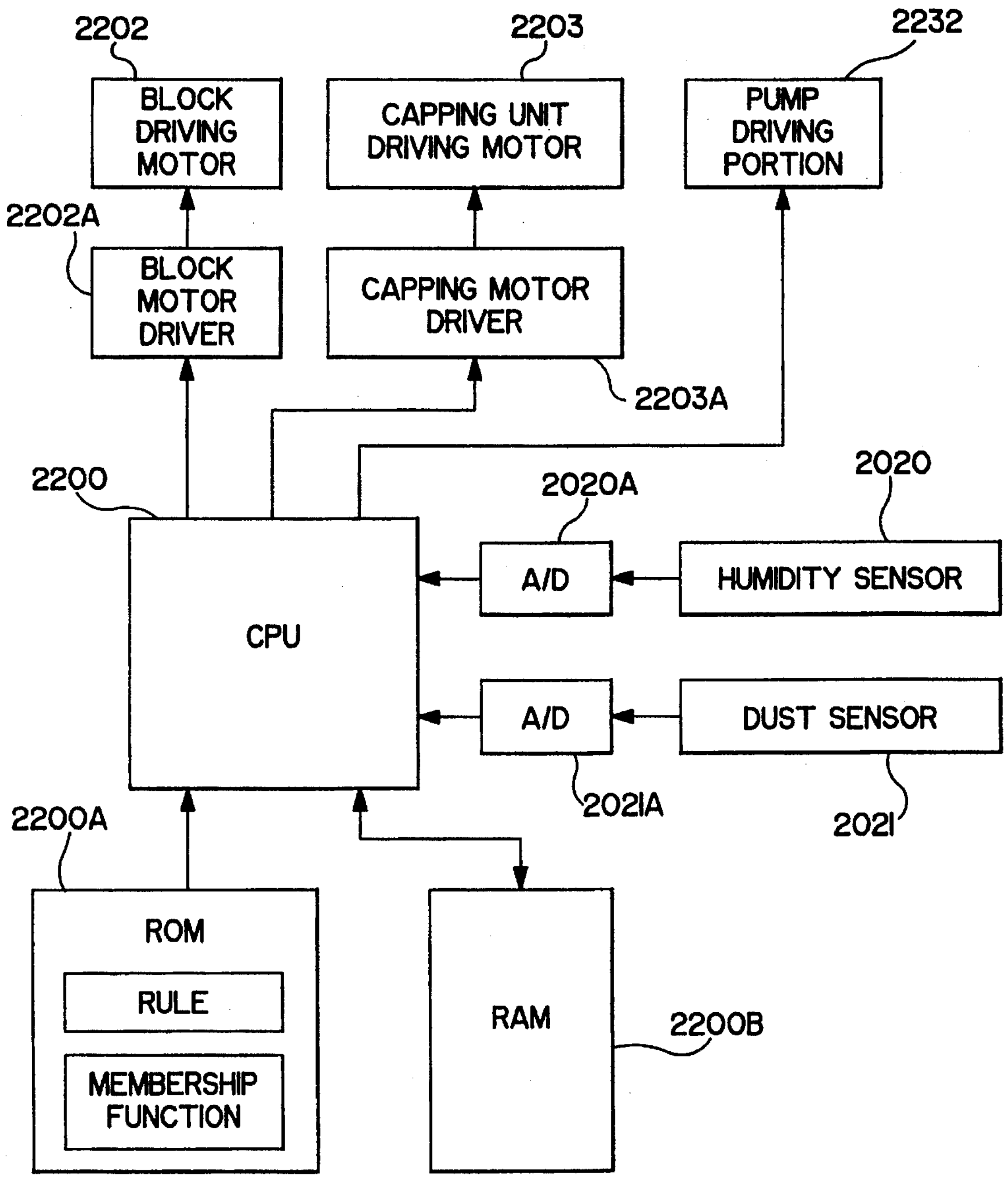
FIG. 31 is a block diagram which illustrates the structure for controlling the ink jet recording apparatus according to a fourth embodiment of the present invention.

FIG. 31 is a block diagram which illustrates the structure for controlling an ink jet recording apparatus according to the fourth embodiment of the present invention. Referring to the drawing, the control structure for removing water drop or the like according to this embodiment is mainly illustrated and the structure for controlling the operation of the recording head of the recording paper conveying system is omitted from the illustration.

Referring to FIG. 31, reference numeral 2200 represents a CPU which controls the ink jet recording apparatus. Reference numeral 2200A represents a ROM for storing a processing process according to the apparatus to be described later in FIG. 38, the ROM 2200A having a region in which the control rule or the membership function to be described later are stored. Reference numeral 2200B represents a RAM which is used as a buffer for temporarily storing the working area in which the CPU 2200 is operated and recording data for driving the recording head. Reference numerals 2202, 2203 and 2232 respectively represent a block drive motor for driving a recording head block 2202, a capping unit drive motor for driving a capping unit 2203 and a pump drive motor for driving a pump 2032 to be described later. Each of the motors 2202, 2203 and 2232 is controlled by motor drivers 2202A and 2203A.

Reference numeral 2020 represents a humidity sensor for detecting the ambient humidity of the recording head which is the quantity of state according to this embodiment. Reference numeral 2021 represents a dust sensor for detecting dust floating in the atmosphere of the recording head as the quantity of state, the dust being, for example, optically detected. The outputs representing the detections obtained from each of the above-described sensors are supplied to the CPU 2200 via A/D converters 2020A and 2021A, respectively.

Figure 32:
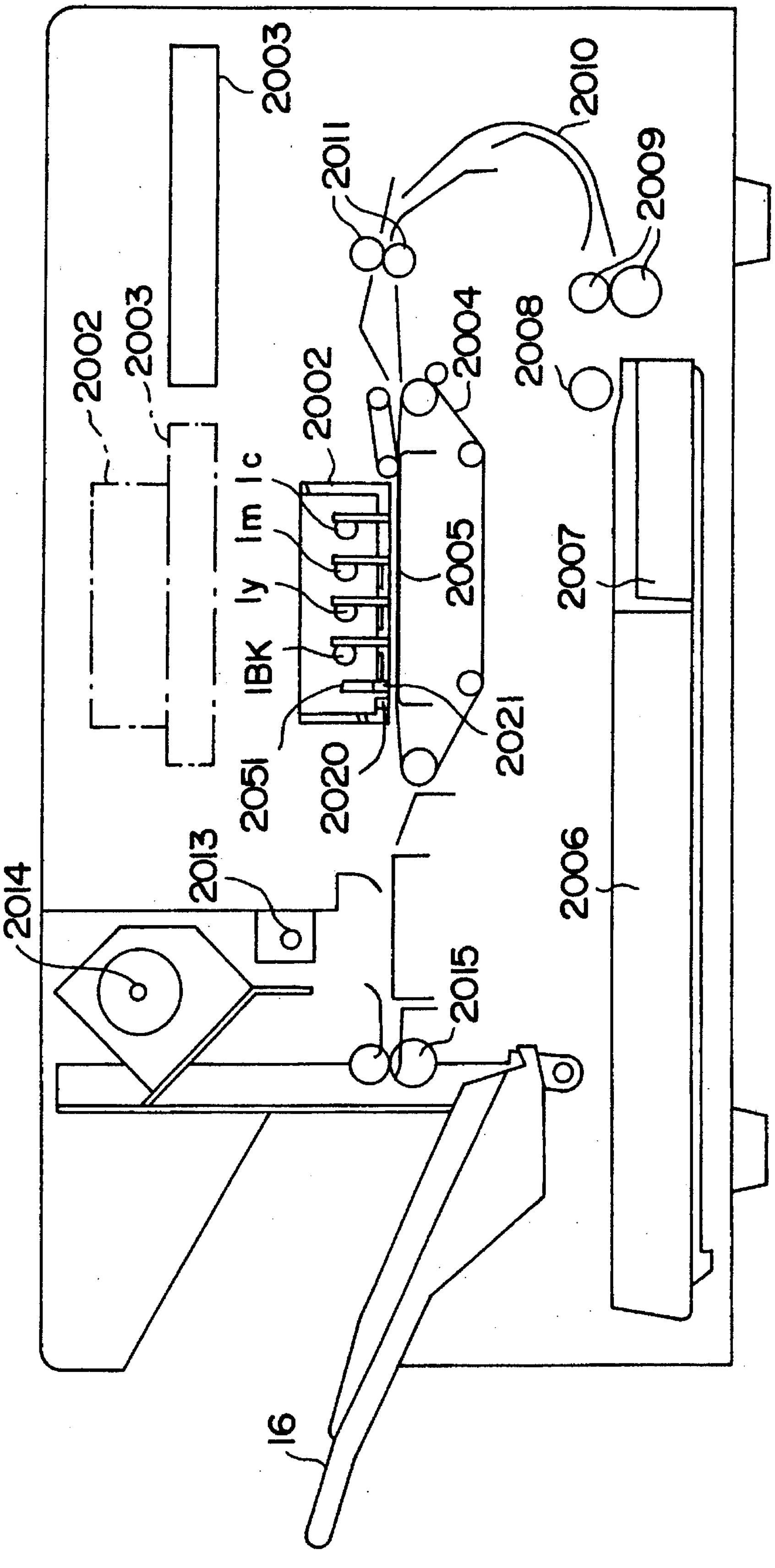
FIG. 32 is a schematic side elevational cross sectional view which illustrates the ink jet recording apparatus according to the fourth embodiment of the present invention.

FIG. 32 is a schematic side elevational view of the ink jet recording apparatus having the control structure shown in FIG. 31.

Referring to FIG. 32, symbols 1Bk, Iy, Im and Ic represent recording heads respectively corresponding to ink colors black, yellow, magenta and cyane. Each of the recording heads 1Bk, Iy, Im and Ic are arranged in such a manner that an electrothermal conversion device as a discharge energy generating body including therein whereby ink is discharged through a discharge port by using air bubbles, as a pressure source, generated in the ink during the supply of energy. Each of the recording heads 1Bk, Iy, Im and Ic is a recording head of a so-called "full line" type in which 4736 discharge ports are arranged at a density of 400 dpi. The recording heads 1Bk, Iy, Im and Ic are held by the head block 2002. The above-described humidity sensor 2020 and a read head 2051 for detecting the discharge portion which is not discharging ink are fastened to the block 2002. Furthermore, the above-described dust sensor 2021 is fastened to the lower portion of the read head 2051. Reference numeral 2003 represents a capping unit which acts in such a manner that the block 2002 is raised to a position designated by an alternate long and short dash line and the capping unit 2003 is moved to a position confronting the raised block 2002 so as to cap the discharge port of the recording head. The capping unit 2003 serves as a reservoir for ink supplied from the ink supply system by a recovery pump, to be described later, and jetted through the discharge port at the time of the recycle recovery time, ink thus received being then introduced into an waste ink tank (omitted from illustration). Reference numeral 2004 represents a conveyance belt disposed so as to confront each of the recording heads 1Bk, Iy, Im and Ic by a predetermined distance, the conveyance belt 2004 conveying recording paper by charging and attracting it. Reference numeral 2005 represents a back platen disposed so as to confront the recording heads 1Bk, Iy, Im and Ic via the conveyance belt 2004, the back platen 205 satisfactorily restricting the shape of the recording surface of the recording paper. Reference numeral 2006 represents a paper feeding cassette accommodating recording paper 2007 and detachably mounted on the apparatus body. Reference numeral 2008 represents a pickup roller for successively supplying the uppermost recording paper 2007. Reference numeral 2009 represents a conveyance roller for conveying the recording sheet 2007 which has been fed by the pickup roller 2008 to a conveyance passage 2010. Reference numeral 2011 represents a conveyance roller disposed at the outlet side of the conveyance passage 2010. Reference numerals 2013 and 2014 respectively represent a heater and a fan disposed in the down stream to the recording heads 1Bk, Iy, Im and Ic so as to confront the conveyance system, the heater 2013 and the fan 2014 acting to dry and fix ink adhered to the recording paper 2007 by hot air. Reference numeral 2015 represents a discharge roller for discharging the recording paper 2007 which has been fixed and 2016 represents a tray for successively stocking the discharged recording paper 2007.

Then, the operation of the thus structured apparatus according to this embodiment will be described.

First, the recording operation will be described. When recording start is instructed, the recording paper 2007 of the instructed size is supplied by the pickup roller 2008 from the paper feeding cassette 2006. The fed recording paper 2007 is placed on the conveying belt 2004 which has been rotated, with charged previously, by the conveyance rollers 2009 and 2011 and flattened by the back platen 2005. In synchronization with the moment at which the front end portion of the recording paper 2007 reaches the lower portion of each of the recording heads 1*c*, 1*m*, 1*y* and 1Bk, the electrothermal conversion device of each of the recording heads 1*c*, 1*m*, 1*y* and 1Bk is driven via a head drive circuit (omitted from illustration) in accordance with recording data. As a result, ink droplet corresponding to the recording data is discharged to the surface of the recording paper 2007 through the discharge pot so that the recording is performed.

In the case where the recording paper 2007 is a type having poor hygroscopicity, the ink adhered thereto cannot be fixed, causing the contamination on the recording surface thereof due to the scratching by, for example, the discharging roller. Therefore, forcible drying is performed by the heater 2013 and the fan 2014 so as to improve the fixing effect. The recording paper 2007 is then discharged to the tray 2016 by the discharge roller 2015 after the fixing operation has been completed.

As described above, a color image can be formed by supplying the recording signals corresponding to the recording heads which correspond to cyane, magenta, yellow and black ink.

Then, the water droplet or the like removal operation in the discharge stabilizing process according to this embodiment will be described with reference to FIGS. 33 and 34.

Figure 33:
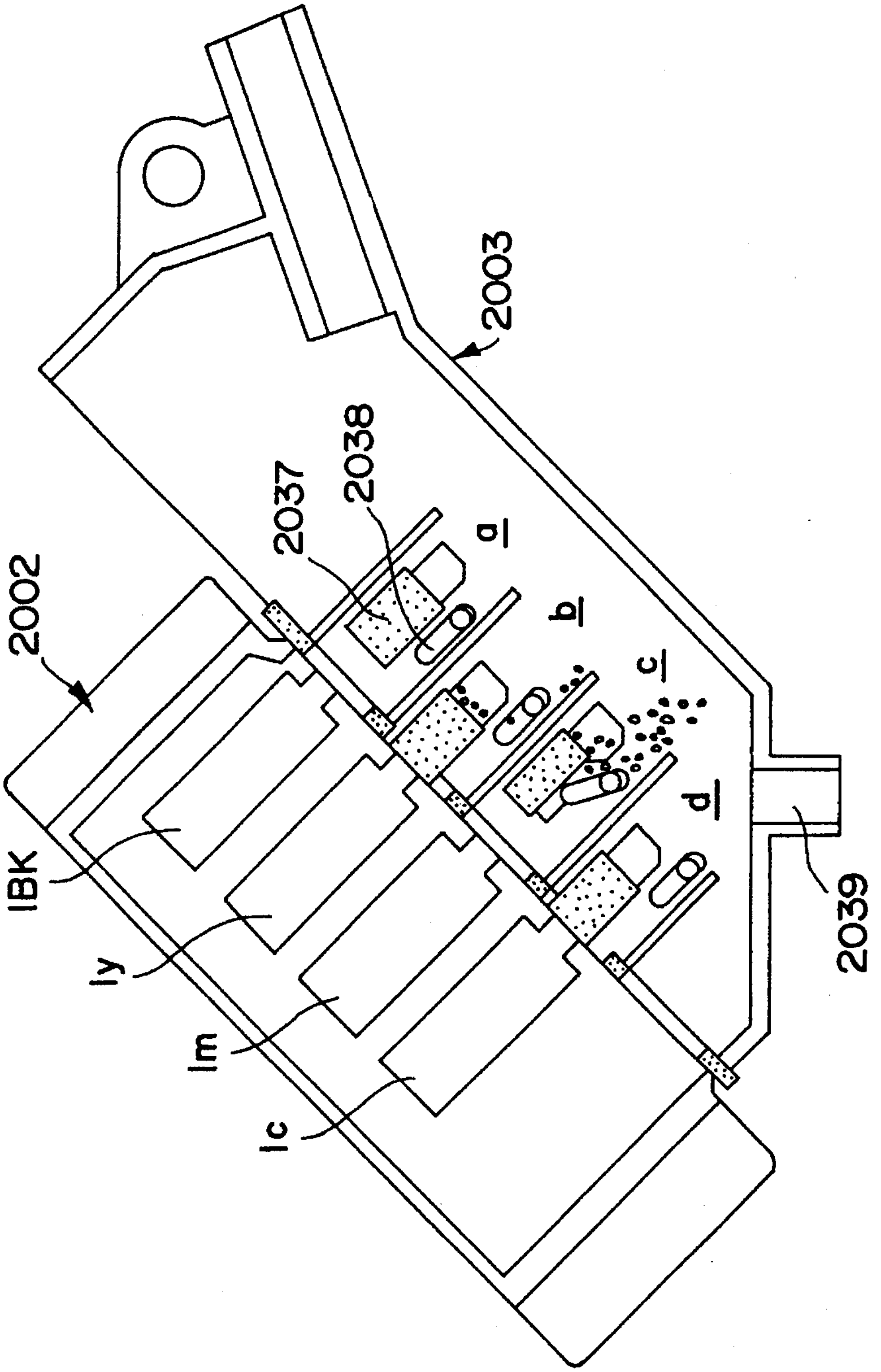
FIG. 33 is a schematic side elevational cross sectional view which illustrates an operation for removing water droplets or the like performed in a state in which the discharge port is capped by the cap unit shown in FIG. 32.

FIG. 33 is a schematic cross sectional view which illustrates a state in which the discharge port of each of the recording head blocks 1Bk, 1*y*, 1*m* and 1*c* is capped as a result of the relative movement between the cap unit 2003 and the head block 2002 as shown in FIG. 32. FIG. 34 is a schematic view which illustrates an ink supply system to the recording heads 1Bk, 1*y*, 1*m* and 1*c*.

The removal operation according to this embodiment is, as described later, is started in accordance with the interval. First, as shown in FIG. 32, in accordance with the movement of the head block 2002 from a position designated by a continuous line to a position designated by a dash line, the cap unit 2003 is moved to a position designated by a dash line so that the discharge port of each of the recording heads 1Bk, 1*y*, 1*m* and 1*c* is capped.

Figure 34:
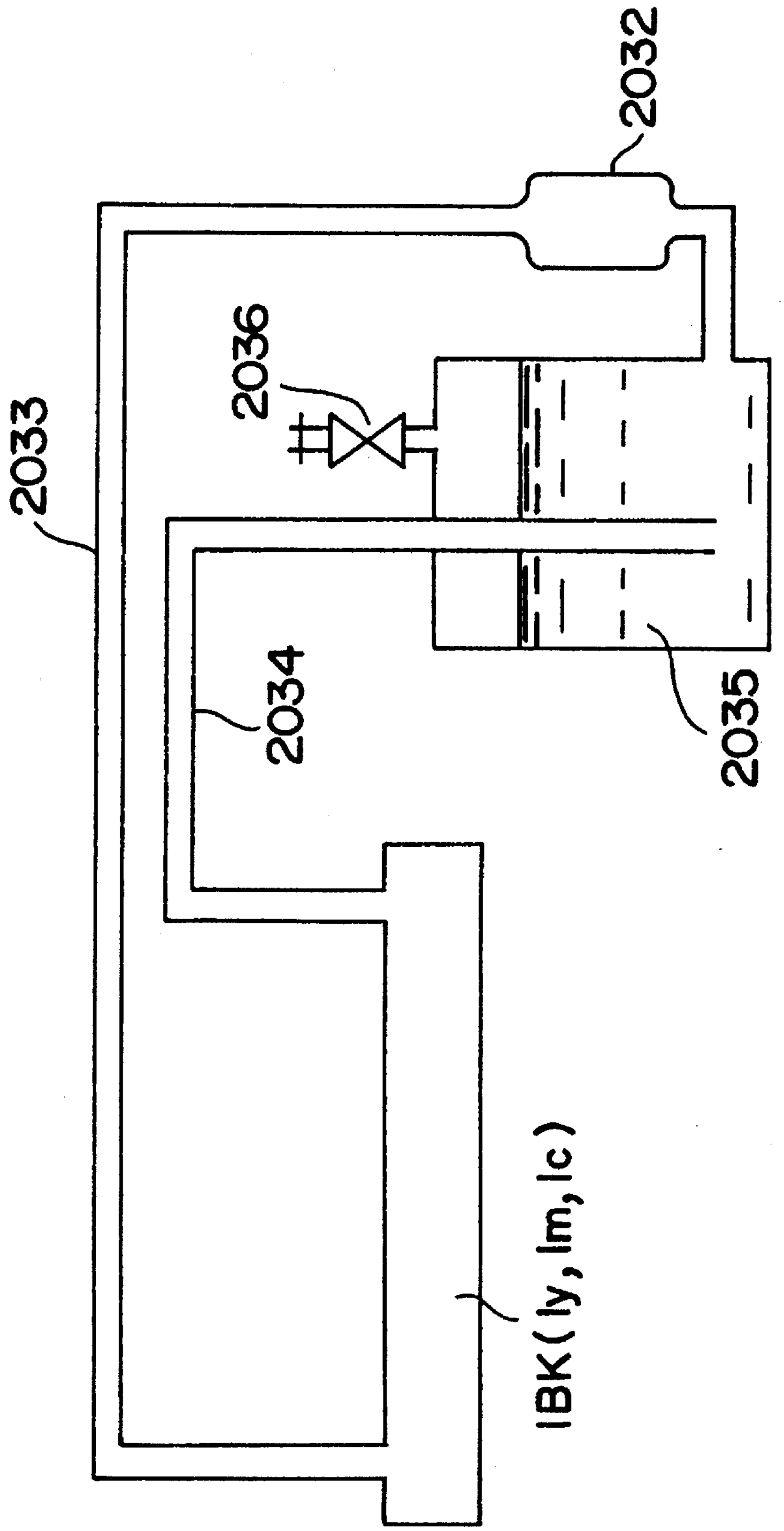
FIG. 34 is a schematic view which illustrates an ink supply system for supplying ink to the recording head shown in FIG. 32.

As shown in FIG. 34, ink in the ink tank 2035 is, via the pump 2032 and a tube 2033, then supplied to, for example, the recording head 1Bk with a valve 2036 of the ink tank 2035 and the same is returned via the tube 2034. As a result, ink is leaked through the discharge port so as to be mixed with ink positioned in the vicinity of the discharge port. The similar operation is performed for the other recording heads 1*y*, 1*m* and 1*c*.

At this time, the cap unit 2003 brings a porous member 2037 into contact with the discharge port as shown at b in FIG. 33, being positioned so as to confront the recording head. As a result, the leaked ink can be absorbed. At this time, dust adhered to the discharge port is also absorbed by the porous member 2037 similarly to ink absorbed by the porous member 2037.

Then, ink is forcibly squeezed from the porous member 2037 by rotating a squeezing member 2038 by a means (omitted from illustration) as shown at c in FIG. 33. Then, as shown at d in FIG. 33, the porous member 2037 is again brought into contact with the discharge port so as to clean it and to restore the standby state as shown at a in FIG. 33.

Ink thus removed and absorbed is recovered by an waste ink tank (omitted from illustration).

As described above, ink existing on the front surface of the recording head is added to the leaked ink so as to be absorbed and removed by the porous member. Therefore, the discharge can be cleaned without water droplet or dust so that a stable ink discharge can be performed.

Although the leaked ink is not added to the ink at the discharge port at the time of absorbing ink, an effect can, of course, be obtained only by bringing the porous member into contact with the ink. The removing operation shown in FIG. 33 is not successively conducted for the recording heads, but it is conducted simultaneously for the recording heads. The state shown in FIG. 33 in which the heads perform different operations is made so as to simplify the description.

Then, the interval control for the above-described removal operation will be described. As the quantity of state for use in this control, the quantity of dust to be detected by the dust sensor 2021 and humidity to be detected by the humidity sensor 2020 are used.

As the control quantity, the interval of the operation of absorbing and removing ink at the discharge port is used.

Figure 35A:
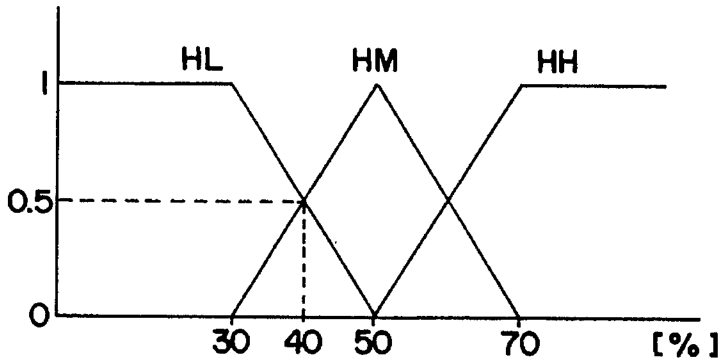
FIGS. 35(*a*), 35(*b*), and 35(*c*) are diagrams which illustrate the membership functions for regulating the fuzzy sets about the state of quantity and the control quantity according to the fourth embodiment of the present invention.
Figure 35B:
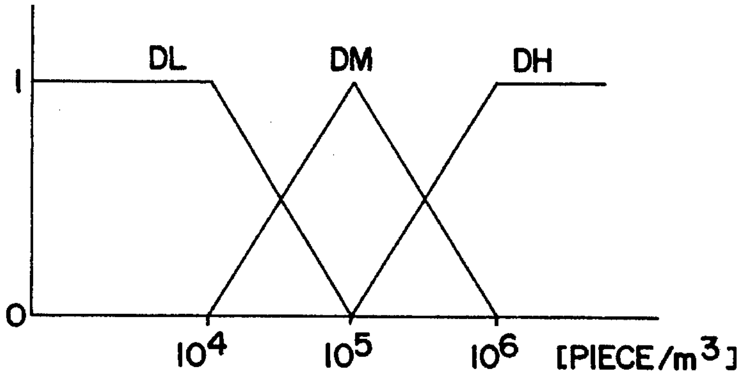
Figure 35C:
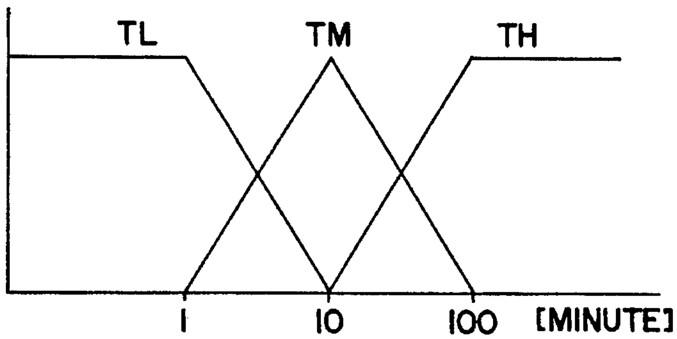

FIGS. 35(*a*) to 35(*c*) are diagrams which illustrate the membership functions for defining the fuzzy sets for each of the quantities of states and the control quantities. Referring to these drawings, three membership functions are provided for the quantity of state and the control quantity so as to be stored in the ROM 2200A as described above. That is, the floating dust quantity, the humidity and the interval are respectively divided into three fuzzy sets by three membership functions.

As shown in FIG. 35(*a*), the humidity is divided into three fuzzy sets HL: Low Humidity, HM: Medium Humidity and HH: High Humidity. When the humidity is 40%, the degrees belonging to the fuzzy sets each of which is defined by the membership functions HL, HM and HH become 0.5, 0.5 and 0.

FIGS. 35(*b*) and 35(*c*) illustrate the membership functions for the floating dust quantity and the interval of the absorbing and removing operation. Thus, three fuzzy sets are defined for each of the quantities.

Then, a method of calculating the most suitable interval in accordance with the floating dust quantity and the humidity by using the fuzzy set relating the floating dust quantity and the humidity and the fuzzy set of the interval which serving as the control quantity will now be described.

In order to calculate it, for example, the following two rules are used whereby the interval serving as the control quantity is, in an interpolation manner, calculated in accordance with the two rules.

(Rule 1)

If floating dust quantity=DH and humidity=HM, then interval=TH (Rule 2)

If floating dust quantity=DM and humidity=HM, then interval=TM

FIG. 36 illustrates a process for calculating the interval by the fuzzy inference in which the above-described (Rule 1) and (Rule 2) are used.

As shown in FIG. 36, according to (Rule 1), as a result of calculation, it can be obtained that the case, where the floating dust quantity is x [pieces/$m^2$], is included in a fuzzy set defined by the function DH by a degree $\mu(x)$, while the case, where the humidity is y[%], is included in a fuzzy set defined by the function HM by a degree $\mu(y)$. Then, the minimum calculation of $\mu(x)$ and $\mu(y)$ is performed and the value thus obtained is set to be the degree at which the conditional portion (Rule 1) can be met. When a minimum calculation of the thus set value and the fuzzy set defined by the membership function TH of the interval is performed, a fuzzy set designated by diagonal line portion S can be obtained.

Also (Rule 2) is subjected to the similar operation so that a fuzzy set designated by diagonal line portion T can be obtained. Then, the maximum calculation of the fuzzy set S and the fuzzy set T is performed so that a novel fuzzy set designated by diagonal line portion U is obtained. Then, the center of gravity of the fuzzy set U is, as a representative value, calculated so as to set the value thus obtained to be the interval [minute] obtained from the fuzzy inference.

Although the two rules are employed according to the above-described fuzzy inference, the rule can be previously determined if necessary. The thus determined rule may, as shown in FIG. 37, be registered in the form of a table in the ROM 200A. A necessary rule selected from the thus stored rules may be selected so as to be used in the above-described fuzzy inference in accordance with the quantity of state to be input. Referring to FIG. 37, a table represented by, for example, symbol A shows a rule "floating dust quantity=DL and humidity=HH, then interval=TL". The fuzzy inference rule is not limited to the above-described description. Furthermore, the calculation methods (max, min) for each of the inferences are not limited to the above-made description. They may be properly determined in accordance with the quantity of state or the control quantity.

Figure 38:
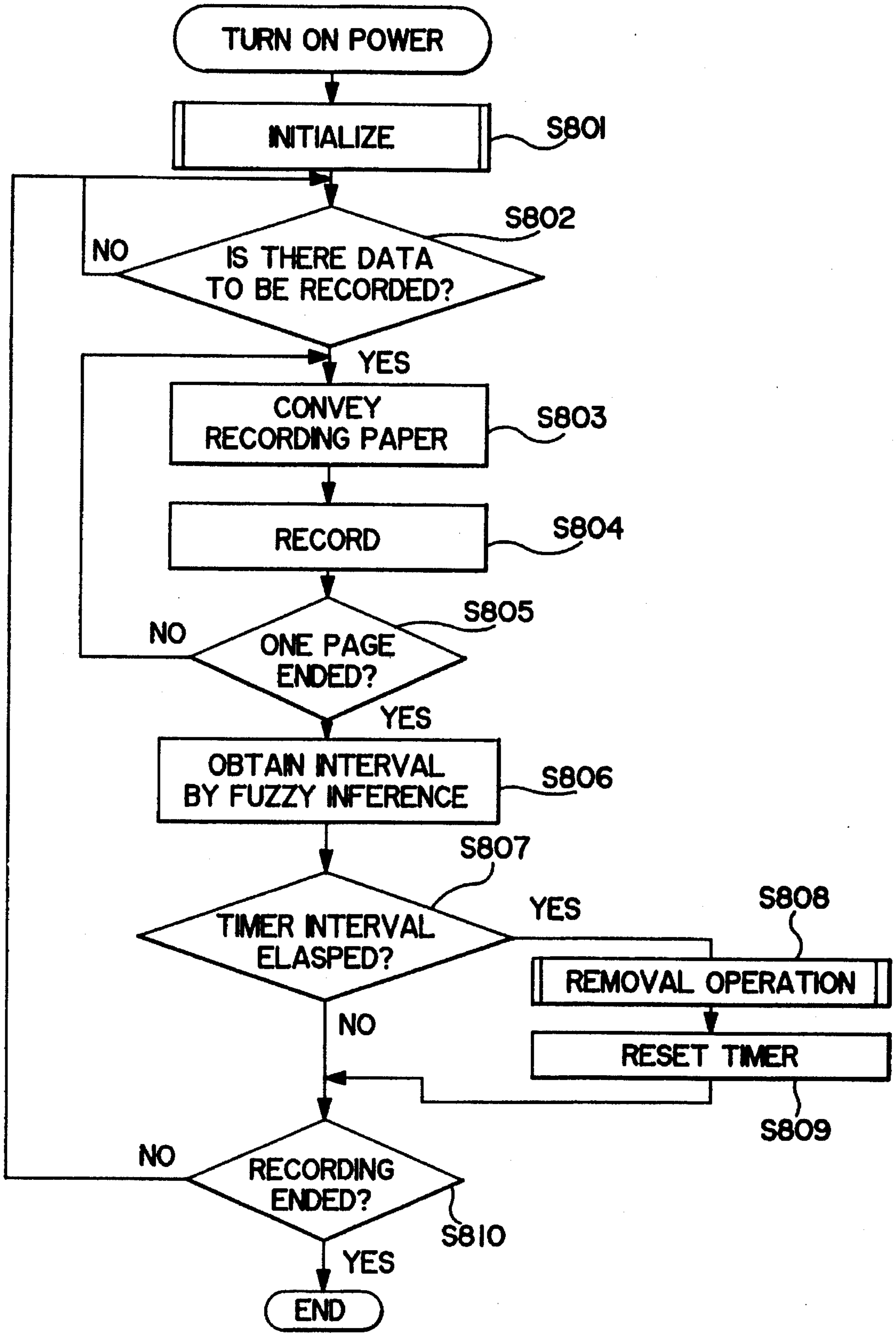
FIG. 38 is a flow chart which illustrates the controlling process in which the above-described fuzzy inference is used and according to the fourth embodiment of the present invention.

FIG. 38 is a flow chart which illustrates an example of a process which can be executed in the ink jet recording apparatus according to this embodiment shown in FIGS. 31 and 32.

When power is supplied to the apparatus, the initializing process for the ink jet recording apparatus such as the initialization of each of the memories, a discharge recovery processing by absorbing ink in the recording head and the movement of the recording heat to a predetermined position is performed in step S801. Then, the transference of recording data from, for example, the image read portion, waited in step S802. When recording data has bee supplied, the recording paper is conveyed by a predetermined quantity in step S803 so as to confront each of the recording heads 1Bk, 1*y*, 1*m* and 1*c*. In step S804, the recording head is driven in accordance with the above-described recording data so that the recording is performed. In step S805, it is determined whether or not recording for one page recording paper has been completed. If it has not been completed, the flow returns to step S803 in which the recording paper is conveyed by a line and the similar process is performed.

If recording for one page has been completed, the flow advances to step S806 in which the interval for the operation for removing water droplet or the like as shown in FIGS. 33 and 34 is obtained in accordance with the atmospheric humidity of the recording head and the floating dust quantity detected by the humidity sensor 2020 and the dust sensor 21 in accordance with the fuzzy inference described with reference to FIGS. 35 to 37. Then, in step S807, it is determined whether or not the time taken from the above-described removal operation counted by a timer included by the CPU 2200 exceeds the interval time obtained in step S806. If it has exceeded the interval time, the operation for removing water droplets and dust is performed in step S808. In step S809, the above-described timer is then reset so that novel time counting is started. After the above-described process has been completed, or it has been determined in step S807 that the counted time by the timer has not exceeded the above-described interval, the flow advances to step S810 in which the recording is ended or not is determined. If the recording is ended, the process according to this embodiment is ended. If the recording has not been ended, the flow returns to step S802 in which the transference of recording data is waited.

According to the above-described process, the floating dust quantity and the atmospheric humidity can be most satisfactorily reflected to the interval obtained by the fuzzy inference. Therefore, unnecessary removing operation can be eliminated whereby an influence due to the unnecessary operation upon the recording speed can be reduced.

According to this embodiment, ink is forcibly leaked through the discharge port and the interval of the operation of removing water droplet or the like is determined as the control quantity. However, the present invention is not limited to this. For example, a structure may be employed in which wiping means having a flexible blade 2041 for wiping the discharge port so that the wiping interval is controlled. In this case, a membership function similar to that shown in FIG. 35(*c*) is employed.

According to the this embodiment, the floating dust quantity and the humidity are employed as the quantities of states. The present invention is not limited to the above made description. Another structure in which the above-described interval is controlled in accordance with the quantity of state such as the time in which the apparatus is allowed to stand, the ambient temperature, the temperature of the recording head, the density of recording data and the number of sheets to be recorded each of which is measured by a means provided additionally.

Then, a modification to the above-described embodiment will be described with reference to FIGS. 40 to 43.

Figure 40:
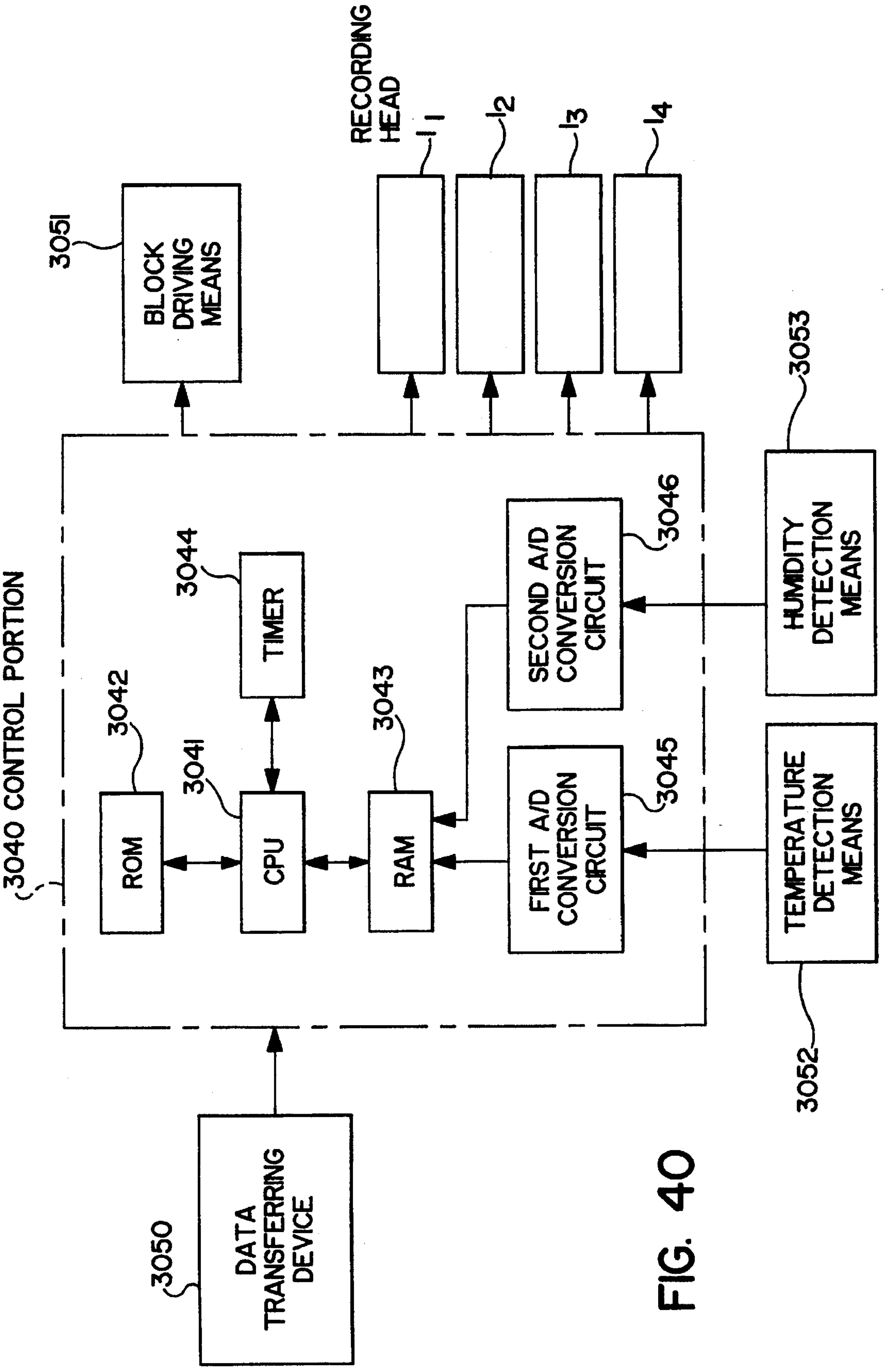
FIG. 40 is a block diagram which illustrates the schematic structure of the control portion of the ink jet recording apparatus according to an embodiment of the present invention.
Figure 42A:
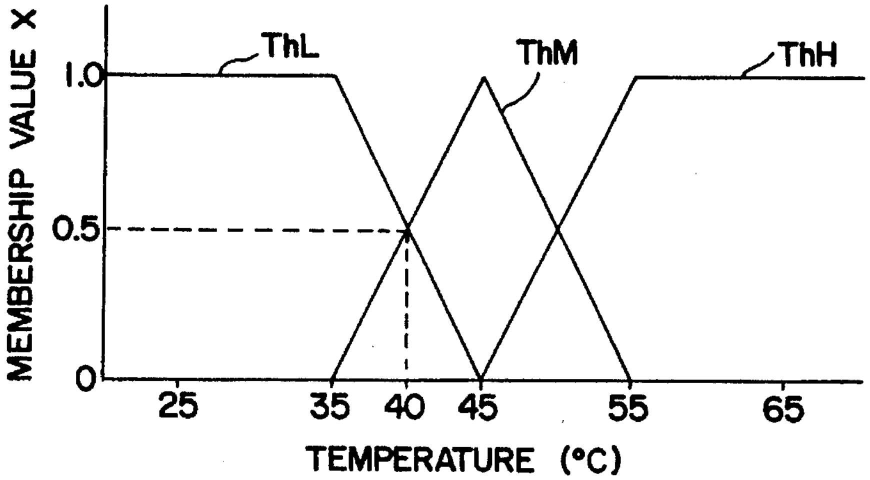
FIGS. 42(*a*), 42(*b*) and 42(*c*) are graph sets which illustrate the membership functions, where FIG. 42(*a*) is a graph which illustrates the membership function relating to temperature, FIG. 42(*b*) is a graph which illustrates the membership function relating to humidity, FIG. 42(*c*) is a graph which illustrates the membership function relating to the forcible leakage interval.
Figure 42B:
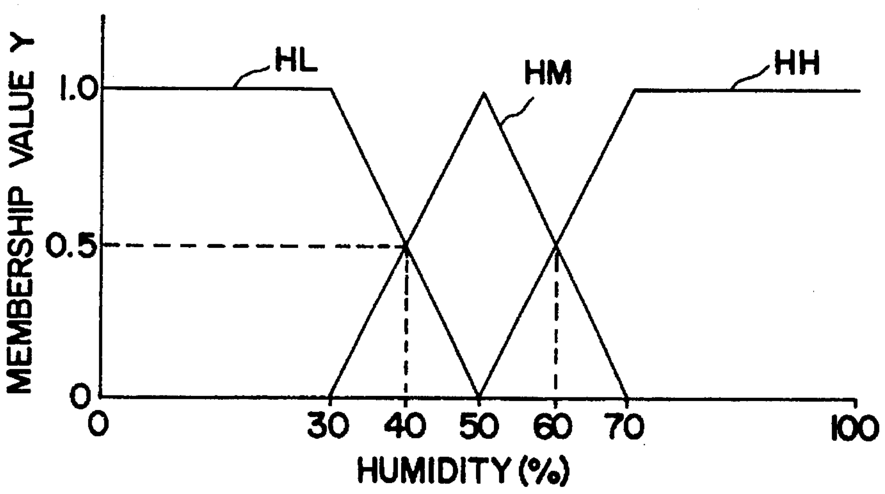
Figure 42C:
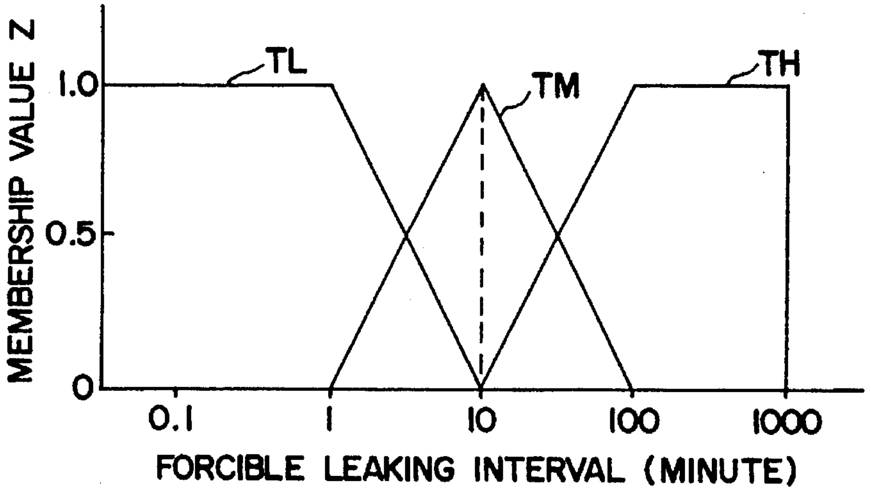

Referring to FIG. 40, a control portion 3040 comprise a timer 3044 for outputting timing signals at predetermined intervals for the purpose of counting printing time t of recording heads $\mathbf{1}_1$ to $\mathbf{1}_4$. The control portion 3040 further comprises a first analog/digital conversion circuit (to be called (a first A/D conversion circuit) 3045 serving as a temperature receiving means for receiving an analog signal representing the temperature of the recording head $\mathbf{1}_1$ detected by temperature detection means 3052 comprising a temperature detection device 3030 provided for the recording head $\mathbf{1}_1$, the analog signal being received after converted into a digital signal. The control portion 3040 further comprises a second analog/digital conversion circuit (to be called a second A/D conversion circuit) 3046 serving as a humidity receiving means for receiving an analog signal representing the humidity of the recording head $\mathbf{1}_1$ detected by humidity detection means 3053 comprising a humidity detection device 3031 provided for the recording head $\mathbf{1}_1$, the analog signal being received after converted into a digital signal. The control portion 3040 further comprises a RAM 3043 for storing the thus converted temperature, the thus converted humidity, the temperature and the humidity supplied from a data input device (omitted from illustration) as shown in FIGS. 42(*a*), 42(*b*), and 42(*c*), membership functions ThL, ThM, ThH, HL, HM, HH, TL, TM and TH which express the forcible leakage intervals after the clog has been eliminated in the form of fuzzy sets and rules expressing the relationships among the above-described temperature, the humidity and the forcible leakage interval. The control portion 3040 further comprises a microprocessor 3041 (to be called "a CPU" hereinafter) for calculating the most suitable forcible leakage interval $T_0$ from the above-described temperature and the humidity converted in accordance with the membership functions ThL, ThM, ThH, HL, HM, HH, TL, TM and TH read from the RAM 3043 and with the above-described rule, the most suitable forcible leakage interval $T_0$ being calculated by the fuzzy inference. The CPU 3041 further acts to operate the block drive means 3051 when the printing time t of the four recording heads $\mathbf{1}_1$ to $\mathbf{1}_4$ counted in response to the timing signal transmitted from the timer 3044 is longer than the most suitable forcible leakage interval $T_0$. As a result, the ink forcible leakage operation is performed. The CPU 3041 further acts to transmit printing data supplied from an external data transfer device 3050 to the four recording heads $\mathbf{1}_1$ to $\mathbf{1}_4$. The control portion 3040 further comprises a ROM 3042 for storing a program in which an operation process of the CPU 3041 is stored.

Then, the fuzzy inference according to this embodiment will be described.

First, the membership function will be described. As for the temperature, the membership functions ThL, ThM and ThH representing the low temperature, medium temperature and high temperature are defined as shown in FIG. 42(*a*). Then, membership value X representing the degrees at which temperature=40° C. belongs to the fuzzy sets of the membership functions ThL, ThM and ThH become 0.5, 0.5 and 0. Similarly, as for the humidity, the membership functions HL, HM and HH representing the low humidity, medium humidity and high humidity are defined as shown in FIG. 42(*b*). Then, membership value Y representing the degrees at which humidity=40% belongs to the fuzzy sets of the membership functions HL, HM and HH become 0.5, 0.5 and 0. Similarly, as for the forcible leakage interval, the membership functions TL, TM and TM representing the short forcible-leakage interval, medium forcible-leakage interval and long forcible-leakage interval are defined as shown in FIG. 42(*c*). Then, membership value Z representing the degrees at which the forcible-leakage interval=10 minutes belongs to the fuzzy sets of the membership functions TL, TM and TH become 0, 1.0 and 0.

The rule used for the fuzzy inference must be arranged to make the forcible leakage interval in proportion to the temperature and the humidity of the recording head $\mathbf{1}_1$. Therefore, the rule 1 is determined, for example, as follows:

(Rule 1)

If temperature=ThH and humidity=HM, then forcible leakage interval=TH (1)

(Rule 2)

If temperature=ThM and humidity=HM, then forcible leakage interval=TM (2)

Figures 43A, 43B, 43C, 43D, 43E, 43F, 43G:
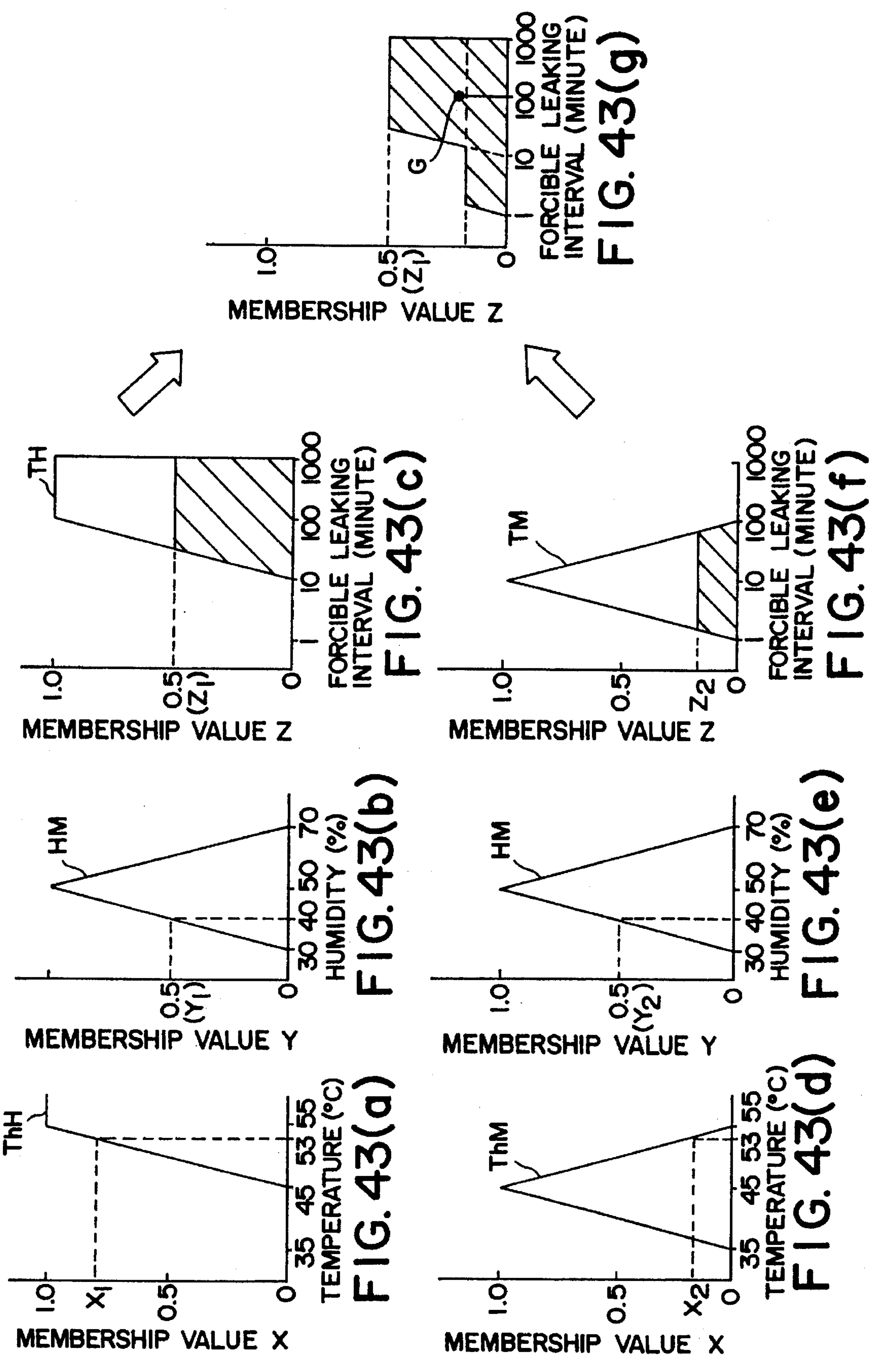
FIGS. 43(*a*), 43(*b*), 43(*c*), 43(*d*), 43(*e*), 43(*f*) and 43(*g*) are graph sets which illustrate the method of calculating the most suitable forcible leakage interval in accordance with a Mamudani method which is one of a fuzzy inference, where FIG. 43(*a*) is a graph which illustrates a method of calculating membership value $X_1$, FIG. 43(*b*) is a graph which illustrates a method of calculating membership value $Y_1$ and FIG. 43(*c*) is a graph which illustrates a method of calculating membership value $Z_1$, FIG. 43(*d*) is a graph which illustrates a method of calculating membership value $X_2$, FIG. 43(*e*) is a graph which illustrates a method of calculating membership value $Y_2$, FIG. 43(*f*) is a graph which illustrates a method of calculating membership value $Z_2$ and FIG. 43(*g*) is a graph which illustrates a method of calculating the most suitable forcible leakage interval $T_0$.
Figure 44:
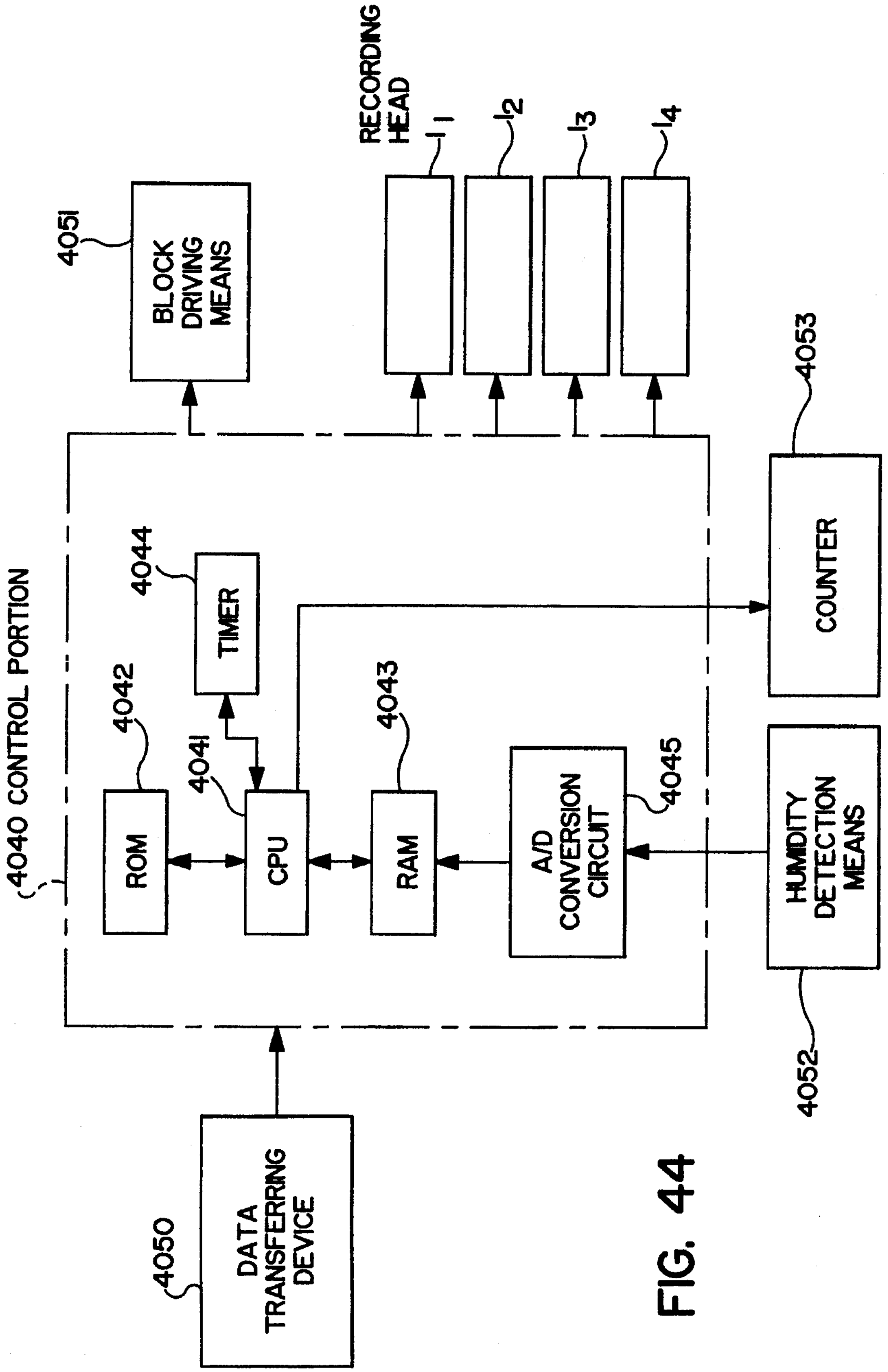
FIG. 44 is a block diagram which illustrates the schematic structure of the control portion of the ink jet recording apparatus according to an embodiment of the present invention.

The most suitable forcible-leakage interval $T_0$ in the case where the temperature of the recording head $\mathbf{1}_1$ is 53° C. and the humidity is 40% is calculated in accordance with a Mamudani method which is one of the fuzzy inference as follows:

As shown from FIG. 42(*a*), it is apparent that temperature=53° C. belongs to the fuzzy set of the membership function ThH and it is apparent from FIG. 42(*b*), that humidity=40% belongs to the fuzzy set of the membership function HM. Therefore, the above-described state corresponds to the rule 1. As a result, as shown in FIG. 43(*a*), the membership value $X_1$ (=0.75) representing the degree at which temperature=53° C. belongs to the fuzzy set of the membership function ThH is obtained. Furthermore, as shown in FIG. 43(*b*), the membership value $Y_1$ (=0.5) representing the degree at which humidity=40% belongs to the fuzzy set of the membership function HM is obtained. The two membership values $X_1$ and $Y_1$ are then subjected to a comparison. As a result, it can be known that the membership value $Y_1$ is relatively smaller. Therefore, as the degree at which the membership value $Y_1$ (=0.5) meets the condition of the rule 1 shown in Equation (1), a fuzzy set designated by diagonal lines shown in FIG. 43C in which the membership value $Z_1$ is 0.5 or less is selected from the fuzzy sets of the membership function TH of the forcible leakage interval.

Since temperature=53° C. also belongs to the fuzzy set of the membership function ThM, temperature=53° C. and Humidity=40% meet the condition of the rule 2 shown in Equation (2). Therefore, as shown in FIG. 43(*d*), membership value $X_2$ (=about 0.18) representing a degree at which temperature=53° C. belongs to the fuzzy set of the membership function ThM is obtained. Furthermore, as shown in FIG. 43(*e*), membership value $Y_2$ (=0.5) representing a degree at which humidity 40% belongs to the fuzzy set of the membership function HM is obtained. The two membership values $X_2$ and $Y_2$ are then subjected to a comparison. As a result, it can be known that the membership value $X_2$ is relatively smaller. Therefore, as the degree at which the membership value $X_2$ (=about 0.18) meets the condition of the rule 2 shown in Equation (2), a fuzzy set designated by diagonal lines shown in FIG. 43(*f*) in which the membership value $Z_2$ is about 0.18 or less is selected from the fuzzy sets of the membership function TM of the forcible leakage interval.

Then, the sum of the fuzzy sets selected in FIGS. 43(*c*) and 43(*f*) is obtained and the center of gravity G is calculated. As a result, the most suitable forcible leakage interval $T_0$ (=100 minutes) in this case can be obtained as shown in FIG. 43(*g*).

Figure 41:
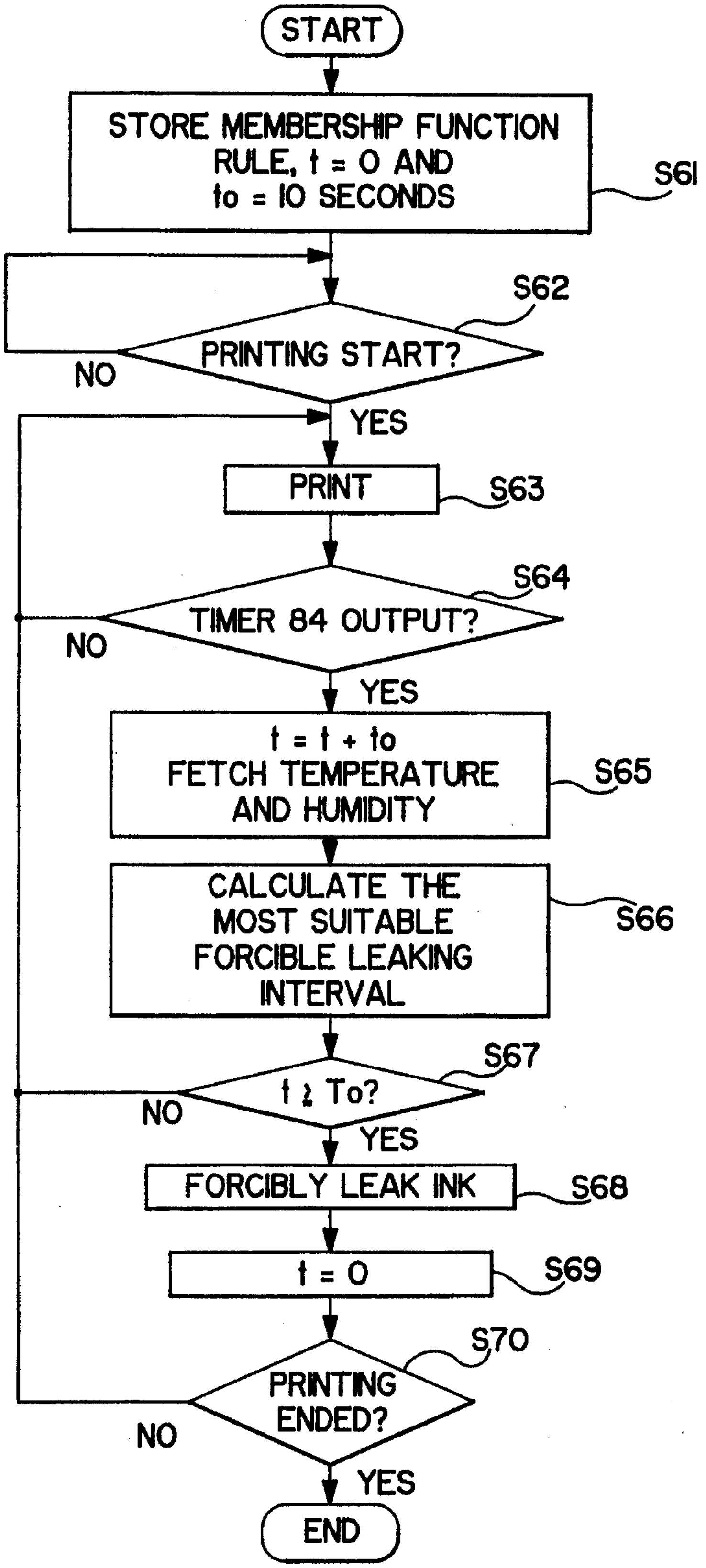
FIG. 41 is a flow chart which illustrates the operation for calculating the most suitable forcible leakage interval performed in the control portion.

Then, the operation of the control portion 3040 will be described with reference to a flow chart shown in FIG. 41.

Prior to the start of operation of the ink jet recording apparatus according to this embodiment, the membership functions ThL, ThM, ThH, HL, HM, HH, TL, TM and TH relating the temperature, the humidity and the forcible leakage interval, rules for use in the fuzzy inference, time interval $t_0$ (=10 seconds) of the timing signal transmitted from the timer 3044 to the CPU 3041 and the initial value (=0) of the printing time t counted by the CPU 3041 in response to the timing signal are stored in the RAM 3043 (step S61).

Then, after the printing operation has been started (step S62), the CPU 3041 transfers printing data supplied from the data transferring device 3050 (see FIG. 40) to the four recording heads $\mathbf{1}_1$ to $\mathbf{1}_4$ so that recording data is printed on the recording sheet (step S63). When the timing signal is transmitted from the timer 3044 during the printing operation (step S64), the CPU 3041 adds data for the initial value (=0 second) of the printing time t and the time interval $t_0$ (=10 seconds) at which the timing signal is transmitted and stores the result (=10 seconds) of the addition in the RAM 3043 as a novel printing time t. Then, the temperature transmitted from the temperature detection means 3052 and the humidity transmitted from the humidity detection means 3053 are supplied to the RAM 3043 via the first A/D conversion circuit 3045 and the second A/D conversion circuit 3046 (step S65). Furthermore, the CPU 3041 calculates the most suitable forcible leakage interval $T_0$ from the above-described temperature and humidity by the fuzzy inference (step S66). The CPU 3040 makes a comparison between the thus calculated most suitable forcible leakage interval $T_0$ and the novel printing time t (=10 seconds) stored in the RAM 43. If the novel printing time t is shorter than the most suitable forcible leakage interval $T_0$, the operation from step S63 is repeated (step S67). However, the above-described addition ensuing the next time is performed in such a manner that the printing time t and the time interval $t_0$. If the novel printing time t is longer than the most suitable forcible leakage interval $T_0$, the CPU 3041 operates the block drive means 3051 so that the four recording head $\mathbf{1}_1$ to $\mathbf{1}_4$ operate the ink forcibly-leaking operation (step S68). When the ink forcibly-leaking operation has been completed, the novel printing time t is, as zero second, stored in the RAM 3043 (step S69). Then, the operation from step S63 is repeated until the printing process has been completed (step S70).

The ink jet recording apparatus according to this embodiment has a means for forcibly leaking ink through the nozzle of the recording head as a clogging recovery means for recovering the clogging of the nozzle of the recording head. Furthermore, the ink jet recording apparatus according to this embodiment has a temperature detection means for detecting the temperature of the recording head and a humidity detection means for detecting the humidity of the recording head as quantity of state detection which is used to estimate the viscosity increase of ink in the nozzle of the recording head.

The ink jet recording apparatus according to this embodiment is arranged in such a manner that the temperature detection device 3030 and the humidity detection device 3031 are provided for only the recording head $1_1$ whereby the ink forcibly leaking operation of the four recording heads $1_1$ to $1_4$ is performed at the most suitable forcible leakage interval $T_0$ calculated from the temperature detected by using the temperature detection device 3030 and the humidity detected by using the humidity detection device 3031. However, another structure may be employed in which the temperature detection device and the humidity detection device are respectively provided for the other recording heads 12 to 14 and the most suitable forcible leakage interval is obtained for each of the recording heads $1_1$ to $1_4$ whereby the ink forcibly leaking operation is independently performed at the most suitable forcible leakage interval.

According to this modification, the most suitable forcible leakage interval $T_0$ is obtained by detecting the temperature and the humidity of the recording head. However, since the thickness of the ink also depends upon the time in which the recording head is allowed to stand and the room temperature, another structure may be employed in which at lest one of the four recording heads $1_1$ to $1_4$ is detected and the most suitable forcibly leaking interval is similarly calculated on the basis of the result of the above-described detection. However, in the case where the time in which the recording head is allowed to stand and the room temperature are used, a fuzzy inference rule is employed which is arranged in such a manner that the driving interval is shortened when the time in which the recording head is allowed to stand and the room temperature becomes higher.

According to this modification, the clogging recovery means is arranged to forcibly leak ink through the nozzle of the recording head. However, a means (empty discharge means) for forcibly discharging ink through the nozzle of the recording head and disclosed in Japanese Patent Laid-Open No. 58-171693 may be employed so as to operate this means at the most suitable forcible leakage interval. Furthermore, a known means for forcibly sucking ink from the nozzle of the recording head may be provided for the capping unit so that this means is operated at the thus calculated most suitable forcible leakage interval.

A second modification of this embodiment will be described with reference to FIGS. 44 to 47.

Figure 46A:
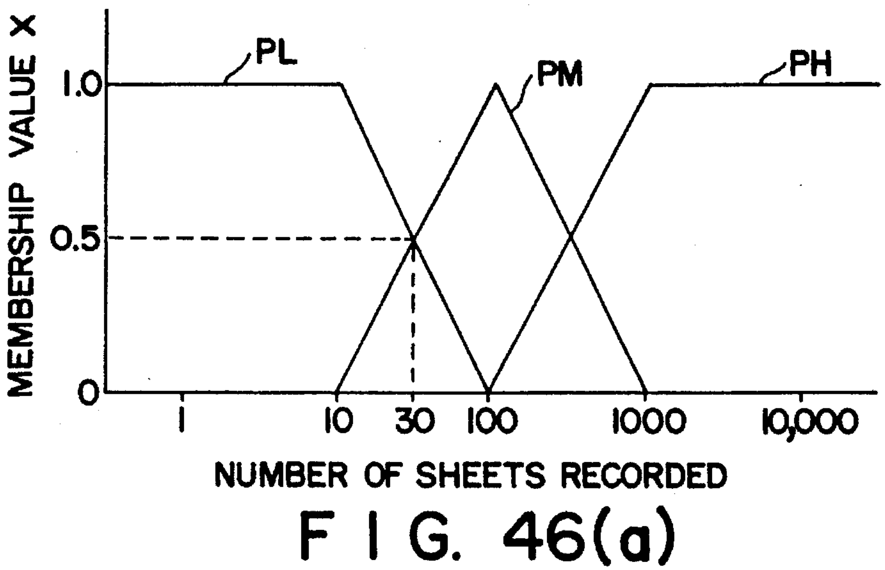
FIGS. 46(*a*), 46(*b*) and 46(*c*) are graph sets which illustrate the membership functions, where FIG. 46(*a*) is a graph which illustrates the membership function relating to number of sheets to be recorded, FIG. 46(*b*) is a graph which illustrates the membership function relating to humidity, FIG. 46(*c*) is a graph which illustrates the membership function relating to the operation interval.
Figure 46B:
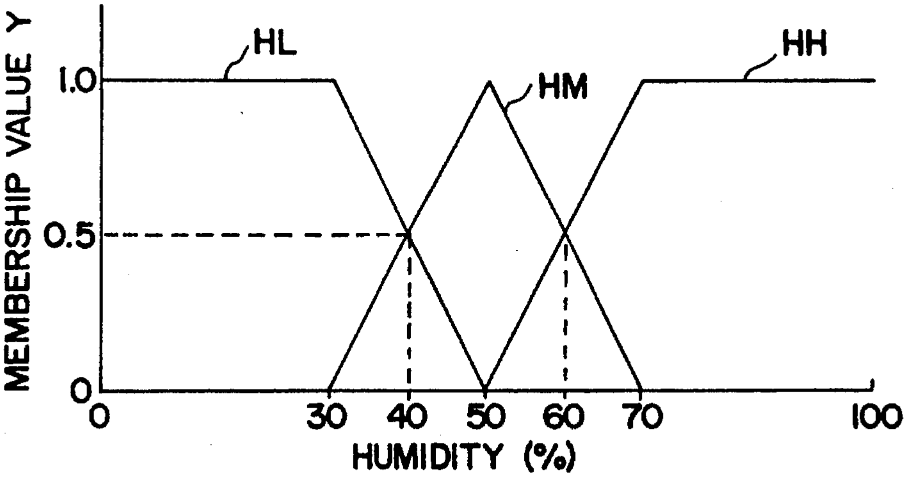
Figure 46C:
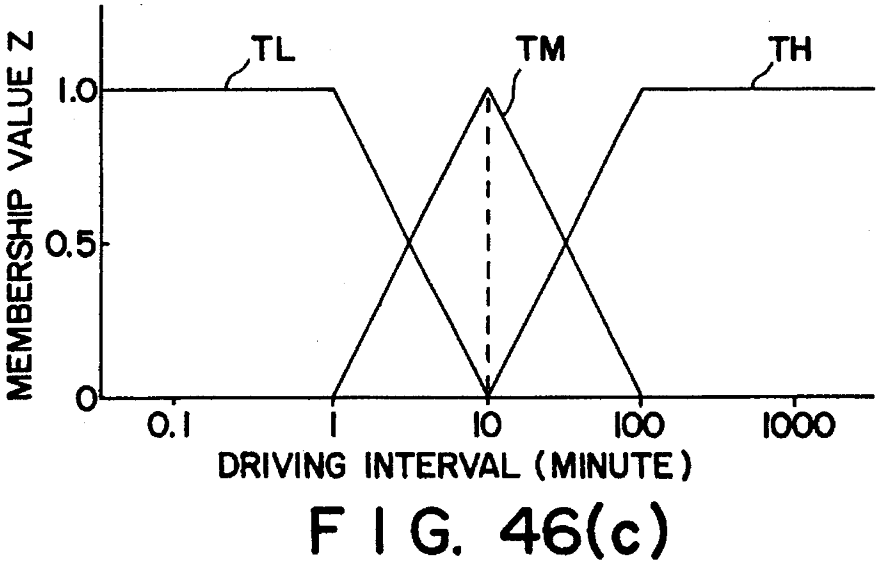

A control portion 4040 comprises a timer for transmitting timing signal at predetermined time for the purpose of counting the printing time t of the four recording heads $1_1$ to $1_4$. The control portion 4040 further comprises an analog/digital conversion circuit (to be called "an A/D conversion circuit" hereinafter) 4045 for receiving an analog signal representing the humidity of the recording head $1_1$ detected by a humidity detection means 4052 comprising a humidity detection device 4031 provided for the recording head $1_1$, the analog signal being received after converted into a digital signal. The control portion 4040 further comprises a RAM 4043 in which the thus converted humidity, membership functions PL, PM, PH, HL, HM, HH, TL, TM and TH expressing the number of recording sheets, the humidity and the operation interval each of which is shown in FIGS. 46(*a*), 46(*b*) and 46(*c*) and which are supplied through a data input device (omitted from illustration) and rules showing the relationship between the above-described recording sheets and the humidity and the operation interval. The control portion 4040 further comprises a microprocessor (to be called "a CPU" hereinafter) 4041 for calculating the most suitable operation interval $T_0$ by using the number of recording sheets and the thus converted humidity supplied from the counter 4053 in accordance with the membership functions PL, PM, PH, HL, HM, HH, TL, TM and TH and the above-described rule by the fuzzy inference. The CPU 4041 further acts to operate the block operating means 4051 if the printing time of the four recording heads $1_1$ to $1_4$ thus counted in response to the timing signal transmitted from the timer 4044 is longer than the above-described most suitable operation interval $T_0$. As a result, the block operating means 4051 performs the cleaning operation. Furthermore, the CPU 4041 acts to transmit printing data supplied from an external data transferring device 4050 to the four recording heads $1_1$ to $1_4$. The control portion 4040 further comprises a ROM 4042 in which a program, in which the operation process of the CPU 4041 is stored, is stored. In addition, a counter 4053 four counting the number of recording sheets which has been printed is connected to the CPU 4041.

Then, a fuzzy inference in this case will briefly be described.

First, the membership function will be described.

For example, membership functions PL, PM and PH which respectively showing a state in which the number of recording sheets is small, a state in which the number of the recording sheets is medium and a state in which the number of the recording sheets is large are defined as shown in FIG. 46(*a*). A membership value X showing the degree at which number of recording sheets=30 belongs to the fuzzy sets of the membership functions PL, PM and PH becomes 0.5, 0.5 and 0, respectively. Similarly, membership functions HL, HM and HH showing a state in which the humidity is low, a state in which the humidity is medium and a state in which the humidity is high are defined as shown in FIG. 46(*b*). A membership value Y showing the degree at which the humidity=40% belongs to the fuzzy sets of the membership functions HL, HM and HH becomes 0.5, 0.5 and 0, respectively. Similarly, membership functions TL, TM and TH showing a state in which the operation interval is short, a state in which the operation interval is medium and a state in which the operation interval is long are defined as shown in FIG. 46(*c*). A membership value Z showing the degree at which the operation interval=10 minutes belongs to the fuzzy sets of the membership functions TL, TM and TH becomes 0.1, 0 and 0.

The rule for use in the fuzzy inference must be arranged in such a manner that the operation interval becomes shorter when the number of the recording sheets becomes larger or the humidity becomes higher. Therefore, rules are defined as follows:

(Rule 1)

If number of recording sheets=PH and humidity=HM, then operation interval=TL (1)

(Rule 2)

If number of recording sheets=PM and humidity=HM, then operation interval=TM (2)

The most suitable operation interval $T_0$ in the case where the number of the recording sheets is 80 and the humidity of the recording head $1_1$ is 40% by the Mamudani method which is one of the fuzzy inference will be described.

As is shown from FIG. 46(*a*), number of recording sheets=80 belongs to the fuzzy set of the membership function PH, while the humidity=40% belongs to the fuzzy set of the membership function HM. Therefore, this case corresponds to the condition of the rule 1 expressed by Equation (1). Therefore, as shown in FIG. 47(*a*), membership value $X_1$ (=0.75) showing the degree at which the number of recording sheets=80 belongs to the fuzzy set of the membership function PH is obtained. Similarly, as shown in FIG. 47(*b*), membership value $Y_1$ (=0.5) showing the degree at which the humidity=40% belongs to the fuzzy set of the membership function HM is obtained. Then, the thus obtained membership values $X_1$ and $Y_1$ are subjected to a comparison, resulting that the membership value $Y_1$ to be relatively smaller. Therefore, as the degree at which the membership value $Y_1$ (=0.5) meets the condition of the rule 1 shown in Equation (1), a fuzzy set designated by diagonal lines shown in FIG. 47(*c*) in which the membership value $Z_1$ is 0.5 or less is selected from the fuzzy sets of the membership function TL of the operation interval.

As shown in FIG. 46(*a*), the number of recording sheets=80 also belongs to the fuzzy set of the membership function PM. Therefore, the number of the recording sheets=80 and the humidity=40% also correspond to the condition of the rule 2 shown in Equation (2). Therefore, as shown in FIG. 47(*d*), membership value $X_2$ (=about 0.18) showing the degree at which the number of recording sheets=80 belongs to the fuzzy set of the membership function PM is obtained. Similarly, as shown in FIG. 47(*e*), membership value $Y_2$ (=0.5) showing the degree at which the humidity=40% belongs to the fuzzy set of the membership function HM is obtained. Then, the thus obtained membership values $X_2$ and $Y_2$ are subjected to a comparison, resulting that the membership value $X_2$ to be relatively smaller. Therefore, as the degree at which the membership value $X_2$ (=about 0.18) meets the condition of the rule 2 shown in Equation (2), a fuzzy set designated by diagonal lines shown in FIG. 47(*c*) in which the membership value $Z_2$ is about 0.18 or less is selected from the fuzzy sets of the membership function TM of the operation interval.

Then, the sum of the fuzzy sets selected in FIGS. 47(*c*) and 47(*f*) is obtained and the center of gravity G is calculated. As a result, the most suitable operation interval $T_0$ (=2 minutes) in this case can be obtained as shown in FIG. 47(*g*).

Figure 45:
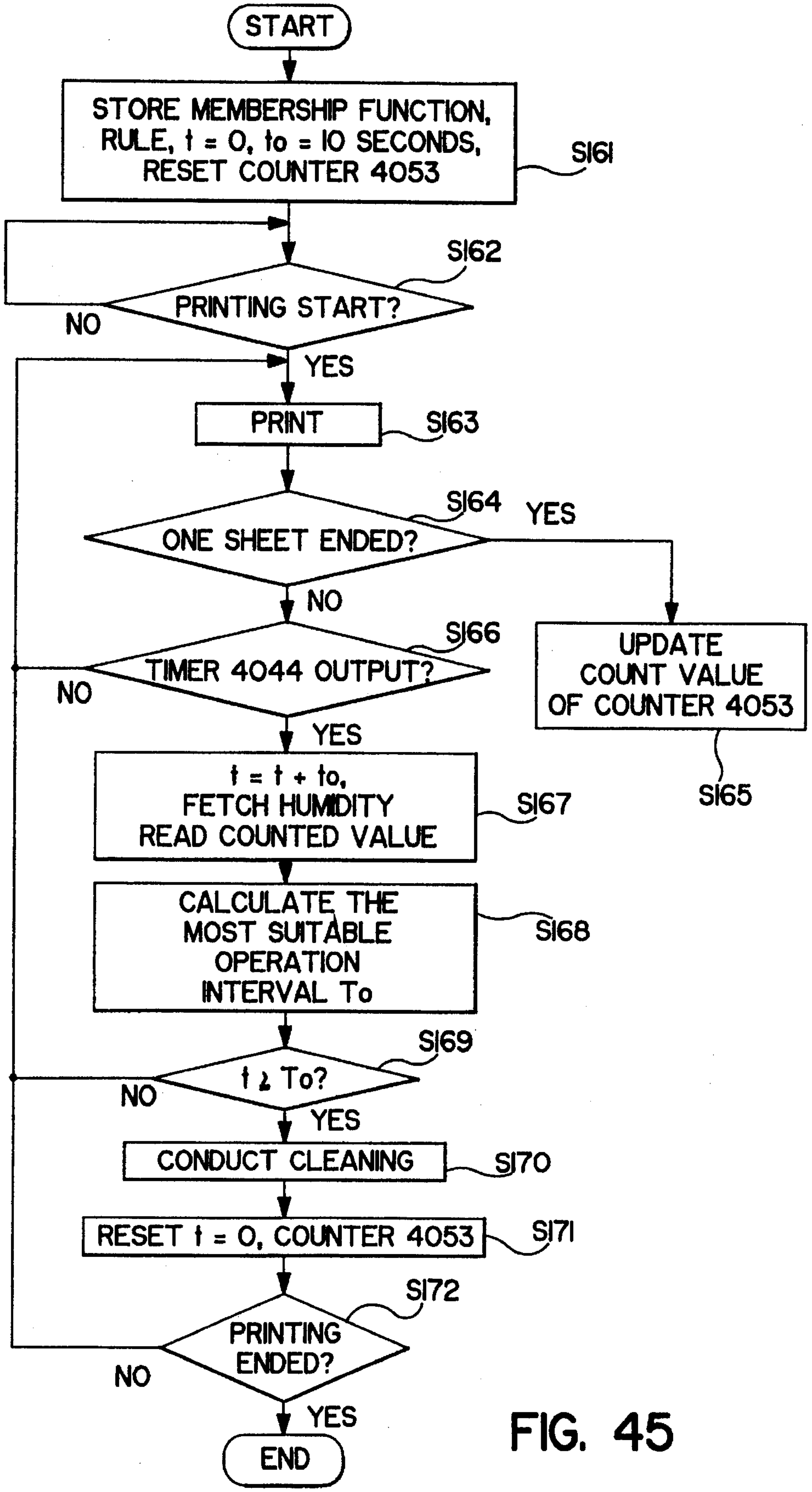
FIG. 45 is a flow chart which illustrates the operation for calculating the most suitable operation interval in the control portion.

Then, the operation of the control portion 4040 will be described with reference to a flow chart shown in FIG. 45.

Prior to the start of operation of the ink jet recording apparatus according to this embodiment, the membership functions PL, PM, PH, HL, HM, HH, TL, TM and TH relating the number of recording sheets, the humidity and the operation interval, rules for use in the fuzzy inference, time interval $t_0$ (=10 seconds) of the timing signal transmitted from the timer 4044 to the CPU 4041 and the initial value (=0) of the printing time t counted by the CPU 4041 in response to the timing signal are stored in the RAM 4043, and the counter 4053 (see FIG. 44) for counting the number of the recorded sheets is reset by the CPU 4041 (step S161).

When the printing operation has been started (step S162), the CPU 4041 transfers printing data supplied from a data transferring device 4050 (see FIG. 44) to the four recording heads $\mathbf{1}_1$ to $\mathbf{1}_4$ so that printing on the recording sheet is performed (step S163). After printing for one page of the recording sheet has been completed, the CPU 4041 updates the count of the counter 4053 by increasing it by one (steps S164 and S165). When the timing signal is transmitted from the timer 4044 during the printing operation (step S166), the CPU 4041 adds data for the initial value (=0 second) of the printing time t stored in the RAM 4043 and data for the time interval $t_0$ (=10 seconds) at which the timing signal is transmitted so as to store the result (=10 seconds) of the addition as a novel printing time t in the RAM 4043. The humidity which has been transmitted from the humidity detection means 4052 is supplied to the RAM 4043 via the A/D conversion circuit 4045. Furthermore, the CPU 4041 read the number of recording sheets indicated by the counter 4053 (step S167). As a result, the most suitable operation interval $T_0$ is calculated from the number of the recording sheets and the humidity by the fuzzy inference (step S168). The CPU 4041 makes a comparison between the thus calculated most suitable operation interval $T_0$ and the novel printing time t (=10 seconds) stored in the RAM 4043. If the novel printing time t is shorter than the most suitable operation interval $T_0$, the operation from step S163 is repeated (step S169). However, the addition from the second time is performed in such a manner that the novel printing time t and the time interval $t_0$ are added. If it has been determined in step S169 that the novel printing time t is longer than the most suitable operation interval $T_0$, the CPU 4041 operates the block operating means 4051 so as to perform the cleaning operation of the four recording heads $\mathbf{1}_1$ to $\mathbf{1}_4$ (step S170). After the cleaning operation has been completed, the novel printing time is, as zero second, stored in the RAM 4043 and the counter 4053 is reset (step S171). Then, the operation from steps 163 is repeated until the printing operation is completed (step S172).

Figure 39:
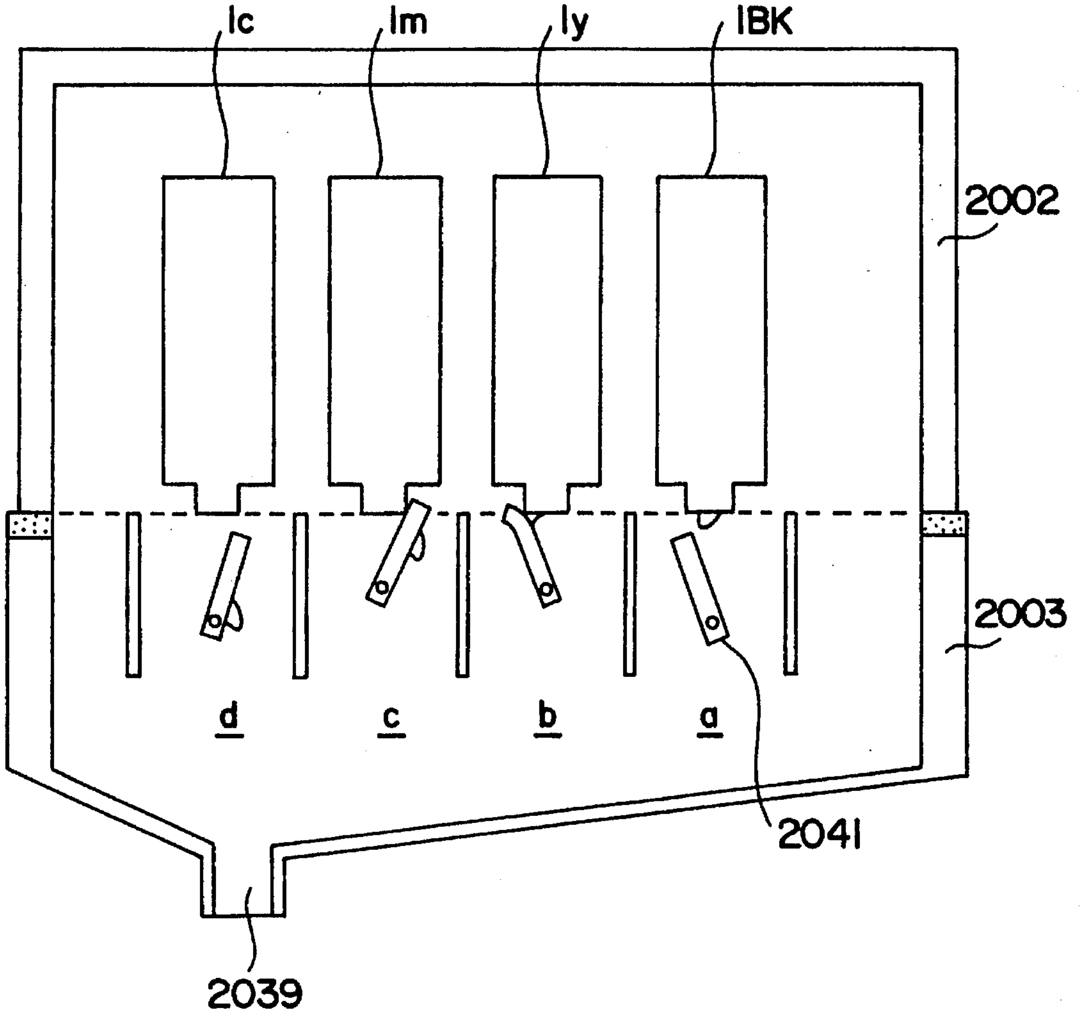

The ink jet recording apparatus according to this modification has, as a cleaning means for the discharge port of the recording head, a means for wiping the discharge port of the recording head by a flexible blade shown in FIG. 39. The ink jet recording apparatus further comprises the counter for counting the number of the recording sheets and the humidity detection means as a means for detecting the quantity of state for the purpose of estimating the state of the discharge port of the recording head.

The ink jet recording apparatus according to this embodiment is arranged in such a manner that the humidity detection device 4031 is provided for only the recording head $\mathbf{1}_1$ whereby the cleaning operation of the four recording heads $\mathbf{1}_1$ to $\mathbf{1}_4$ is performed at the most suitable operation interval $T_o$ calculated from the humidity detected by using the humidity detection device 4031 and the number of recording sheets counted by the counter 4053. However, another structure may be employed in which the humidity detection device is provided for the other recording heads $\mathbf{1}_2$ to $\mathbf{1}_4$ and the most suitable operation interval is obtained for each of the recording heads $\mathbf{1}_1$ to $\mathbf{1}_4$ whereby the cleaning operation is independently performed at the most suitable operation interval.

According to this embodiment, the most suitable operation interval $T_o$ is obtained by detecting the number of the recording sheets and the humidity of the recording head. However, the generation frequency of the adhesion of ink droplets to the discharge port of the recording head depends upon the time in which the recording head is allowed to stand and the room temperature. Therefore, at least one of the five factors is detected whereby the most suitable operation interval is similarly calculated on the basis of the result of the above-described detection. In the case where the temperature of the recording head, the time in which the recording head is allowed to stand and the room temperature are used, the rule for the fuzzy inference must be arranged in such a manner that the more the temperature of the recording head is, and the shorter the time in which the recording head is allowed to stand is, the operation interval becomes shorter.

According to this embodiment, a wiping means having a flexible blade is employed to wipe the discharge port of the recording head as the cleaning means. However, another structure may be employed in which ink is forcibly leaked through the nozzle of the recording head and a known means for wiping ink leaked from the discharge port of the recording head is employed, the known means being arranged to be operated at the thus calculated most suitable operation interval. Furthermore, another structure may be employed in which a know means for wiping ink leaked from the discharge port of the recording head after forcibly sucking ink from the nozzle of the recording head is provided for the capping unit 2003 and the thus provided means is operated at the thus calculated most suitable operation interval.

As the subject to be controlled, further factors may be controlled in addition to the above-described interval of the removal operation, for example, the removal operation time, the interval of the removal operation, the removal operation time, the operation time of a heater or a fan disposed around the recording head for controlling the temperature of the ink jet head for the purpose of uniforming the ink viscosity and the diameter of the discharged ink droplet and the operating energy. In particular, the fuzzy inference may be effectively employed in a control for stably operating the recording head.

According to this embodiment, an excellent effect can be obtained when applied to a bubble jet type recording head or apparatus of a variety of ink jet recording systems. According to the above-described structure, high density and precise recording can be performed.

It is preferable that the basic principle disclosed in, for example, U.S. Pat. Nos. 4,723,129 and 4,740,796 be employed. The thus disclosed principle can be applied to both a so-called "ON DEMAND" type and "CONTINUOUS" type. In particular, in the case of the ON DEMAND type, an excellent effect can be obtained since bubbles respectively corresponding to the operation signals can be formed in liquid (ink). The bubbles can be formed as a result of the processes arranged in such a manner that at least an operation signal, which corresponds to the recording information and with which a rapid temperature rise exceeding a nuclear boiling is given, is applied to an electrothermal converting material which is disposed so as to correspond to the sheet or the passage holding liquid (ink). As a result, the electrothermal converting material generates thermal energy which causes the surface of the recording head, on which heat acts, to generate the film boiling. When the bubbles is enlarged or contracted, liquid (Ink) is discharged through a discharge port so as to form at least a droplet. If the operation signal is arranged to be in the form of a pulse, the bubbles can be immediately and properly enlarged and/or contracted. Therefore, a discharge of liquid (ink) exhibiting an excellent response can be realized, causing an excellent effect to be obtained. As the pulse-shaped operation signal, it is preferable that operation signals disclosed in U.S. Pat. Nos. 4,463,359 and 4,345,262 be employed. Furthermore, if conditions relating to the ratio of temperature rise at the surface on which heat acts and disclosed in U.S. Pat. No. 4,313,124 are employed, a further improved recording can be performed.

As the structure of the recording head, in addition to the structure in which the discharge port, the liquid passage and the electrothermal converting material are combined (a linear liquid passage or a rectangular liquid passage) as disclosed in the above-described disclosure, a structure disclosed in U.S. Pat. Nos. 455,833 and 4,459,600 in which the heat effecting portion is disposed in a bent portion is included in the scope of the present invention. In addition, the present invention is effective in a structure in which a common slit for a plurality of electrothermal conversion material is arranged to serve as a discharge portion of the electrothermal conversion material and which has been disclosed in Japanese Patent Laid-Open No. 59-123670. Furthermore, the present invention is effective in a structure in which an aperture for absorbing pressure wave of thermal energy is disposed so as to correspond to the discharge portion. That is, the recording can be effectively performed regardless of the structure of the recording head.

Furthermore, the present invention can be effectively employed in a recording head of a full-line type having a length corresponding to the maximum width of the recording medium of a recording apparatus. The recording head of the above-described type may be arranged in such a manner that a plurality of recording heads are arranged to become the above-described length or that an integrally formed recording head is disposed.

In addition, the present invention can be effectively applied to a serial type recording head for example a recording head fixed to the body of the apparatus, an exchangeable chip type recording head mounted on the body of the apparatus so as to be electrically connected therebetween or capable of supplied with ink from the body of the apparatus and a cartridge type recording head arranged such that an ink tank thereof is integrally provided for the recording head.

It is preferable that a recovery means and a sub-assisting means for the recording head be provided for the structure since the effect of the present invention can be further stabilized. Specifically, it is effective for the stable recording to employ a capping means, a cleaning means, a pressure application or suction means for the recording head, and electrothermal converting material, or another heating device, or a pre-heating means combining the above-described two elements. In addition, it is preferable that a pre-discharge mode to be arranged in which another discharge is performed independently from the recording discharge.

The types and the number of the recording heads may be arranged variously, for example, one recording head is provided for a single color and a plurality of recording heads are provided so as to correspond to a plurality of ink types which are different in the color and the density. That is, the present invention can be significantly effectively applied to an apparatus having a recording mode in which the major color, black is used and to an apparatus arranged in such a manner that the recording heads are integrally formed or a plurality of recording heads are combined so that a recording with a plurality of different colors or full color realized by mixing colors can be performed.

Although ink in the form of liquid is employed according to the above-described embodiments, ink which is solidified at room temperature or less and which is softened or liquidized at room temperature may be employed. Furthermore, in the ink jet system, any ink which becomes liquid at the time of receiving the recording signal may be employed since the ink jet system is structured in such a manner that its temperature is controlled so as to make the viscosity of ink in a stable discharge range by controlling the temperature of ink in a range between 30° C. and 70° C. Furthermore, the present invention can be effectively employed in a structure in which the temperature rise due to thermal energy is prevented by using it as energy to convert the solid state of ink into liquid state and a structure in which ink, which can be solidified when it is allowed to stand, is used for the purpose of preventing the evaporation of ink. That is, the present invention can be effectively employed in a structure arranged in such a manner that ink which can be liquidized when thermal energy is applied thereto is used, such as a structure in which ink is liquidized when thermal energy is supplied corresponding to the recording signal so that liquid ink is discharged and a structure in which ink which starts solidifying when ink reaches the recording medium is used. In this case, ink may be held as a liquid or solid material in the recessed portion of a porous sheet or through holes at a position confronting the electrothermal converting material as disclosed in Japanese Patent Laid-Open No. 54-56847 or 60-71260. It is the most preferable that the above-described film boiling system be employed with each of the above-described types of ink.

Furthermore, the ink jet recording apparatus may be used as an image output terminal of an information processing apparatus such as a computer, a copying machine formed by combining with a reader and a facsimile having signal transmitting/receiving function.

As described above, the degrees at which, for example, the ambient humidity of the recording head and the floating dust quantity in the atmosphere belong to the fuzzy sets are obtained. Then, the most suitable interval can be obtained from the thus obtained degrees and the fuzzy sets about the interval of, for example, the adhered material removal operation.

As a result, the removal operation can be performed at the most suitable interval, causing unnecessary removal operation to be eliminated. Therefore, the recording speed in the overall body of the apparatus can be improved. Thus, the function of the apparatus can be allowed to exhibit satisfactorily.

As described above, according to the present invention, the control of a variety of image forming apparatuses the relationship between the quantity of state of which and the control quantity of which is controlled by a fuzzy relationship can be smoothly and accurately performed since a fuzzy inference is employed.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image forming apparatus for forming an image on a recording material comprising:

a plurality of processing means for forming said image;

detection means for detecting a plurality of state parameters of a physical condition of at least one of said plurality of processing means, the plurality of state parameters being applied to membership functions to calculate a fuzzy inference; and a transmission line for transmitting the detected state parameters to a computer at a predetermined time interval, said computer uses the fuzzy inference to infer a control parameter for controlling at least one of said plurality of processing means based on the detected state parameters, the control parameter is calculated from the fuzzy inference.

2. An image forming apparatus having a plurality of processing means for performing a process for forming an image on a recording material, said image forming apparatus comprising:

a detector for detecting a plurality of state parameters of a condition of at least one of said plurality of processing means;

a memory for storing a rule for qualitatively relating said state parameters with a control parameter for controlling at least one of said processing means;

a function memory for storing a function expressing said state parameters and said control parameter with a fuzzy set, the plurality of state parameters being applied to the function in accordance with the rule to calculate a fuzzy inference; and a transmission line for transmitting the detected state parameters to a computer, at a predetermined time interval, said computer infers said control parameter in accordance with said rule stored in said memory and said function stored in said function memory, the control parameter is calculated from the fuzzy inference.

3. An image forming apparatus according to claim 2, wherein said computer deduces a classification into which at least a plurality of state parameters at a certain moment belongs to a membership function which expresses said state parameters of an antecedent portion of said rule by a fuzzy set;

infers a classification into which a membership function which expresses said control parameter of a consequent portion of said rule belongs to said state parameters at said moment by using said deduced classification;

synthesizes a plurality of said inferred classifications for a predetermined plurality of rules; and deduces an actual control parameter from a membership function deduced from said synthesized classifications.

4. An image forming apparatus according to claim 3, wherein said classification belonging to said state parameters is obtained by a minimum value calculation.

5. An image forming apparatus according to claim 3, wherein said classification belonging to said state parameters is obtained by a multiplication of a predetermined coefficient.

6. An image forming apparatus according to claim 3, wherein said classification belonging to said control parameter is obtained from a maximum value of a classification belonging to said state parameters.

7. An image forming apparatus according to claim 3, wherein said actual control parameter is obtained by deducing a center of gravity from the classification of said fuzzy set of said control parameter.

8. An image forming apparatus according to claim 2, further comprising means for changing said fuzzy set stored in said function memory.

9. An image forming apparatus according to claim 8, wherein said change means comprises an instruction means through which said change of said fuzzy set can be instructed.

10. An image forming apparatus according to claim 8, wherein said change means comprises an external memory whereby said fuzzy set stored in said function memory can be changed in accordance with a fuzzy set stored in said external memory.

11. An image forming apparatus according to claim 10, wherein said external memory is an IC card.

12. An image forming apparatus according to claim 2, further comprising a memory which stores a function expressing said state parameters by at least a fuzzy set.

13. An image forming apparatus according to claim 2, further comprising a memory which stores said function expressing said control parameter by at least a fuzzy set.

14. An image forming apparatus according to claim 2, wherein at least one of said memory, said function memory and said computer utilize a look-up table stored in a ROM.

15. An image forming apparatus according to claim 2, wherein said process is a process in which a latent image is formed on a photosensitive material, the latent image is developed by a developing means and the developed latent image is transferred onto a transfer paper.

16. An image forming apparatus according to claim 15, wherein said processing means includes at least one of charging means, exposing means, developing means, transferring means, paper feeding means, conveying means, fixing means and image forming mode setting means.

17. An image forming apparatus according to claim 2, wherein said processing means is a process in which an image is formed on a recording material by an ink jet head which sprays an ink on the recording material.

18. An image forming method for forming an image on a recording material, the method comprising the steps of:

forming said image by a plurality of processors;

detecting a plurality of state parameters of a physical condition of at least one of said plurality of processors, the plurality of state parameters being applied to membership functions to calculate a fuzzy inference; and transmitting the detected state parameters via a transmission line to a computer at a predetermined time interval and fuzzy inferencing and calculating a control parameter from the fuzzy inference to control at least one of said plurality of processors based on the detected state parameters.

19. An image forming apparatus for forming an image on a recording material comprising:

a plurality of processing means for forming said image;

detecting means for detecting a plurality of state parameters of a physical condition of at least one of said plurality of processing means, the plurality of state parameters being applied to membership functions to calculate a fuzzy inference; and a transmission line for transmitting the detected state parameters to a computer, said computer uses the fuzzy inference to infer a control parameter for controlling at least one of said plurality of processing means based on the detected state parameters, the control parameter is calculated from the fuzzy inference.

20. An image forming apparatus according to claim 19, wherein said computer performs the fuzzy inference in a sub-routine of a computer program.

21. An image forming method for forming an image on a recording material, the method comprising the steps of:

forming said image by a plurality of processors;

detecting a plurality of state parameters of a physical condition of at least one of said plurality of processors, the plurality of state parameters being applied to membership functions to calculate a fuzzy inference; and transmitting the detected state parameters via a transmission line to a computer and calculating a control parameter from the fuzzy inference to control at least one of said plurality of processors based on the detected state parameters.

* * * * *

UNITED STATES PATENT AND TRADEMARK OFFICE
CERTIFICATE OF CORRECTION

PATENT NO. : 5,579,438

DATED : November 26, 1996

INVENTOR(S) : Satoshi Kaneko, et al.

It is certified that error appears in the above-indentified patent and that said Letters Patent is hereby corrected as shown below:

COVER PAGE

Under [56] References Cited, "4,348 102 9/1987 Sessink" should read --4,348,102 9/1982 Sessink--.

COLUMN 9

Figures 47A, 47B, 47C, 47D, 47E, 47F, 47G:
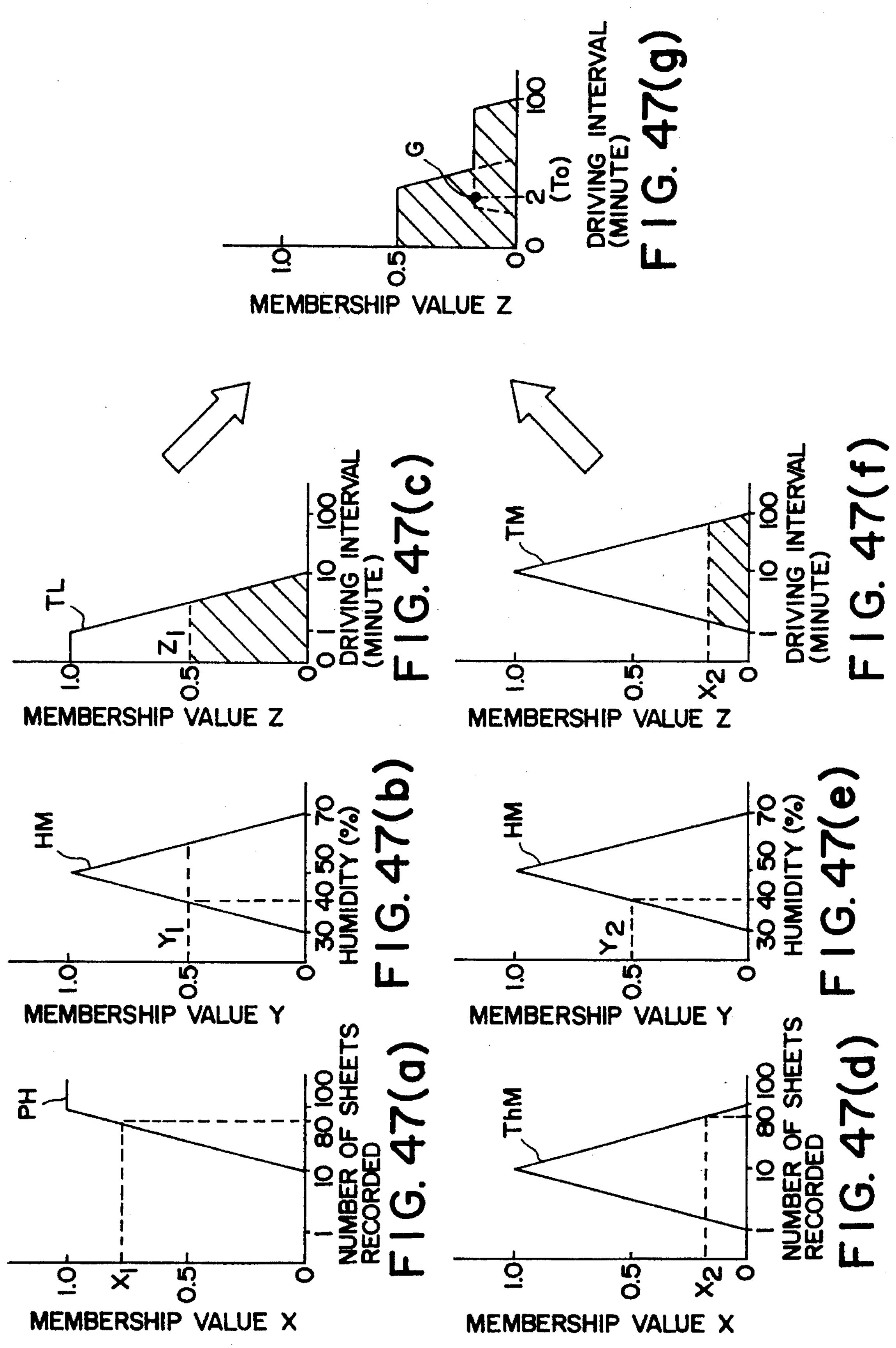
FIGS. 47(*a*), 47(*b*), 47(*c*), 47(*d*), 47(*e*), 47(*f*) and 47(*g*) are graph sets which illustrate the method of calculating the most suitable operation interval in accordance with a Mamudani method which is one of a fuzzy inference, where FIG. 47(*c*) is a graph which illustrates a method of calculating membership value $X_1$, FIG. 47(*b*) is a graph which illustrates a method of calculating membership value $Y_1$ and FIG. 47(*c*) is a graph which illustrates a method of calculating membership value $Z_1$, FIG. 47(*d*) is a graph which illustrates a method of calculating membership value $X_2$, FIG. 47(*e*) is a graph which illustrates a method of calculating membership value $Y_2$, FIG. 47(*e*) is a graph which illustrates a method of calculating membership value $Z_2$ and FIG. 47(*g*) is a graph which illustrates a method of calculating the most suitable operation interval $T_0$.

Line 23, "value $Z_Z$" should read --value $Z_2$,--; and
Line 45, "Fig. 47(e)" should read --Fig. 47(a)--.

COLUMN 11

Line 29, "before" should read --before being--.

COLUMN 14

Line 52, "double-side" should read --single-side--.

COLUMN 16

Line 36, "area=ME" should read --area=ME,--;
Line 39, "area=ME" should read --area=ME,--; and
Line 40, "at" should read --as--.

UNITED STATES PATENT AND TRADEMARK OFFICE

CERTIFICATE OF CORRECTION

PATENT NO. : 5,579,438

DATED : November 26, 1996

INVENTOR(S) : Satoshi Kaneko, et al.

It is certified that error appears in the above-indentified patent and that said Letters Patent is hereby corrected as shown below:

COLUMN 18

Line 55, "nations" should read --geographic areas--; and
Line 64, "so as use is" should read --so as to use in--.

Signed and Sealed this

Eighth Day of July, 1997

Attest:

BRUCE LEHMAN

*Attesting Officer*

*Commissioner of Patents and Trademarks*